(12) United States Patent
Aijaz

(10) Patent No.: US 10,368,349 B2
(45) Date of Patent: Jul. 30, 2019

(54) METHOD FOR ASSISTING BIDIRECTIONAL COMMUNICATION IN WIRELESS NETWORKS

(71) Applicant: KABUSHIKI KAISHA TOSHIBA, Tokyo (JP)

(72) Inventor: Adnan Aijaz, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/487,163

(22) Filed: Apr. 13, 2017

(65) Prior Publication Data

US 2018/0302899 A1    Oct. 18, 2018

(51) Int. Cl.
*H04W 72/04* (2009.01)
*H04L 1/00* (2006.01)
*H04W 74/00* (2009.01)

(52) U.S. Cl.
CPC ........... *H04W 72/0446* (2013.01); *H04L 1/00* (2013.01); *H04W 74/004* (2013.01)

(58) Field of Classification Search
None
See application file for complete search history.

(56) References Cited

U.S. PATENT DOCUMENTS

| 6,788,702 | B1 | 9/2004 | Garcia-Luna-Aceves et al. |
| 6,791,997 | B2 | 9/2004 | Beyer et al. |
| 9,923,832 | B2 | 3/2018 | Wetterwald et al. |

(Continued)

FOREIGN PATENT DOCUMENTS

| JP | 2008-270854 A | 11/2008 |
| JP | 2009-188924 A | 8/2009 |

(Continued)

OTHER PUBLICATIONS

Fan et al., "Extended Abstract: A Bidirectional TDMA Protocol for Underwater Acoustic Sensor Networks," ACM Int. Conf. Underwater Networks and Systems (2013), 2 pages.

(Continued)

*Primary Examiner* — Faruk Hamza
*Assistant Examiner* — Cassandra L Decker
(74) *Attorney, Agent, or Firm* — Finnegan, Henderson, Farabow, Garrett & Dunner, L.L.P.

(57) ABSTRACT

Methods and devices are provided for assisting bidirectional communication within a wireless network, the wireless network comprising a central node and a plurality of outer nodes within wireless communication range of the central node, the method comprising a first outer node: listening for a downlink communication from the central node to a second outer node and an uplink response from the second outer node to the central node; determining whether the downlink communication or the uplink response has failed to be received by its intended recipient; in response to a determination that the downlink communication or the uplink response has failed to be received by its intended recipient, determining whether the first outer node should transmit the failed communication to the intended recipient; and, in response to a determination that the first outer node should transmit the failed communication to the intended recipient, transmitting the failed communication to the intended recipient.

16 Claims, 33 Drawing Sheets

(56) References Cited

U.S. PATENT DOCUMENTS

| | | | |
|---|---|---|---|
| 2007/0133455 A1* | 6/2007 | Kuchibhotla | H04W 76/14 370/328 |
| 2008/0209301 A1* | 8/2008 | Chang | H04L 1/1607 714/749 |
| 2009/0040985 A1 | 2/2009 | Barnawi et al. | |
| 2009/0052429 A1 | 2/2009 | Pratt, Jr. et al. | |
| 2009/0067533 A1 | 3/2009 | Yuan et al. | |
| 2011/0110345 A1* | 5/2011 | Heidari | H04W 40/06 370/338 |
| 2013/0016600 A1* | 1/2013 | Hwang | H04L 1/1883 370/216 |
| 2013/0077555 A1 | 3/2013 | Gao et al. | |
| 2014/0241254 A1 | 8/2014 | Kaur et al. | |
| 2015/0049644 A1 | 2/2015 | Lee | |
| 2015/0109926 A1 | 4/2015 | Jin et al. | |
| 2016/0020979 A1 | 1/2016 | Thubert et al. | |
| 2016/0021006 A1 | 1/2016 | Vasseur et al. | |
| 2016/0021011 A1 | 1/2016 | Vasseur et al. | |
| 2016/0021017 A1 | 1/2016 | Thubert et al. | |
| 2016/0044733 A1* | 2/2016 | Soriaga | H04W 76/025 370/329 |
| 2016/0269096 A1* | 9/2016 | Thubert | H04B 7/15507 |
| 2018/0020447 A1 | 1/2018 | Thubert et al. | |
| 2018/0124812 A1 | 5/2018 | Thubert et al. | |
| 2018/0302908 A1 | 10/2018 | Aijaz | |

FOREIGN PATENT DOCUMENTS

| | | |
|---|---|---|
| JP | 2010-263297 A | 11/2010 |
| JP | 2013-534120 A | 8/2013 |
| JP | 2013-176118 A | 9/2013 |
| JP | 2015-233351 A | 12/2015 |

OTHER PUBLICATIONS

Swamy et al., "Cooperative Communication for High-Reliability Low-Latency Wireless Control," Proc. IEEE Int. Conf. Communications (2015), 7 pages.

Scheible et al., "Unplugged But Connected," IEEE Industrial Electronics Magazine (Summer 2007), pp. 25-34.

Accettura et al., "Decentralized Traffic Aware Scheduling in 6TiSCH Networks: Design and Experimental Evaluation," IEEE Internet of Things Journal (2014), pp. 1-17.

Duquennoy et al., "Orchestra: Robust Mesh Networks Through Autonomously Scheduled TSCH," Proc. ACM Int. Conf. Embedded Netw. Sensor Systems (2015), 14 pages.

Soua et al., "Wave: a distributed scheduling algorithm for convergecast in IEEE 802.15.4e TSCH networks," Transactions on Emerging Telecommunications Technologies, vol. 7, No. 4 (2016), pp. 557-575.

Morell et al., "Label switching over IEEE802.15.4e networks," Transactions on Emerging Telecommunications Technologies vol. 24, No. 5 (2013), pp. 458-475.

Notification of Reasons for Refusal issued by the Japanese Patent Office dated Feb. 19, 2019, for Japanese Patent Application No. 2018-022046.

* cited by examiner

METHOD FOR ASSISTING BIDIRECTIONAL COMMUNICATION IN WIRELESS NETWORKS

FIELD

Arrangement described herein relate generally to methods and devices for assisting bidirectional communication within a wireless network.

BACKGROUND

Industrial automation refers to the use of control systems to independently operate and monitor a mechanised system of industrial processes. The industrial automation sector exhibited a huge growth over the last few years, with a global market of ~150 billion U.S. Dollars by 2011, which is expected to grow beyond 200 billion by 2017.

Traditionally, wired communication served the industrial automation sector due its reliable dedicated infrastructure; however, at an exorbitant cost of installation and maintenance. Wireless solutions provide a low-cost alternative to wired solutions and therefore, increasingly gaining popularity for industrial automation applications.

Currently, wireless technologies are primarily used for monitoring and open-loop control applications at different layers of the automation pyramid. Open-loop control does not utilise any feedback. Accordingly, control messages are sent out but no response is returned to the controller. This is in contrast to closed-loop control, which includes feedback to the controller. This therefore requires bi-directional communication.

The use of wireless technologies for closed-loop control applications is constrained by the limitations of current solutions in terms of latency, reliability, and scalability. Moreover, the peculiarities of closed-loop control such as bi-directional information flow, cycle time, etc. create various challenges for protocol design.

Industrial automation is generally split into process and factory automation. Process automation involves manufacturing operations that convert highly variable raw materials into consistent quality finished goods. Process automation is a continuous process and involves analogue controllers (e.g. proportional-integral-derivative (PID) controllers). Typical applications of process automation include monitoring and control of fluids in steel, chemical, petroleum, and other similar industries.

On the other hand, factory automation deals with assembly of high quality engineered components into final product configurations. Factory automation is a discrete process and involves digital controllers (e.g. programmable logic controllers (PLCs)). Typical examples of factory automation include assembly line process for automobile, packaging, home appliances, and other similar industries.

The networking requirements for factory automation and process automation have some key differences. The former comprises star topology environments whereas the latter consists of mesh topologies. While a very high reliability of up to 99.999% (in terms of packet delivery ratio) is required for both, the latency requirements for factory automation are much more stringent compared to process automation. Typically, factory automation requires 2-10 ms latency (in terms of cycle time). However, process automation requires an end-to latency on the order of 20-30 ms (in terms of cycle time). Further, process automation requires high scalability, with support for up to 100-150 devices.

There is therefore a need for a novel wireless solution for closed-loop control operation in mesh-topology environments (e.g. process automation) wherein low latency (~20-30 ms cycle time) and very high reliability (99.999% packet delivery ratio) is required along with high scalability (up to 100-150 devices).

BRIEF DESCRIPTION OF THE FIGURES

In the following, embodiments will be described with reference to the drawings in which.

DETAILED DESCRIPTION

Figure 1:
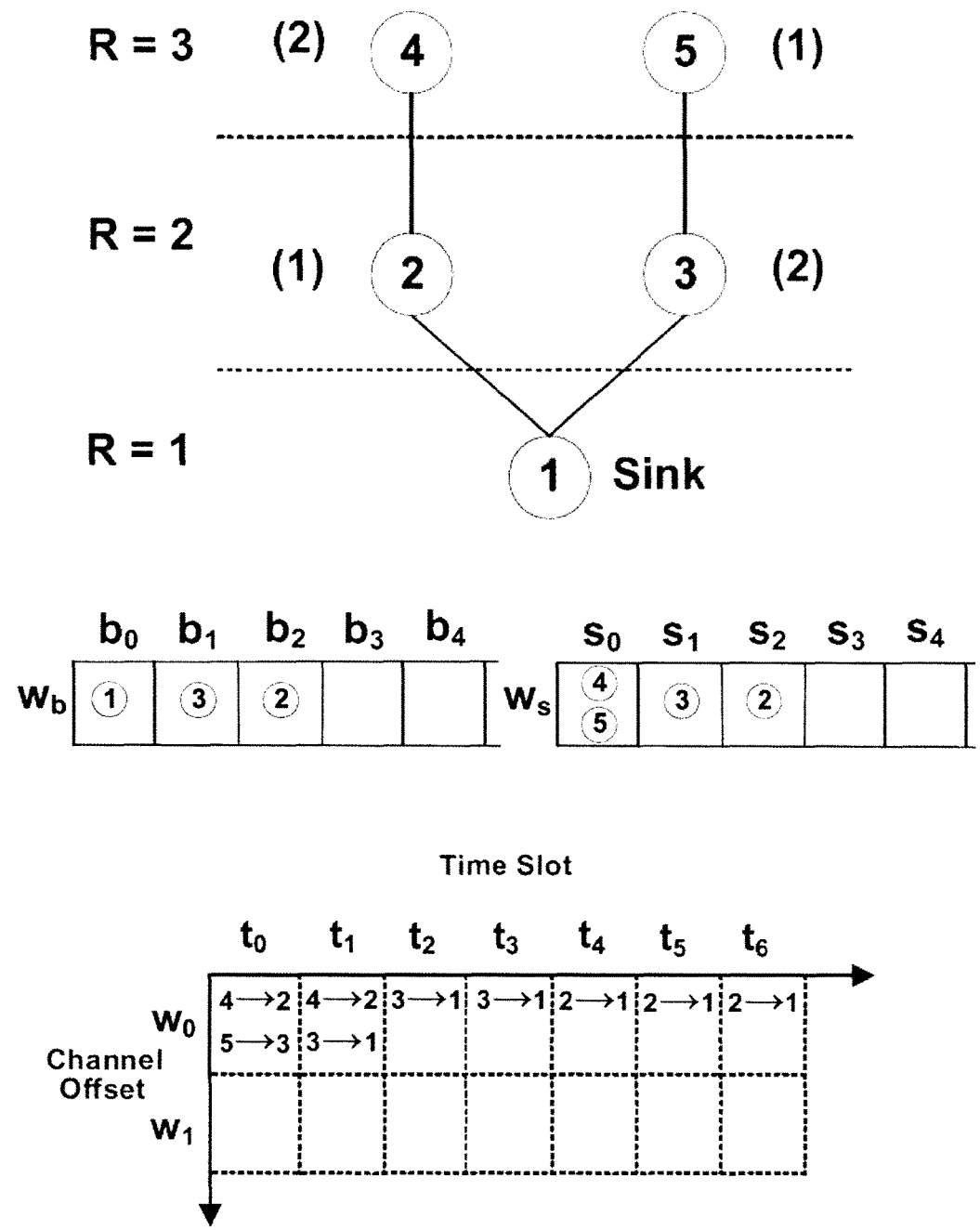
FIG. 1 shows an illustration for multi-hop scheduling for a simple topology.

According to a first arrangement there is provided a method for determining a transmission schedule for one or more transmissions from a first child node to a first parent node in a multi-hop wireless network, wherein each node is a child node to a corresponding parent node, each child node being configured to send messages directed to a sink node via its corresponding parent node and wherein the method comprises the first parent node: listening for signals indicating scheduled timeslots for transmission between nodes in the network and, if a signal is detected, updating a record of scheduled transmissions; receiving from the first child node a preliminary schedule specifying a timeslot for transmission of each of the one or more messages to the first parent node; determining, based on the record of scheduled transmissions, whether the preliminary schedule includes any scheduled transmissions that would conflict with any scheduled transmissions in the record of scheduled transmissions or whether the length of the preliminary schedule can be reduced without conflicting with any other scheduled transmissions in the record of scheduled transmissions; responsive to a determination that there would be a conflict or that the length of the preliminary schedule can be reduced without conflict: determining an updated schedule for the first child node by determining a set of scheduled timeslots that minimises the number of scheduled timeslots without conflicting with any of the scheduled transmissions in the record of scheduled transmissions; and sending the updated schedule to the first child node to assign the updated schedule to the first child node.

Arrangements described herein provide a distributed means of scheduling communications directed towards a sink node from other nodes in a multi-hop wireless network. By listening for other messages assigning schedules to other nodes, each node is able to create its own local record of scheduled transmissions in its area. This allows each node to determine a preliminary schedule. Having said this, the parent node of the node will have additional information regarding the scheduled local transmissions. Accordingly, the node sends the preliminary schedule to its parent node for confirmation that it provides no collisions/conflicts with other scheduled transmissions. As the parent node is involved in the scheduling of each child node, it is better able to determine whether the child nodes are proposing schedules that may conflict with each other.

The sink node may be a control node that controls the network of wireless nodes. Accordingly, the method of scheduling may form the uplink part of a bidirectional communication between the control node and the wireless nodes. The control node may send a downlink communication to one or more nodes and, in response to the downlink communication, the one or more nodes may respond via the methods described herein.

Determining that the length of the schedule can be reduced may be determining that the end to end latency of all known transmissions can be reduced by scheduling earlier non-conflicting transmissions.

Each node may comprise memory for storing the record, a wireless transceiver for communicating wirelessly with other nodes and controller for performing the steps described herein.

Each node has a parent node located upstream in the network (closer to the sink node). The parent node may be the sink node.

The preliminary schedule may be based on a corresponding record of scheduled transmissions maintained by the child node.

Each schedule may assign both a timeslot and a frequency channel for a given transmission. A schedule may conflict with other transmissions in the network if it schedules a transmission on same channel and during the same timeslot as another transmission within communication range of the recipient of the other transmission.

The method may further comprise, responsive to a determination that there would be no conflict or that the length of the preliminary schedule cannot be reduced without conflict, sending to the first child node a signal to confirm the assignment of the preliminary schedule.

The confirmation may be a simple indication that the proposed schedule is accepted, or may include the proposed schedule itself to reconfirm the proposed schedule (and to broadcast the assigned schedule to nearby nodes). Including the proposed schedule in the confirmation informs nearby nodes of the assigned schedule.

Advantageously, determining the updated schedule may comprise scheduling at least one transmission during the same timeslot as another transmission whilst avoiding conflict with any scheduled transmission in the record of scheduled transmissions. This allows parallel transmissions within the network. Parallel transmissions are simultaneous transmissions scheduled during the same timeslot and may be scheduled if the two transmissions are outside of communication range of each other or on different channels and if the two transmissions don't involve the same transmitting and receiving nodes.

Advantageously, the method further comprises the first parent node, in response to it overhearing one of its child nodes sending a signal assigning a schedule to another node, sending a message to a corresponding parent node of the first parent node to inform the corresponding parent node of the assigned schedule. This gives the corresponding parent node same local network knowledge as the first parent node, thereby better allowing it to schedule transmissions to avoid conflicts.

Advantageously, the method further comprises the first parent node: prior to receiving from the first child node a preliminary schedule, receiving a build command from a corresponding parent node of the first parent node, the build command instructing the first parent node to build a preliminary schedule and including a scheduling priority assigned to the first parent node relative to any other children of the corresponding parent node; and in response to the receipt of the build command, forwarding the build command on to all child nodes of the first parent node, the forwarded build command including corresponding scheduling priorities for each child node of the first parent node.

The build command provides a relative scheduling priority to each child node, thereby preventing conflicts between scheduling signals that are sent between child and parent nodes during the scheduling process.

Advantageously, the method may further comprise the first parent node: determining whether all of its child nodes have had their schedules assigned; and in response to a determination that all of its child nodes have had their schedules assigned: determining a second preliminary schedule, the second preliminary schedule being for the transmission of messages from the first parent node to a corresponding parent node of the first parent node; determining a signalling timeslot for sending the second preliminary schedule to the corresponding parent node, the signalling timeslot being determined based on the scheduling priority assigned to the first parent node; during the signalling timeslot, sending the preliminary schedule to the corresponding parent node; and receiving from the corresponding parent node either a confirmation that the preliminary schedule is approved, or an alternative schedule assigned by the corresponding parent node.

Accordingly, once all child nodes have been scheduled, the first parent node may proceed to schedule its own transmissions. This utilises the same mechanism, where the parent node sends its own preliminary schedule (the second preliminary schedule) to its corresponding parent for approval. Determining the second preliminary schedule may occur before, after, or during the determination of the signalling timeslot.

Advantageously, the second preliminary schedule may comprise determining a set of scheduled timeslots that minimises the number of scheduled timeslots without conflicting with any of the scheduled transmissions in the record of scheduled transmissions. This may involve determining a set of timeslots assigned to various available frequency channels to minimise the total number of scheduled timeslots. This may involve picking the earliest possible timeslots on each available channel.

According to a further arrangement there is provided method for determining a transmission schedule for a first node in a multi-hop wireless network, wherein each node is a child node to a corresponding parent node, each child node being configured to send messages directed to a sink node via its corresponding parent node, and wherein the method comprises the first node: listening for signals indicating scheduling timeslots for transmission between nodes in the network and, if a signal is detected, updating a record of scheduled transmissions; determining whether to schedule a transmission for each of one or more messages to the corresponding parent node of the first node; in response to a determination to schedule, determining a preliminary schedule specifying a timeslot for transmission of each of the one or more messages to the corresponding parent node, the preliminary schedule being based on the record of scheduled transmissions; sending the preliminary schedule to the corresponding parent node for approval; and setting an assigned schedule based on a response from the corresponding parent node.

Accordingly, each node may determine a preliminary schedule and request permission to utilise this schedule from its parent node. The parent node may respond by accepting the preliminary schedule or setting another schedule. Once an assigned schedule has been set, the first node may proceed to transmit according to the assigned schedule. The first node may wait for a predetermined number of signalling/scheduling timeslots before beginning to utilise the assigned schedule.

Advantageously, determining the preliminary schedule may comprise determining a set of scheduled timeslots that minimises the number of scheduled timeslots without conflicting with any of the scheduled transmissions in the record of scheduled transmissions. Minimising the number of schedule timeslots may involve selecting the earliest non-conflicting timeslots. The earliest non-conflicting timeslots may be selected across one or more available frequency channels.

Advantageously, the response may indicate either that the preliminary schedule has been approved by the corresponding parent node or provides a new schedule that is assigned to the first node by the corresponding parent node. The indication may be an approval, where no conflict is found by the parent node, or an updated schedule, where a new schedule is found that either avoids conflicts or reduces transmission latency. The approval of the preliminary schedule may be a simple indication or approval or may be a retransmission of the preliminary schedule back to the first node.

Advantageously, the method may further comprise the first node, in response to it overhearing a signal, from a corresponding child node of the first node, assigning a schedule to another node, sending a message to the corresponding parent node of the first node to inform the corresponding parent node of the assigned schedule. This allows the parent node to be informed of local scheduled transmissions so that it is aware of all of the locally scheduled transmissions for each of its child nodes.

Advantageously, the first node may determine to schedule a transmission for one or more messages to the corresponding parent node of the first node in response to: a determination that the first node has no child nodes and the receipt of a build command from the corresponding parent node; or a determination that the first node has one or more child nodes and that a schedule has been assigned for each of the one or more child nodes of the first node.

Accordingly, the sink node may send out a build command to instruct the nodes to build a schedule. Each node may pass the build command on to its child nodes (if it has any). If the node is a leaf node (if it has no child nodes) then it begins scheduling upon receipt of the build command. If the node has children, then it begins scheduling once each of its children has been assigned a schedule. This provides a distributed sequential method of building a schedule from the leaf nodes up to the sink node.

Advantageously, the method further may comprise the first node, in response to a determination to schedule, determining a signalling timeslot for sending the preliminary schedule that avoids conflicts with other scheduled transmissions in the record, wherein the preliminary schedule is sent during the signalling timeslot. The node may also record signalling timeslots assigned to nearby nodes and schedule its signalling to avoid conflicts.

Advantageously, the method may further comprise the first node, in response to a detection that the sending of the preliminary schedule to the corresponding parent node for approval collided with another transmission in the network, resending the preliminary schedule during the next signalling timeslot that is free according to the record of scheduled transmissions. The next signalling timeslot that is free is the next one that may be utilised by the first node whilst avoiding conflict with other transmissions according to the record of scheduled transmissions.

Advantageously, the signalling timeslot for sending the preliminary schedule may be determined based on a priority assigned to the first node in a build command received from the corresponding parent node, the priority indicating a scheduling priority relative to other child nodes of the corresponding parent node.

Advantageously, the method may further comprise, in response to the build command being received and the first node having one or more child nodes, the first node sending a further build command to each of the child nodes.

According to one arrangement the build command comprises a next available build timeslot the method further comprises the first node determining a build timeslot for sending the build command based on the scheduling priority, the next available build timeslot, such that the build timeslot avoids conflict with any scheduled transmissions in the record, wherein the further build command is sent during the build timeslot.

The further build command may include a new next available build timeslot and a priority assigned to each child node of the first node. The priority may be determined based node ID and/or the distance of each child node from the sink node.

Advantageously, the method may further comprise the first node determining a number of overprovisioned timeslots based on one or more of a communication link quality with the corresponding parent node, a total number of transmissions scheduled to be sent by the first node and distance to the sink node, the overprovisioned timeslots being for use by the first node for resending failed transmissions. The link quality may be measured in terms of Expected Transmission Count (ETX) or any other measure of communication link quality.

Advantageously, the first node: in response to a determination that a number of overprovisioned timeslots are not required, sends a request to reduce the number of overprovisioned timeslots to the corresponding parent; in response to a determination that more overprovisioned timeslots are required, sends a request to increase the number of overprovisioned timeslots to the corresponding parent; and in response to the receipt from the corresponding parent of an approval to change the number of overprovisioned timeslots, changes the number of overprovisioned timeslots according to the approval. Accordingly, the first node may request an increase or decrease of overprovisioned timeslots. The parent node may determine whether another child node of the parent node has requested a change, and whether both requests may be satisfied by reallocating one or more overprovisioned timeslots to another child node.

Advantageously, the method may further comprise the first node, in response to a determination that a communication link with the corresponding parent node has failed: sending a request to a neighbouring node to request that the neighbouring node become the new parent node for the first node, the request including the schedule of transmissions previously assigned between the corresponding parent node and the first node; and setting a new assigned schedule for transmissions to the neighbouring node based on a response from the neighbouring node.

Determining that a communication link has failed may mean determining that the corresponding parent node is unable to communicate with the first node, or that a communication link quality is below a threshold link quality. The neighbouring node may determine whether the previously assigned schedule would cause conflict according to local knowledge, if reassigned for transmissions to the neighbouring node and may send confirmation of use of the previously assigned timeslot(s) (and/or channels) if there is no conflict, or assign a new timeslots (and/or channels) if there is a conflict. The first node may also send information regarding whether the corresponding parent node has failed, or has a low link quality.

According to a further arrangement there is provided a wireless node comprising a wireless transceiver configured to communicate wirelessly with other nodes in a wireless network, memory, and a controller configured to control the wireless node to perform any of the above described methods.

The above arrangements relate to scheduling of messages from wireless nodes to a central (control/sink) node. The following arrangements relate to scheduling of messages from a central (control/sink) node to wireless nodes (downlink scheduling). These two methods may be combined to form a scheduling mechanism for bidirectional transmissions.

A method for determining a transmission schedule for one or more transmissions from a first node to a first set of one or more child nodes in a multi-hop wireless network, wherein each node is a child node to a corresponding parent node, each child node being configured to receive messages originating from a sink node via its corresponding parent node and wherein the method comprises a parent node of the first node: listening for signals indicating scheduled timeslots for transmission between nodes in the network and, if a signal is detected, updating a record of scheduled transmissions, receiving from the first node a preliminary schedule specifying one or more timeslots for transmission to each of the first set of one or more child nodes; determining, based on the record of scheduled transmissions, whether the preliminary schedule includes any scheduled transmissions that would conflict with any scheduled transmissions in the record of scheduled transmissions or whether the length of the preliminary schedule can be reduced without conflicting with any other scheduled transmissions in the record of scheduled transmissions; and, responsive to a determination that there would be a conflict or that the length of the preliminary schedule can be reduced without conflict: determining an updated schedule for the first node by determining a set of scheduled timeslots that minimises the number of scheduled timeslots without conflicting with any of the scheduled transmissions in the record of scheduled transmissions; and sending the updated schedule to the first node to assign the updated schedule to the first node.

Arrangements described herein provide a distributed means of scheduling communications originating from a control node to nodes in a multi-hop wireless network. By listening for other messages assigning schedules to other nodes, each node is able to create its own local record of scheduled transmissions in its area. This allows each node to determine a preliminary schedule. Having said this, the parent node of the node will have additional information regarding the scheduled local transmissions. Accordingly, the node sends the preliminary schedule to its parent node for confirmation that it provides no collisions/conflicts with other scheduled transmissions. As the parent node is involved in the scheduling of each child node, it is better able to determine whether the child nodes are proposing schedules that may conflict with each other.

Each node may comprise memory for storing the record, a wireless transceiver for communicating wirelessly with other nodes and controller for performing the steps described herein.

Each node has a parent node located upstream in the network (closer to the sink node). The parent node may be the sink node.

Advantageously, the method may further comprise, responsive to a determination that there would be no conflict or that the length of the preliminary schedule cannot be reduced without conflict, sending to the first node a signal to confirm the assignment of the preliminary schedule.

Each schedule may assign both a timeslot and a frequency channel for a given transmission. A schedule may conflict with other transmissions in the network if it schedules a transmission on same channel and during the same timeslot as another transmission within communication range of the recipient of the other transmission.

Advantageously, determining the updated schedule may comprise scheduling at least one transmission during the same timeslot as another transmission whilst avoiding conflict with any scheduled transmission in the record of scheduled transmissions. This allows parallel transmissions within the network. Parallel transmissions are simultaneous transmissions scheduled during the same timeslot and may be scheduled if the two transmissions are outside of communication range of each other or on different channels and if the two transmissions don't involve the same transmitting and receiving nodes.

According to a further arrangement there is provided a method for determining a transmission schedule for a first node in a multi-hop wireless network, wherein each node is a child node to a corresponding parent node, each child node being configured to receive one or more messages originating from a sink node via its corresponding parent node and wherein the method comprises the first node: listening for signals indicating scheduling timeslots for transmission between nodes in the network and, if a signal is detected, updating a record of scheduled transmissions; determining whether to schedule a transmission of a corresponding message to each of one or more child nodes of the first node; determining a preliminary schedule specifying, for each of the one or more child nodes, a corresponding timeslot for transmission to the respective child node, the preliminary schedule being based on the record of scheduled transmissions; sending the preliminary schedule to the corresponding parent node of the first node for approval; and setting an assigned schedule based on a response from the corresponding parent node.

Accordingly, each node may determine a preliminary schedule and request permission to utilise this schedule from its parent node. The parent node may respond by accepting the preliminary schedule or setting another schedule. Once an assigned schedule has been set, the first node may proceed to transmit according to the assigned schedule. The first node may wait for a predetermined number of signalling/scheduling timeslots before beginning to utilise the assigned schedule.

Advantageously, determining the preliminary schedule comprises determining a set of scheduled timeslots that minimises the number of scheduled timeslots without conflicting with any of the scheduled transmissions in the record of scheduled transmissions. Minimising the number of schedule timeslots may involve selecting the earliest non-conflicting timeslots. The earliest non-conflicting timeslots may be selected across one or more available frequency channels.

Advantageously, the response may indicate either that the preliminary schedule has been approved by the corresponding parent node or provides a new schedule that is assigned to the first node by the corresponding parent node. The indication may be an approval, where no conflict is found by the parent node, or an updated schedule, where a new schedule is found that either avoids conflicts or reduces transmission latency. The approval of the preliminary schedule may be a simple indication or approval or may be a retransmission of the preliminary schedule back to the first node.

Advantageously, the first node may determine to schedule a transmission to each of the one or more child nodes in response to the receipt from the corresponding parent node of a schedule specifying one or more scheduled transmissions from the corresponding parent node to the first node that the first node is required to forward on to the one or more child nodes of the first node. Accordingly, the first node may begin scheduling in response to the receipt of schedule from the parent node that indicates that transmissions to one or more child nodes are required. The schedule may therefore be built up progressively, wherein after each node has a schedule assigned to it, the node informs its child nodes of this schedule to prompt the child nodes to begin scheduling.

Advantageously, the method may further comprise the first node, in response to a determination to schedule, determining a signalling timeslot for sending the preliminary schedule that avoids conflicts with other scheduled transmissions in the record, wherein the preliminary schedule is sent during the signalling timeslot. This signalling timeslot may allocate times for transmitting the preliminary schedule to the parent node. Equally, the signalling timeslot may also allocate time to transmit the assigned schedule to child node(s) of the first node. The node may also record signalling timeslots assigned to nearby nodes and schedule its signalling to avoid conflicts.

Advantageously, the method may comprise the first node, in response to a detection that the sending of the preliminary schedule to the corresponding parent node for approval collided with another transmission in the network, resending the preliminary schedule during the next signalling timeslot that is free according to the record of scheduled transmissions. The next signalling timeslot that is free is the next one that may be utilised by the first node whilst avoiding conflict with other transmissions according to the record of scheduled transmissions.

Advantageously, the signalling timeslot for sending the preliminary schedule may be determined based on a priority assigned to the first node by the corresponding parent node, the priority indicating a scheduling priority relative to other child nodes of the corresponding parent node. The priority may be sent to first node by the parent node along with the schedule assigned to the parent node.

Advantageously, the signalling timeslot may be determined based on a next available signalling timeslot that is communicated to the first node by the corresponding parent node. By providing a next available signalling timeslot, the parent node can therefore help its child nodes avoid conflicting transmissions during scheduling.

Advantageously, the method may further comprise the first node, in response to a transmission schedule being assigned to the first node, sending the assigned schedule to each of the one or more child nodes and sending a corresponding assigned priority to each of the one or more child nodes. This not only helps each child node to avoid transmissions that conflict with transmissions by the first node, but allows each child node to determine whether it needs to perform its own scheduling. Equally, the assigned priority helps avoid signalling conflicts between the child nodes.

Advantageously, the corresponding assigned priority for each of the one or more child nodes may be determined by the first node based on a unique node ID assigned to each of the one or more child nodes, each unique node ID being based on the distance of the respective child node from the sink node. The unique ID may be assigned to each node during an initialisation phase.

Advantageously, the method may further comprise determining an uplink schedule for transmissions to the sink node by determining a preliminary uplink schedule based on the record of scheduled transmissions, sending the preliminary uplink schedule to the corresponding parent node and setting an assigned uplink schedule based on a response from the corresponding parent node. This uplink scheduling may be determined in the same manner as discussed above with regard to scheduling transmissions to a sink node. Accordingly, the two methods may be combined to form a means for forming a bidirectional transmission schedule (e.g. for closed loop applications).

Advantageously, the method further comprises the first node: listening to communications between other nodes; determining whether a communication between other nodes has failed to be received by its intended recipient; and in response to a determination that a communication has failed, attempting to send the failed communication to its intended recipient. This helps to resolve dropped communications, either during uplink or during downlink transmission. Further arrangements with regard to resolving dropped transmissions are discussed below.

According to a further arrangement there is provided a wireless node comprising a wireless transceiver configured to communicate wirelessly with other nodes in a wireless network, memory, and a controller configured to control the wireless node to perform any of the above described methods.

According to a further arrangement there is provided a computer implemented method for scheduling closed loop communication within a multi-hop wireless network, the wireless network comprising a control node and a plurality of slave nodes, the slave nodes being configured to relay downlink communications from the control node and uplink communications towards the control node, the control node being configured to send a downlink communication in a downlink direction to a first set of one or more sink nodes, each sink node in the first set being configured to send an uplink response to the downlink communication, the method comprising: scheduling downlink transmissions sequentially, on a node by node basis, starting from the control node and moving downlink through the network; and scheduling uplink transmissions, wherein the uplink transmissions are scheduled on a node by node basis in a slave node order that minimises the time difference between each slave node of the first set receiving the downlink communication and the corresponding uplink response being sent.

This method provides a centralised means of scheduling bidirectional communication. By minimising the time difference between uplink and downlink communications, the method minimises the delay for each slave node to report back to the control node.

The method may be implemented by the control node, or may be implemented by a computer connected to the control node. The method may further comprise communicating the scheduled transmissions to the nodes in the network.

The uplink and downlink transmissions are scheduled to avoid conflict with other transmissions in the schedule. The schedule is built sequentially in a similar manner to the distributed scheduling described above.

Scheduling uplink transmissions may comprise: selecting a next timeslot to schedule; for each of the slave nodes in the first set for which uplink scheduling has not yet been performed, determining the timeslot difference between the selected timeslot and the timeslot that the slave node is scheduled to receive its corresponding downlink communication; selecting the slave node with the smallest timeslot difference; scheduling the uplink transmissions for the selected slave node; and repeating the above steps for the remaining timeslots and slave nodes.

The above scheduling mechanisms may not account for failed transmissions. Accordingly, the below methods are proposed for dealing with failed transmissions.

According to an arrangement there is provided a method for assisting bidirectional communication within a wireless network, the wireless network comprising a central node and a plurality of outer nodes within wireless communication range of the central node, the method comprising a first outer node: listening for a downlink communication from the central node to a second outer node and an uplink response from the second outer node to the central node; determining whether the downlink communication or the uplink response has failed to be received by its intended recipient; in response to a determination that the downlink communication or the uplink response has failed to be received by its intended recipient, determining whether the first outer node should transmit the failed communication to the intended recipient; and, in response to a determination that the first outer node should transmit the failed communication to the intended recipient, transmitting the failed communication to the intended recipient.

This arrangement makes use of cooperative multi-user diversity to allow neighbouring nodes to assist in failed transmissions between two other nodes.

This method may be implemented in downlink and uplink scheduling. The intended recipient may be the second outer node for downlink communications and the central node for an uplink response. Listening for an uplink response does not necessarily mean that the uplink response has been sent, as the uplink response will not be sent if the downlink communication failed. Listening is not explicitly for the transmissions stated, but for any downlink or uplink transmissions that may have failed.

This arrangement may be implemented in a one layer scenario, where each node in the network is in direct communication range with the central node, or in a multi-layer (multi-hop) scenario where the control node is a parent node that relays messages between a hub node and the outer nodes (as discussed above).

Advantageously, determining whether the downlink communication or the uplink response has failed to be received by its intended recipient may comprise determining whether a signal has been received from the central node indicating that an uplink response has not been received from the second outer node. The central node may issue this signal if the uplink response was not received successfully within a specified timeframe. This may indicate either that the downlink communication failed (and so the second outer node did not respond) or that the uplink response failed (and so the central node did not receive the response).

Advantageously, the first outer node may determine that the uplink response has failed in response to the uplink communication being detected by the first outer node and the first outer node receiving the signal from the central node indicating that the uplink response has not been received from the second outer node. As the uplink response was sent, but the central node still sent out a signal indicating that the uplink response was not received, the first outer node can determine that the uplink response failed.

Advantageously, the first outer node may determine that the downlink communication has failed in response to no uplink response being detected by the first outer node and the first outer node receiving the signal from the central node indicating that the uplink response has not been received from the second outer node.

Advantageously, determining whether the first outer node should transmit the failed communication to the intended recipient may comprise: waiting for a contention period, the length of the contention period being based on a strength of communication link between the first and second outer nodes; and in response to the receipt of a signal during the contention period from any other outer node indicating that the other outer node intends to transmit the uplink response, determining that the first outer node should not transmit the failed communication.

Accordingly, each outer node that overhears the failed transmission can undergo contention for providing assistance with the failed transmission based on its own priority. Each outer node can determine its own priority based on its strength (or quality) of communication link between the first and second outer nodes. This is because, the stronger the signal, the more likely it is that the first outer node successfully received the failed transmission or can successfully retransmit it. Alternatively, the priority may be based on the strength of communication link between the first outer node and the central node. The strength of communication link may be a signal to noise ratio or any other indication of the strength of the signal between the two nodes.

Advantageously, determining whether the first outer node should transmit the failed communication to the intended recipient further may comprise, in response to no signal being received during the contention period from any other outer node indicating that the other outer node intends to transmit the uplink response, determining that the first outer node should transmit the failed communication.

Advantageously, transmitting the failed communication comprises, in response to a determination that the uplink response has failed, sending a signal informing the central node that the uplink response has failed and that the first outer node intends to transmit the uplink response. This informs the central node that the failure was an uplink failure, and that the central node should expect to receive a retransmission of the uplink response. This also allows the central node to assign a timeslot for retransmission.

Advantageously, the first outer node sending a signal informing the central node that the uplink response has failed may comprise the first outer node requesting a timeslot for transmitting the uplink response, wherein, in response to the receipt of an approval of the request, the first outer node transmits the uplink response to the central node. The approval may include a scheduled timeslot for retransmission.

Advantageously, the first outer node may determine that the downlink communication has failed and that it should transmit the failed communication in response to the first outer node receiving a request from the central node for the first outer node to transmit the downlink communication to the second outer node. In this case, the central node can request assistance from the first outer node for retransmitting the downlink communication. This request may include a scheduled timeslot for retransmission.

Advantageously, the method may further comprises the first outer node, in response to the receipt of a request from the central node to the first outer node to transmit the downlink communication, sending a confirmation to the central node that the first outer node intends to transmit the downlink communication to the second outer node. This helps the central node prepare for transmission and allows the two nodes to sync their transmissions.

Advantageously, transmitting the failed communication to the intended recipient may comprise: in response to a determination that the downlink transmission failed, transmitting the downlink transmission to the second node; or in response to a determination that the uplink transmission failed, transmitting the uplink response to the central node.

Advantageously, transmitting the downlink communication to the second node comprises transmitting the downlink communication to the second outer node in unison with the central node transmitting the downlink communication to the second outer node. In unison means at the same time as, or in sync with, the central node. By transmitting simultaneously the signal is boosted making it easier for the second outer node to receive the downlink communication.

Advantageously, transmitting the uplink response to the central node comprises transmitting the uplink response to the central node in a form encoded with the downlink communication to allow the central node to decode the uplink response using the downlink communication. Encoding the uplink response with the downlink response allows the central node to receive the uplink response more effectively by making use of coding gains.

Advantageously, the uplink response is encoded with the downlink communication by performing an XOR operation on the downlink communication and the uplink response. An XOR operation is an exclusive OR operation. As XOR is commutative, this may be performed in either order. This allows central node to decode by performing an XOR operation on the encoded message and the downlink communication.

Advantageously, transmitting the uplink response to the central node may comprise transmitting the uplink response to the central node in unison with the second outer node transmitting the uplink response to the central node. This helps to strengthen the signal. The first and second outer nodes may simultaneously transmit messages encoded using the downlink communication.

According to a further arrangement there is provided a method for closed loop communication within a wireless network, the wireless network comprising a central node and a plurality of outer nodes within wireless communication range of the central node, the method comprising the central node: transmitting a downlink communication to a first outer node; listening, for a first period, for an uplink response from the first outer node; in response to no uplink response being received from the first outer node during the first period: transmitting a signal informing all of the nodes that no uplink response has been received from the first outer node; listening over a second period for a signal indicating that any other outer node overheard the uplink response from the first outer node; in response to a signal being received during the second period indicating any other outer node overheard the uplink response from the first outer node, instructing the other outer node to transmit the uplink response to the central node; in response to no signal being received during the second period indicating that any other outer node overheard the uplink response: sending to a second outer node a request for assistance with a retransmission of downlink information to the at least one outer node; in response to a receipt from the neighbouring node of an approval of the request retransmitting the downlink information to the first outer node in unison with the neighbouring outer node.

According to a further arrangement, instructing the other outer node to transmit the uplink response to the central node comprises instructing the other outer node to transmit the uplink response in encoded form using the downlink communication, and the method comprises the central node, in response to the uplink response being received from the other outer node in encoded form, decoding the uplink response using the downlink communication. The encoded form may be the uplink response being encoded using an XOR operation on the uplink response and the downlink communication. The decoding may comprise performing an XOR operation on the encoded signal and the downlink communication.

Advantageously, sending to a second outer node a request for assistance comprises selecting the second outer node from the nodes in the network based on the strength of communication link between the central node and the second outer node. The strength of communication link may be a signal to noise ratio or any other indication of the strength of the signal between the two nodes.

Advantageously, the method may further comprise the central node: transmitting respective downlink communications to a plurality of outer nodes; listening, for the first period, for a respective uplink response from each of the plurality of outer nodes; and, in response to no uplink response being received from any of the plurality of outer nodes during the first period, transmitting a signal informing all of the nodes of each outer node for which no uplink response has been received, wherein the signal assigns a relative priority to each outer node for which no uplink response has been received. This can help to prevent conflict between multiple simultaneous retransmission attempts.

In one arrangement, the central node and outer nodes form part of a multi-hop network, wherein: transmitting the downlink communication to the first outer node comprises receiving the downlink communication from a parent node of the central node and relaying the downlink communication to the first outer node; the method further comprises the central node, in response to no uplink response being received from the first outer node during the first period, but prior to transmitting a signal informing all of the nodes that no uplink response has been received from the first outer node: requesting timeslots for performing retransmissions from the parent node; in response to receiving of a message from the parent node confirming the request, performing the remainder of the method during the requested timeslots; and, in response to receiving of a message from the parent node providing alternative timeslots, performing the remainder of the method during the alternative timeslots.

This allows retransmission attempts to be scheduled in a multi-hop scenario. This may be implemented in any of the multi-hop scheduling mechanisms described herein.

Advantageously, the method may comprise the central node, in response to receiving a second request for timeslots for performing retransmissions from one of the outer nodes: determining whether the second request for timeslots would conflict with other transmissions; in response to a determination that there would be no conflict, sending to the one of the outer nodes a confirmation that the second request is granted; in response to a determination that there would be a conflict, sending to the one of the outer nodes a confirmation that the second request is granted. The outer nodes may request in order of priority.

Advantageously, determining whether the second request for timeslots would conflict with other transmissions may comprise comparing second request for timeslots with other requests for retransmission timeslots that have been received by the central node.

Advantageously, the method may comprise the central node, in response to receiving the second request, sending a request for an additional timeslot for forwarding on a retransmission to the parent node.

According to a further arrangement there is provided a wireless node comprising a wireless transceiver configured to communicate wirelessly with other nodes in a wireless network, memory, and a controller configured to control the wireless node to perform any of the above described methods.

Multi-Hop Scheduling

Highly reliable low-latency communication is a basic requirement of many industrial control and factory automation applications. Historically, wired communication served this sector due to the ultrahigh reliability of its dedicated infrastructure but unfortunately at an exorbitant cost of installation and maintenance. In recent years, wireless technologies, however, matured to meet the performance standards by incorporating many novel mechanisms such as Time Synchronized Channel Hopping (TSCH).

TSCH achieves improved communication reliability via channel hopping and avoids external interference operating at the same frequency band. Channel hopping helps to spread the risk of collisions by periodically switching the channel over which transmissions are made. TSCH also maintains low radio duty cycle and low energy consumption by synchronizing network nodes.

A notable example is IEEE 802.15.4, a de-facto standard for wireless personal area networks, which has recently adopted TSCH in its IEEE 802.15.4e MAC. Thanks to its channel and spatial diversity, an unprecedented reliability can be achieved but not without a scheduling mechanism that can avoid conflicts by precisely scheduling multiple wireless transmissions occurring at same time, frequency or spatial proximity.

The Internet Protocol version 6 over the TSCH MAC (6TiSCH) standard is a developing Internet Engineering Task Force (IETF) standard. The 802.15.4e will be the de-facto link-layer technique for the emerging 6TiSCH standard, which provides IPv6 networking capabilities for low power wireless networks. The 802.15.4e standard does not specify how a schedule is built. Therefore, a number of techniques and algorithms have been proposed for scheduling in 6TiSCH wireless networks.

Scheduling in 6TiSCH wireless networks can occur in both centralised and decentralised/distributed ways; however, centralised approaches are only suited to fairly static (in terms of traffic and topology) networks. Further, the scalability of centralised scheduling becomes challenging in networks with higher node density. Therefore, from a practical perspective, decentralised/distributed scheduling techniques are much more attractive.

According to a first arrangement there is provided DeAMON, which is a novel technique for decentralised adaptive multi-hop scheduling in 6TiSCH wireless networks. DeAMON is a traffic-aware scheduling protocol that achieves traffic awareness without incurring additional signalling. It builds a sequential schedule and provides the capability of parallelising transmissions. Moreover, it caters for MAC layer retransmissions through optimal overprovisioning. DeAMON also has the capability to adapt to topology changes in the network.

Performance evaluation demonstrates that DeAMON achieves high reliability and low latency compared to existing scheduling protocols.

DeAMON is significantly different compared to state-of-the-art 6TiSCH scheduling protocols. The key structural differences are stated as follows:

a) Distributed scheduling—In DeAMON, nodes in the network build the schedule without the aid of any central entity like path computation engine.

b) Traffic-awareness with no signalling—DeAMON is a traffic-aware scheduling protocol. However, unlike state-of-the-art centralised or distributed traffic-aware scheduling protocols, DeAMON does not achieve this functionality at the expense of additional signalling.

c) Sequential scheduling—In DeAMON, the schedule is built in a sequential manner. The schedule starts from leaf nodes (nodes with no children) and evolves towards the root node. Sequential scheduling minimises latency and improves resource utilisation d) Optimal Overprovisioning—DeAMON allocates some backup slots, in an optimised manner, to vulnerable links/nodes in the network. Such overprovisioning ensures that MAC layer retransmissions are accounted for without disrupting the schedule and increasing latency.

e) OTF Update—In order to ensure efficient utilisation of the overprovisioned pool of resources, an On-the-Fly (OTF) mechanism has been introduced. This mechanism dynamically updates the backup slots for each node and hence, maintains efficient utilisation of resources.

f) Routing-assisted scheduling reconfiguration—DeAMON has the capability to adapt to dynamic topology changes through schedule reconfiguration mechanism. This mechanism is aided by the network layer and ensures that topology changes do not disrupt the schedule.

g) Parallel transmissions—DeAMON exploits the opportunities of parallelising non-conflicting transmissions. This approach not only ensures faster convergence, but also reduces end-to-end latency in the network.

DeAMON operates based on the following principles:
1. The overall resource pool is partitioned into signalling, data, and some overprovisioned slots.
2. 1-hop neighbourhood information knowledge is available to every node in the network.
3. The routing tree has been constructed using routing over low power and lossy networks (RPL) (or any other routing protocol compliant with the 6TiSCH protocol stack) and each node in the tree has been assigned a unique rank.
4. Each parent node knows the number of child nodes associated to itself.
5. Each node in the network is also assigned a unique ID, which monotonically increases from sink to leaf nodes.
6. Initial network dimensioning is initially performed based on the number of nodes in the network.
7. Signalling in the network takes place on specific channel offsets. Nodes, on wakeup, scan these channels for signalling information.

DeAMON is a traffic-aware scheduling protocol that builds the schedule based on the traffic generated and received by a node. Let Q denote the set of nodes in the network. Let gk and Gk denote the local traffic indicator and the global traffic indicator respectively for node k. The local traffic indicator denotes the traffic generated by a node in a slotframe. The global traffic indicator of a node is the sum of its local traffic indicator and the global traffic indicator of all its child nodes (the sum of the number of packets generated by the node and the number of packets that must be forwarded on by the node).

FIG. 1 shows an illustration of multi-hop scheduling for a simple topology. The network comprises five nodes, distributed across three layers or ranks (represented by R). Each node is capable of communicating wirelessly with other nodes within communication range. Each node is assigned its own unique node identifier (node ID) represented inside each node in the figure.

The node in the first layer is the sink node. The sink node is effectively the ultimate destination for all communications during normal operation (outside of scheduling). That is, all transmissions in the network are directed through the network towards the sink node, which acts as a hub for all communications in the network. Transmissions are forwarded through the network by intermediate (relay) nodes via a multi-hop system. The sink node receives the forwarded messages and may be able to perform processes based on the transmissions and/or can forward on the messages to a further device or network, e.g. via the internet.

Each layer represents the minimum number of hops (relay transmissions) that are required to communicate with the sink node. Accordingly, nodes in the same layer are the same minimum hop distance from the sink node. In this case, nodes 2 and 3 are in direct communication with the sink node (node 1), and are therefore one hop away from the sink node. Nodes 4 and 5 are in direct communication with nodes 2 and 3 respectively, but are out of communication range from the sink node. Accordingly, nodes 4 and 5 can only communicate with the sink node via the nodes in the layer below. Nodes 4 and 5 are therefore two hops away from the sink node.

The number in brackets, next to each node, shows its local traffic indicator (the number of packets that are to originate from the node). In this case, nodes 3 and 4 each have two packets to send, whilst nodes 2 and 5 each have one packet.

The sink/root node initiates a Build command, which triggers nodes in the network to build the schedule. The Build command may be sent on a dedicated channel offset. Every node receiving the Build command forwards the command to its child nodes.

Once the build command has been forwarded throughout the network, signals are exchanged between nodes in order for each node to determine its transmission schedule. Once the schedule has been determined for each node, then the nodes in the network may transmit according to the distributed schedule.

Accordingly, three schedules in total are determined. First, a build schedule is determined in order to avoid collisions during the transmission of the build command. Then a signalling schedule is determined in order to avoid collisions as the nodes exchange schedule information to build the final transmission schedule.

During the forwarding of the build command, every parent node assigns priorities to its child nodes. The notion of priority can be based the rank, traffic, or ID of the node for which priority is being assigned.

The priority information is embedded into the Build command and is used by a parent node to assign signalling slots in the build schedule (for forwarding the Build command) to its child nodes in a non-conflicting manner.

For the topology shown in FIG. 1, the build schedule for the forwarding of the Build command is also illustrated. Node 1 selects the first timeslot, $b_0$, on a specific channel offset $w_b$, and sends the Build command to nodes 2 and 3. Moreover, based on node ID, it also assigns priorities to nodes 2 and 3. In this case, the nodes with higher node IDs are given priority over nodes with lower node IDs. Therefore, node 3 selects timeslot b1, whereas node 2 selects timeslot b2, for forwarding the Build command to its child nodes, respectively.

The overall scheduling process follows certain rules, which are described as follows. A key feature of DeAMON is sequential scheduling i.e., the schedule starts from the leaf nodes.

Rule 1:
> Any node k∈Q (k≠sink), on receiving the Build command, will only start building the schedule if it is a leaf node (i.e. it has no child nodes).

A child node of a parent node is a node that has to transmit to the parent node in order to send messages to the sink node. The parent node (if it is not the sink node) then forwards the message on to its own parent node. Accordingly, a node that has no child nodes is a leaf node, as it represents the end of its branch of the network topology.

During scheduling, each node determines its own transmission schedule based on its knowledge of its 1-hop neighbours (the nodes to which it can communicate directly). The topology of FIG. 1 has the following 1-hop neighbourhood information for each node in the network.

Node 4: [2]
Node 2: [4, 1]
Node 5: [3]
Node 3: [5, 1]
Node 1: [2, 3]

The numbers in square brackets indicate the nodes that are within communication range of the given node.

Rule 2:
> Any node k∈Q selects the minimum possible timeslots on available channel offsets, where it finds no conflict as per its local knowledge.

Rule 1 ensures sequential scheduling which is a key feature of DeAMON. Further, Rule 2 ensures that the schedule is built in a manner which incurs minimal latency. In addition, Rule 2 provides the opportunity of parallel transmissions, as discussed later.

Next, the signalling exchange for building the transmission schedule is explained.

Figure 2:
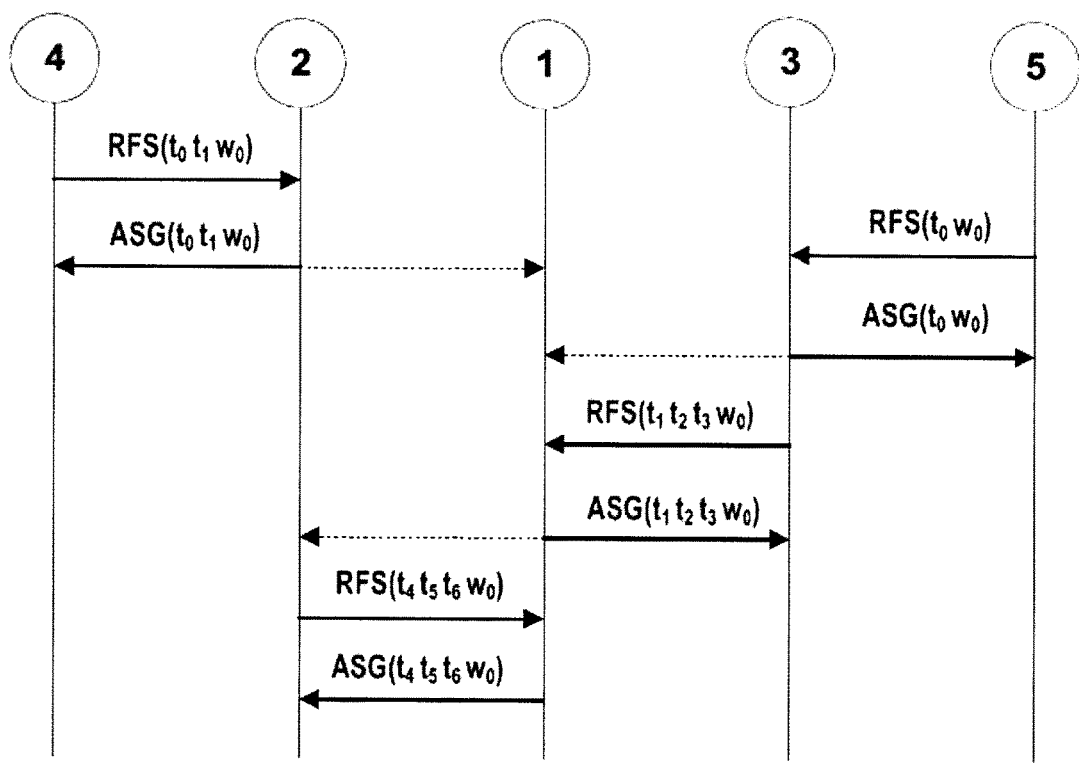
FIG. 2 shows the signalling exchange during multi-hop scheduling for the arrangement of FIG. 1.

FIG. 2 shows the signalling exchange during multi-hop scheduling for the arrangement of FIG. 1. Arrows with solid lines depict transmissions directed from one node to another. Arrows with dotted lines show that the corresponding transmission has been overheard by a neighbouring node.

As nodes 4 and 5 are leaf nodes, they begin the scheduling. Each node utilises its knowledge of its local network (Its one-hop neighbours) and any knowledge it may have about local scheduled transmissions to propose a transmission schedule for itself. This is sent to its parent node, which will utilise its own knowledge of the local network and local transmission schedule, to either confirm that the proposed schedule is acceptable (does not conflict with other scheduled transmissions) or, if the proposed schedule does conflict with another schedule, will propose an alternative schedule to the node (see Rule 3 below).

Based on Rule 1 and Rule 2, node 4 selects time slots $t_0$ and $t_1$ on channel offset $w_0$, and sends a Request-for-Slots (RFS) message to its default parent (node 2) in a signalling slot $s_0$. Note that node 4 will request two time slots as it has two packets to send. Node 2 will respond back with an Assign (ASG) message to confirm the allocation as per Rule 3.

Rule 3:
> Any parent node k'∈Q, on receiving the RFS message, will confirm the requested allocation, only if it finds no conflict. Otherwise, it will respond with an updated allocation based on Rule 2.

Since node 2 finds no conflict on the request allocation by node 4, it will confirm time slots $t_0$ and $t_1$ on channel offset $w_0$, for node 4.

Since node 5 is also a leaf node and it is outside the communication range of node 4, it will send an RFS message to its default parent (node 3), picking timeslot $t_0$ on channel offset $w_0$, as per Rule 2, in the signalling slot $s_1$. The detailed design of the signalling slotframe would be explained later.

Since node 3 finds no conflict, it confirms the requested allocation. Node 1, which is in the neighbourhood of nodes 2 and 3, will overhear the ASG messages and keep a record of respective allocations. Such record is maintained in the form of a two dimensional matrix of order N×W, where N is the maximum number of timeslots in a slot frame, and W denotes the maximum number of channel offsets for data transmission. Each entry denotes the node that is scheduled for transmission over that channel in that timeslot.

After scheduling nodes 4 and 5, nodes 2 and 3 can determine when they can schedule themselves. Since node 3 has priority over node 2 in this case (and is aware of this from the build command), it will send an RFS message to its default parent (node 1) in signalling slot $s_1$.

Node three requires three transmission timeslots ($G_3$=3), two for packets originating from node 3, and one for forwarding on the packet received from node 5. Since node 3 allocated timeslot $t_0$ on channel offset $w_0$, it cannot allocate itself this timeslot without causing a collision. Accordingly, it will request time slots $t_1$, $t_2$, and $t_3$, on channel offset $w_0$, as per Rule 2. Since node 1 finds no conflict, it will confirm the requested allocation by sending an ASG message.

Node 2 will then perform its own scheduling during signalling timeslot $s_2$. Since node 2 overheard the allocation for node 3, it will be aware of the timeslots scheduled for node 3. In this case, it requires three timeslots ($G_2$=3). It will therefore send an RFS message in signalling slot $s_2$, requesting time slots $t_4$, $t_5$, and $t_6$, on channel offset w0, as per Rule 2 Since node 1 finds no conflict, it will respond back with an ASG message, confirming the requested allocation. This completes the transmission schedule, as depicted at the bottom of FIG. 1.

Whilst the transmission schedule shown in FIG. 1 contains the transmissions for all of the nodes, in practice, each node will only know the transmission schedule for itself, its child node(s) and for any nodes for which it overheard the signalling. This is acceptable as each node need only know the transmission schedule that relates directly to it.

The above mentioned Rules 1-3 capture the baseline operation of DeAMON. However, additional rules can be utilised to improve performance.

Figure 3:
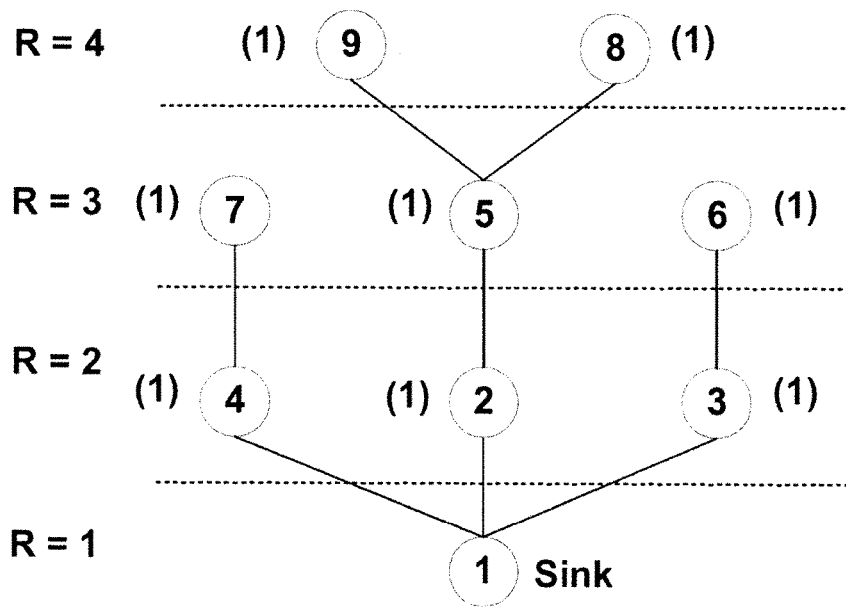
FIG. 3 shows an illustration of multi-hop scheduling for a more complicated topology.
Figure 3:
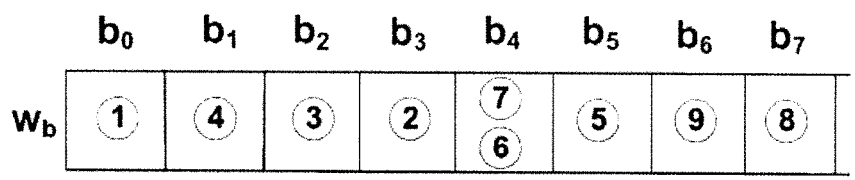
Figure 3:
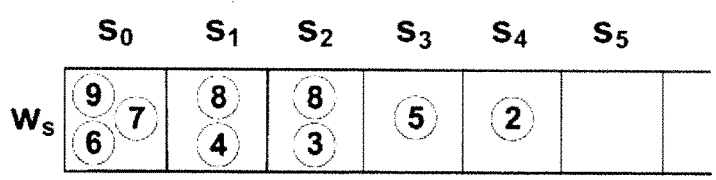
Figure 3:
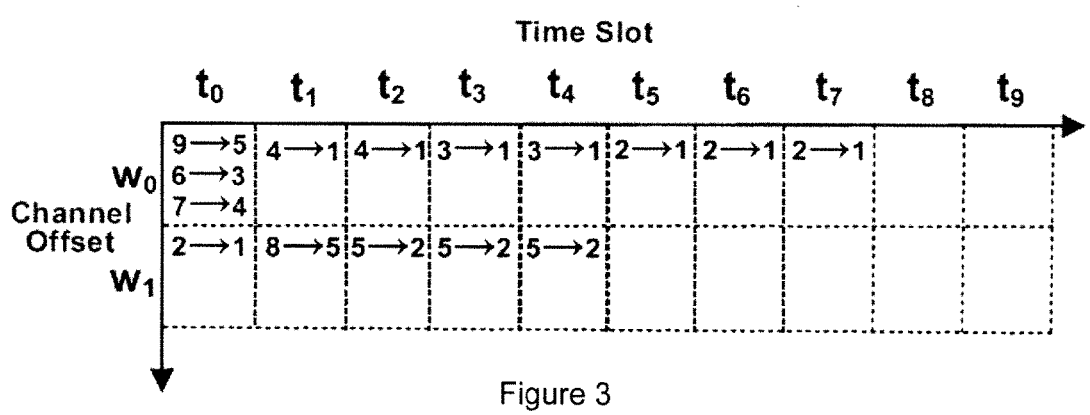

FIG. 3 shows an illustration of multi-hop scheduling for a more complicated topology. FIG. 3 has the following neighbourhood information:

Node 9: [8, 5]
Node 8: [7, 5]
Node 5: [9, 8, 2, 4]
Node 6: [3]
Node 7: [4]
Node 4: [7, 5, 2, 1]
Node 3: [6, 1]
Node 2: [5, 4, 1]
Node 1: [4, 2, 3]

Rule 4:
> Any node k∈Q (k≠sink), on overhearing an ASG message from a node j∈Q, whose rank is higher than its own, will update its local knowledge and forward this information to its default parent, if and only if k is the default parent of j.

In other words, if a node overhears one of its child nodes sending an assign (ASG) message, the node will update its local knowledge based on the timeslots scheduled in the ASG message, and shall send this information on to its own parent in its RFS transmission. This helps to ensure that the parent node of node k has the same knowledge of local transmissions as node k, so that it may better schedule transmissions to avoid conflict with transmissions involving the child node j.

Rule 5:
  Any parent node k'∈Q (k'≠sink), on receiving an RFS message, will confirm the requested allocation based on Rule 3 AND the possibility of a parallel transmission based on its local knowledge.

Accordingly, each parent node makes use of its local knowledge (either from overhearing assigned timeslots itself or receiving information regarding overheard signals from its child node(s)) to reduce latency by scheduling parallel transmissions.

As before, the sink/root node will send the Build command that triggers the schedule build-up phase. Node 1 selects timeslot $b_0$ on channel offset $w_b$, and sends the Build command to its child nodes. Moreover, node 1 also embeds the priority information in the Build command. In this case, the priority is assigned based on the node ID. Based on the priority information, nodes 4, 3, and 2 select timeslots $b_1$, $b_2$, and $b_3$ for forwarding the Build command.

Note that each parent node also informs its child nodes of the next available timeslots (for forwarding the Build command) based on overheard messages from neighboring nodes. This helps avoid conflicts between different layers when forwarding the Build command.

For instance, node 4 overhears the build commands issued to nodes 2 and 3, and so knows that they are assigned timeslots $b_2$ and $b_3$ based on their priority. Node 4 therefore determines that the next available build timeslot is $b_3$. Node 4 informs node 7 that the next available build timeslot is $b_4$ when forwarding the Build command to node 7.

Node 2 overhears the message from node 4 to node 7. Accordingly, node 2 assigns the next available build timeslot ($b_5$) to node 5. The same applies with regard to the remaining nodes in the network. Note that, as node 3 cannot hear node 4, it believes that the next available build timeslot for node 6 is $b_4$. This is acceptable, however, as the two sets of nodes are outside of transmission range, and therefore nodes 6 and 7 would be able to transmit their Build commands at the same time without interfering with each other. In the present case, however, nodes 6 and 7 are leaf nodes, and therefore do not forward on any Build commands.

After receiving the Build command, the leaf nodes (nodes 6, 7, 8 and 9) will start building the schedule following Rules 1-2. Initially, nodes 9 (as it has priority over node 8), 7, and 6 will send RFS messages, selecting timeslot $t_0$ on channel offset $w_0$, to their respective default parents in signalling slot $s_0$. The default parents confirm the requested allocation based on Rule 3. As before, the neighbouring nodes will overhear the ASG messages and keep a record of respective allocation for the nodes.

After this node 8 requests timeslot $t_1$ on channel offset $w_0$ from its parent node, which is node 5, in the signalling slot $s_1$. Similarly, node 4 requests timeslots $t_1$ and $t_2$ on channel offset $w_0$ from node 1, in the signalling slot $s_1$. Since node 4 and node 5 are in within transmission range of each other, a collision will occur at node 5 in signalling slot $s_1$ that will render the request of node 8 unsuccessful. On the other hand, node 1 is outside of transmission range of node 8 and will therefore receive the RFS from node 4 successfully. Node 1 will confirm the requested allocation of node 4 as it finds no conflict.

Based on the signalling rules, which are discussed later, we assume that node 8 retransmits an RFS message in signalling slot $s_2$, requesting timeslot $t_1$ on channel offset $w_1$. Since node 5 finds no conflict, it confirms the requested allocation through an ASG message.

Similarly, based on the signalling rules, node 3 requests timeslots $t_3$ and $t_4$ on channel offset $w_0$, based on overhearing the allocation for node 4, in a signalling slot $s_2$. Signalling slot $s_2$ is selected as node 3 is not the highest priority child node of node 1 (node 2 has a higher priority). Accordingly, node 2 waits one signalling slot to avoid conflict with the signalling of node 2. Since node 1 finds no conflict, it confirms the requested allocation for node 3.

After scheduling its child nodes, node 5 requests timeslots $t_2$, $t_3$ and $t_4$ on available channel offsets $w_0$ and $w_1$ (the two available channel offsets) from node 2 in a signalling slot $s_3$. Since node 2 overheard the allocation for nodes 4 and 3, it will instead allocate timeslots $t_2$, $t_3$ and $t_4$ on channel offset $w_1$ to node 5 in an ASG message. Node 5 sends the request for either $w_0$ or $w_1$ as both channel offsets provide the same earliest available timeslots.

Based on the schedule built so far, node 2 requests timeslots $t_5$, $t_6$, $t_7$ and $t_8$ on channel offset $w_0$ from node 1. Note that node 1 can confirm this allocation as there is no conflict; however, such an allocation will potentially miss an opportunity for parallel transmission. In order to reduce end-to-end latency, it is particularly important to parallelize non-conflicting transmissions. Accordingly. Rules 4-5 are reintroduced in protocol operation.

As per Rule 4, node 2 will embed additional information in the RFS message to node 1 based on the overheard ASG messages from node 5 (intended for nodes 9 and 8). This additional information details any overheard scheduled timeslots. Therefore, node 1 develops enhanced local knowledge and becomes aware of the allocation for nodes 9 and 8. Additionally, node 1 knows the allocations for nodes 7, 6, and 3. Therefore, node 1 finds an opportunity for a parallel transmission for node 2 and responds back with an ASG message (in response to RFS from node 2) with an updated allocation of timeslot $t_0$ on channel offset $w_1$ and timeslots $t_5$, $t_6$ and $t_7$ on channel offset $w_0$, as per Rule 5. This completes the schedule.

After all nodes have been scheduled, the nodes wait until the end of the scheduling phase (which has a predefined number of signalling timeslots) before transmitting during the data phase according to their respective transmission schedules.

A pseudocode, covering protocol aspects of DeAMON is given in Table 1.

TABLE 1

Pseudocode for DeAMON
Algorithm for building network wide TSCH schedule with DeAMON

```
Input Q (set of nodes)
    g_k ∀ k ∈ Q (local traffic indicator)
    ∀k ∈ Q (k≠sink)
        schedule_built ← FALSE
        local_knowledge ← NULL
Start procedure
Sink sends Build Command
for each k ∈ Q (k≠sink)
    if is_leaf(k)
        Request_Allocation (q_k, local_knowledge)
        Receive_Allocation (Request, local_knowledge(def_parent))
        schedule_built ← TRUE
    end if
    while (schedule_built = FLASE)
        Listen_Request or Listen_Assign (∀ k' ∈ Q (k' ≠k)
        update local_knowledge
```

TABLE 1-continued

Pseudocode for DeAMON
Algorithm for building network wide TSCH schedule with DeAMON

```
    if schedule_built=TRUE ∀ children(k)
        Request_Allocation (G_k, local_knowledge)
        Receive_Allocation (Request, local_knowledge(def_parent))
        schedule_built ← TRUE
    end if
    if Listen_Assign(Rank < Own AND child)
        Forward to def_parent
    end if
    end while
end for
end procedure
```

Optimal Overprovisioning

In most of the centralised and distributed scheduling techniques, MAC layer re-transmissions are not accounted for. Such re-transmissions could occur due to poor link quality and require additional slots in a slotframe, which not only disrupts the schedule, but also results in higher latency. In DeAMON, we allocate some back up slots, in an optimal manner, by overprovisioning slots for nodes in the network.

Recall that the overall resource pool has been partitioned into signalling, data, and overprovisioned slots. In determining the number of overprovisioned slots, we consider three factors: total traffic, link quality (measured in terms of Expected Transmission Count (ETX)), and closeness to sink node.

The ETX is an indicator of link quality. Each node measures the ETX to its default parent through some probe packets before building the schedule. Further, nodes located closer to the sink carry much higher aggregated traffic and therefore, are more prone to re-transmissions.

In DeAMON, a node k computes the number of overprovisioned slots $\Delta_k$ by:

$$\Delta_k = \lfloor \sigma_1 \cdot G_k \cdot \beta_k / R_k \rfloor \quad (1)$$

such that $$\beta_k = \max(N - \sigma_2/G_k, N - \sigma_3/E_k) \quad (2)$$

where $R_k$ denotes the rank and $G_k$ denotes the global traffic indicator of node k, and $E_k$ denotes the ETX for the link between node k and its default parent, which is calculated as the inverse of average link success probability. Further, $\sigma_1$, $\sigma_2$ and $\sigma_3$ are scaling constants. N is the maximum number of timeslots available in the data transmission phase.

The overprovisioned slots can be requested along with the request for data slots. The default parent can allocate these slots in a similar manner, following Rules 1-5. Alternatively, a contention-based mechanism can be employed for using the overprovisioned pool of resources. In order to ensure each node gets its fair share of resources, a priority-based mechanism, based on equation (1), can be implemented.

In order to have efficient utilisation of the overprovisioned resources, the use of an on-the-fly (OTF) mechanism is proposed for dynamically updating overprovisioned slots for each node. The 6TiSCH standard has recently defined the 6TiSCH Operation Sublayer (6top) which gathers network statistics. Layers on top of 6top can use it to manage the TSCH schedule. The OTF module is located on top of the 6top sublayer. In DeAMON, the role of the OTF module is to monitor and dynamically update the overprovisioned resources for each node in the network. The algorithm for dynamic updating of overprovisioned slots is shown in Table 2.

TABLE 2

OTF update mechanism
Algorithm for OTF updating of overprovisioned resources

```
    Δ (no of overprovisioned slots)
    α (no of required slots)
    δ (threshold)
    E (ETX)
    Start procedure OTF_Update(Δ,α, δ)
        if α < Δ do
            Δ= α + [δ]; δ = E /2
        else if α > Δ do
            Δ= α + [δ]; δ = E /2
        end
    end procedure
```

Schedule Reconfiguration Under Topology Changes

In practice, the tree topology does not remain static and changes can occur. One of the most prominent examples of topology changes is a parent switch which occurs either due to poor link quality or the parent node running out of battery. Such parent changes require reconfiguration of schedule as otherwise packet losses would occur. Note that schedule reconfiguration is different to building the schedule again.

In 802.15.4e networks, routing updates take place at specific slots. Therefore, we assume that RPL related signalling takes places on specific signalling slots within the signalling slotframe. We illustrate this process with the aid of FIGS. 4 and 5, wherein node 5 performs a parent switch from node 2 to node 4.

Figure 4:
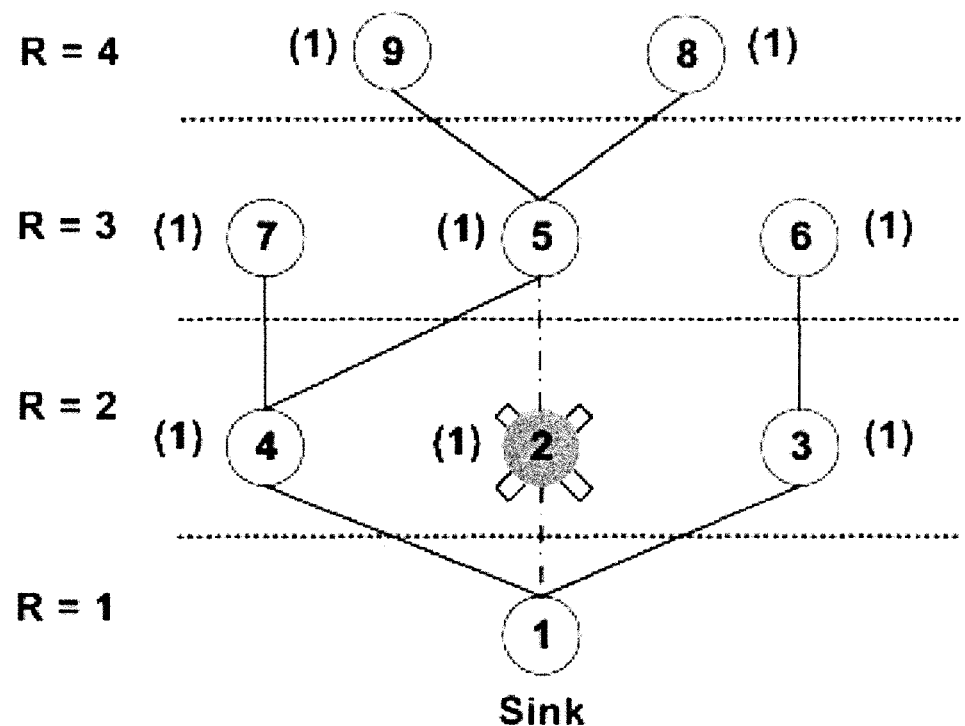
FIG. 4 shows the topology of FIG. 3 for the situation where node 2 has failed.
Figure 4:
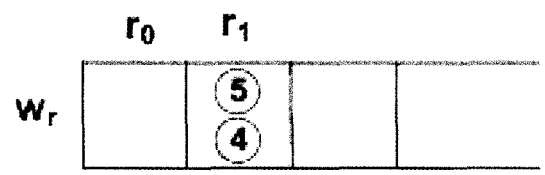
Figure 4:
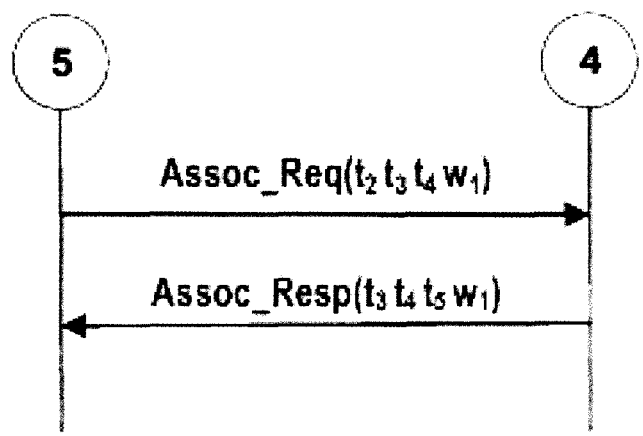
Figure 5:
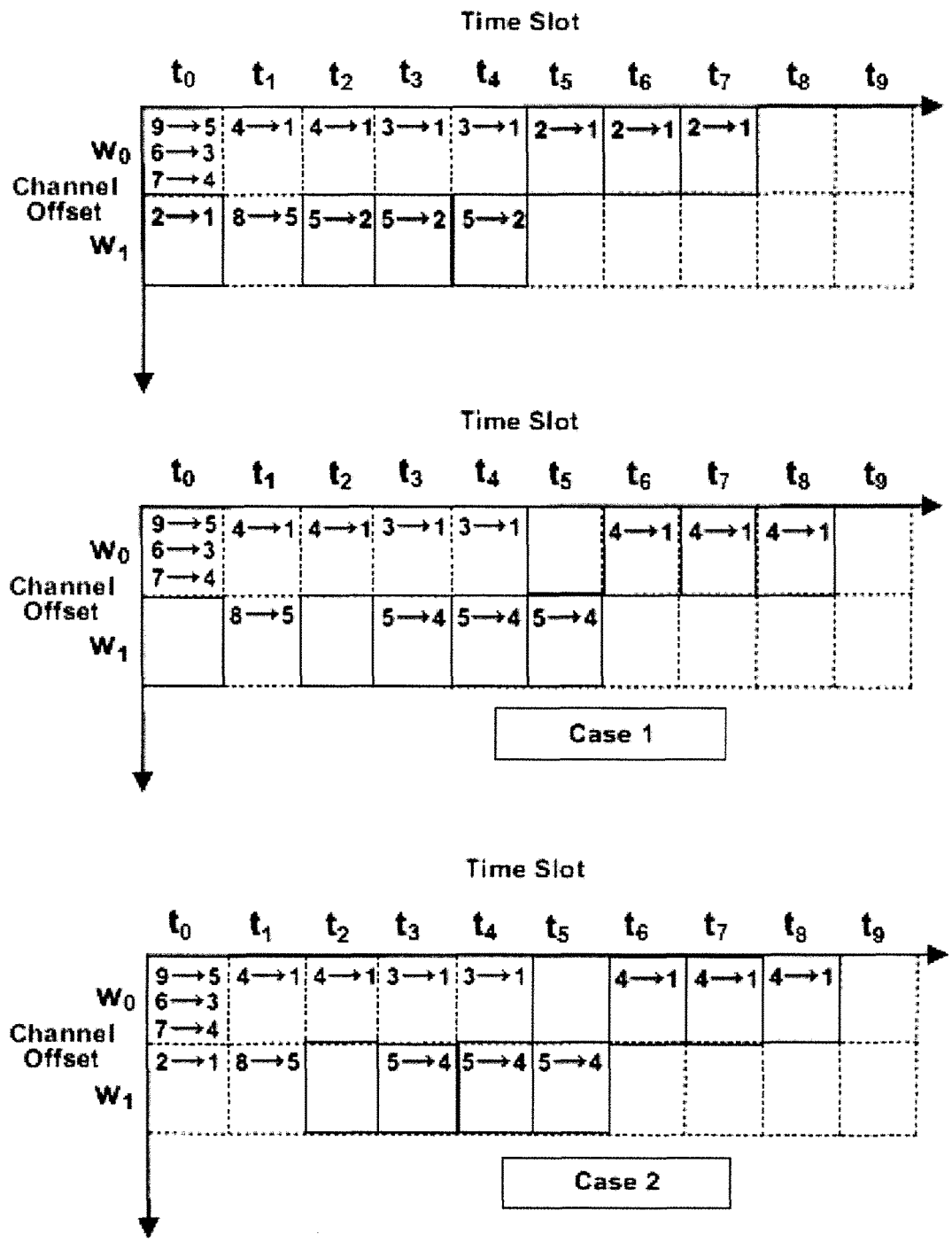
FIG. 5 shows the transmission schedules for the topology of FIG. 4.

FIG. 4 shows the topology of FIG. 3 for the situation where node 2 has failed. FIG. 5 shows the transmission schedules for the topology of FIG. 4. The top schedule is the schedule prior to the parent switch. The middle schedule and bottom schedule relate to the new schedules, after the parent switch, for two different scenarios (discussed below).

In this scenario, node 2 has failed and can no longer act as the parent to node 5. Accordingly, node 5 performs a parent switch from node 2 to node 4. When Node 5 is associating with node 4 in the signalling slot it also informs node 4 of its previous default parent, allocated slots, and the cause for parent switch (i.e., either inactivity of node 2 or poor link quality). This can be achieved using the options field of RPL control message.

There are two cases to consider:

Case 1: Node 2 is inactive and in the vicinity of node 4. In this case, it is likely that node 4 is aware of the schedule of node 2 based on its local knowledge. Node 4, based on Rules 1-5, will first allocate these previously allocated slots to node 5. Since, node 5 finds a conflict on one of the previously allocated slots of node 5 i.e., timeslot $t_2$ on channel offset $w_1$, it responds back with updated allocation i.e., timeslots $t_3$, $t_4$, and $t_5$ on channel offset, $w_1$, as shown at the bottom of FIG. 4. Next, node 4 needs additional slots to forward the traffic from node 5. Since node 2 is not active, node 4 re-uses the slots allocated to node 2, based on its local knowledge of potential conflicts. As node 4 finds conflict on one of the previously allocated slots of node 2, i.e., timeslot $t_0$ on channel offset $w_1$, it uses time slots $t_6$, $t_7$, and $t_8$ on channel offset $w_0$, as shown in FIG. 5.

Case 2: Node 2 is active and in the vicinity of node 4. In this case, it is likely that node 4 is aware of the schedule of node 2 based on its local knowledge. Node 4, based on Rules 1-5, will first allocate these previously allocated slots to node 5. Since, it finds a conflict on one of the previously allocated slots of node 5 i.e., timeslot $t_2$ on channel offset $w_1$, it responds back with updated allocation i.e., timeslots $t_3$, $t_4$, and $t_5$ on channel offset $w_1$, as shown at the bottom of FIG. 4. Next, node 4 needs additional slots to forward the traffic from node 5. Since node 2 is active but does not forward the traffic of node 5, node 4 re-uses the vacant slots allocated to node 2, based on its local knowledge of potential conflicts. Therefore, node 4 uses time slots $t_6$, $t_7$ and $t_8$ on channel offset $w_0$, while node 2 uses timeslot $t_0$ on channel offset $w_1$ for its own data transmission, as shown in FIG. 5.

Case 3: Node 2 is active/inactive and outside the vicinity of node 4. In this case, node 4 may have partial or no knowledge of node 2's schedule. It allocates slots to node 5 In a similar manner as described earlier; however, it finds additional vacant slots for forwarding the data of node 5, based on its local knowledge.

The routing updates follow similar signalling rules as employed during building the schedule, and discussed later.

Signalling Rules

Similar to Rules 1-5, which are employed during schedule build up for data transmission, the signalling messages also follow certain rules, which are described as follows.

Rule S1:

The signalling for schedule build up is strictly sequential, i.e., a parent node will not request slots until it has scheduled all of its child nodes.

Note that as per Rule S1, signalling slots would be populated in a sequential manner from leaf nodes to nodes directly connected to the sink.

Rule S2:

Any node k∈Q (k≠sink, k≠leaf node), after scheduling all of its child nodes, will wait for at least one timeslot before sending an RFS message to its parent node j, if and only if k is not the highest priority child node of j.

Rule S2 minimizes the possibility of a collision on a signalling slot between multiple child nodes of a parent node. Recall that priority is assigned to each child node during the schedule build-up phase.

Rule S3:

Any node k∈Q (k≠sink), on detecting a collision in a signalling slot, will retransmit the RFS message, with requested channel offset incremented by 1, in a signalling slot determined after a random back-off.

A node will infer that a collision has occurred in a signalling slot if it does not receive a response to the RFS message. Based on Rule S3, a node will retransmit the RFS message, requesting similar timeslots as before but with next available channel offset.

The use of a different channel offset minimizes the possibility of a collision during data transmission. Moreover, after detecting a collision in a signalling slot, a node will take a random back-off, which is uniformly distributed in [1, . . . , $M_s$] slots (wherein $M_s$ is a predefined threshold representing the a fixed number of predefined timeslots), before retransmitting the RFS message.

Structure of Signalling, Data, and Overprovisioned Slotframes

Figure 6:
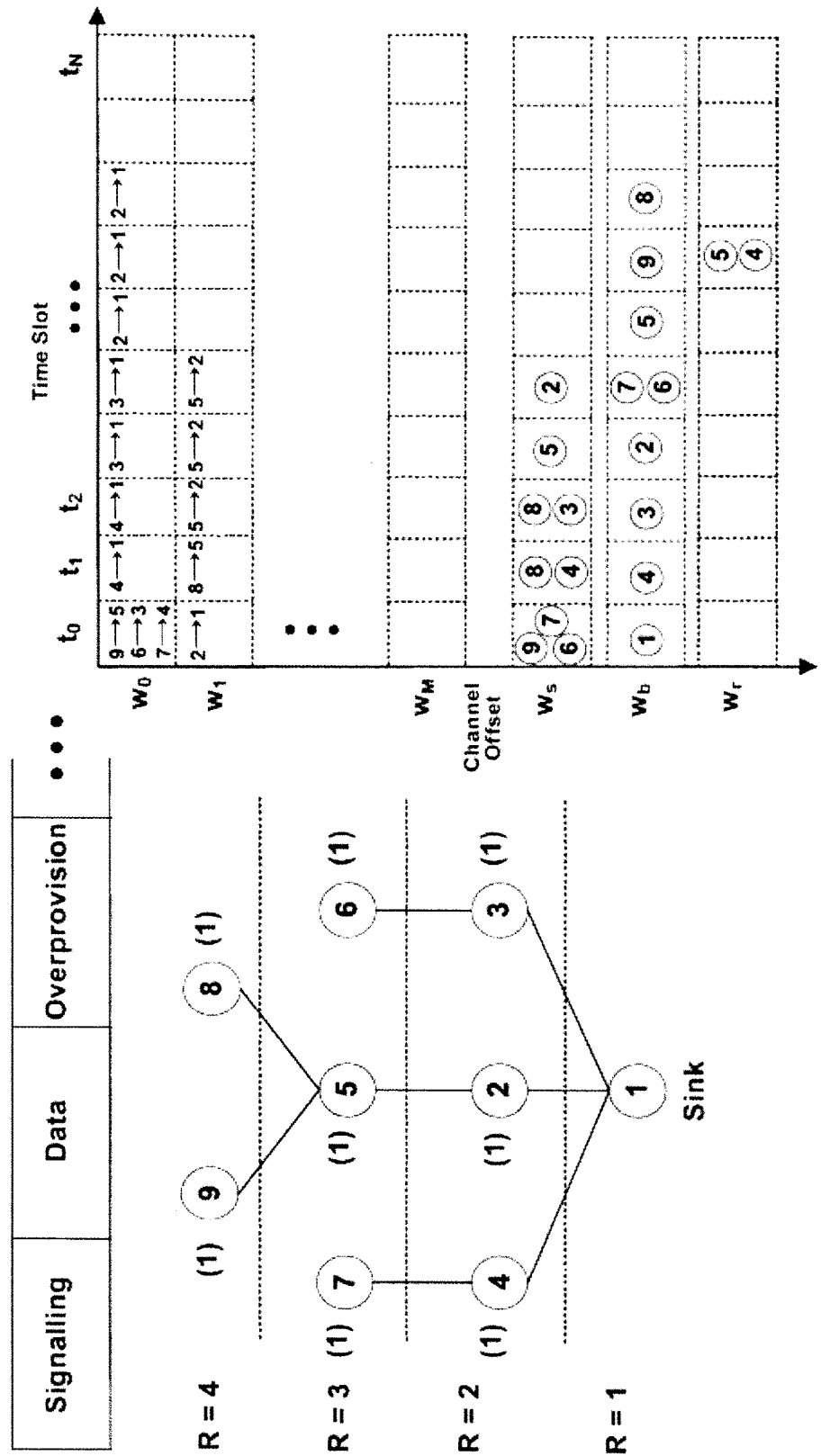
FIG. 6 shows the overall structure for signalling, data, and overprovisioned slotframes.

FIG. 6 shows the overall structure for signalling, data, and overprovisioned slotframes. As shown in the figure, the signalling slotframe precedes the data and overprovisioned slotframes. The signalling slotframe is used for both routing updates and scheduling message exchange. The partitioning of overall resource pool into signalling, data, and overprovisioned slotframes is an implemented-specific issue and beyond the focus of this application.

Cost of Signalling

Distributed scheduling protocols achieve the scheduling functionality based on neighbour-to-neighbour signalling. The signalling cost of DeAMON is compared to two alternative methods, the Decentralised Traffic Aware Scheduling (DeTAS) protocol and Wave, an alternative TSCH protocol.

The signalling cost is defined as the total number of signalling messages required to build the schedule. This includes initial signalling for triggering schedule built up, traffic related information, scheduling requests/responses, and any other protocol specific message exchange. The following table shows the comparison, where Topology 1 and 2 refer to the topology shown in FIG. 1 and FIG. 3, respectively.

TABLE 3

Signalling Cost Comparison
Signalling Cost

| Protocol | Topology 1 | Topology 2 |
|---|---|---|
| DeTAS | 12 | 28 |
| Wave | 20 | 57 |
| DeAMON | 7 | 13 |

As shown in Table 3, DeAMON significantly reduces the signalling cost compared to other distributed scheduling protocols.

DeAMON: Performance Validation

The performance of DeAMON is evaluated through system-level simulation studies. Poisson distributed nodes within a certain area with a certain density are considered. At the network layer, RPL is implemented and the routing tree is generated.

Figure 7:
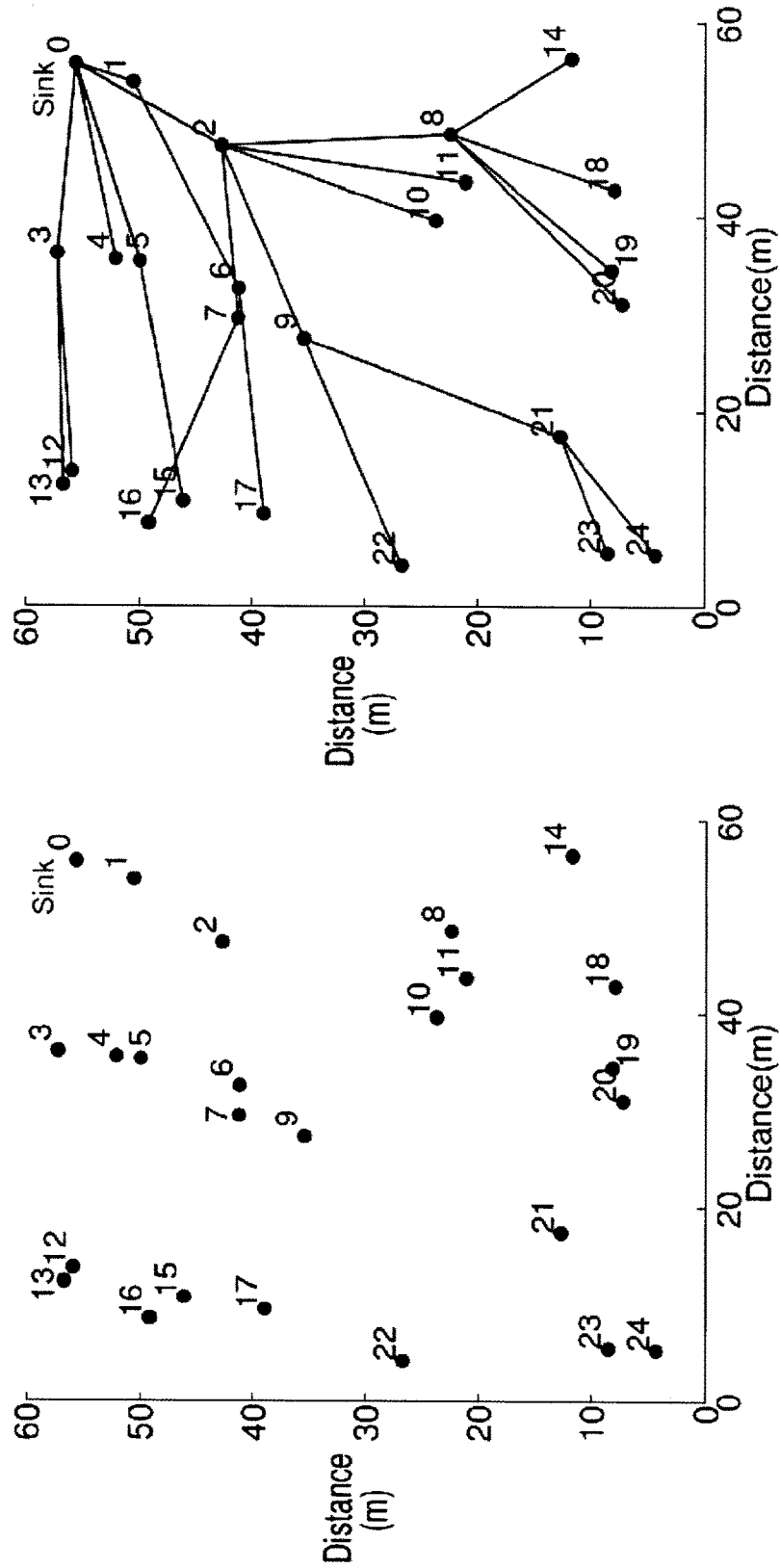
FIG. 7 shows one instance of the generated topology and the routing tree generation using routing over low power and lossy networks (RPL)

FIG. 7 shows one instance of the generated topology and the routing tree generation using RPL. Various types of network information are derived from the routing tree for implementing the scheduling algorithm.

Figure 8:
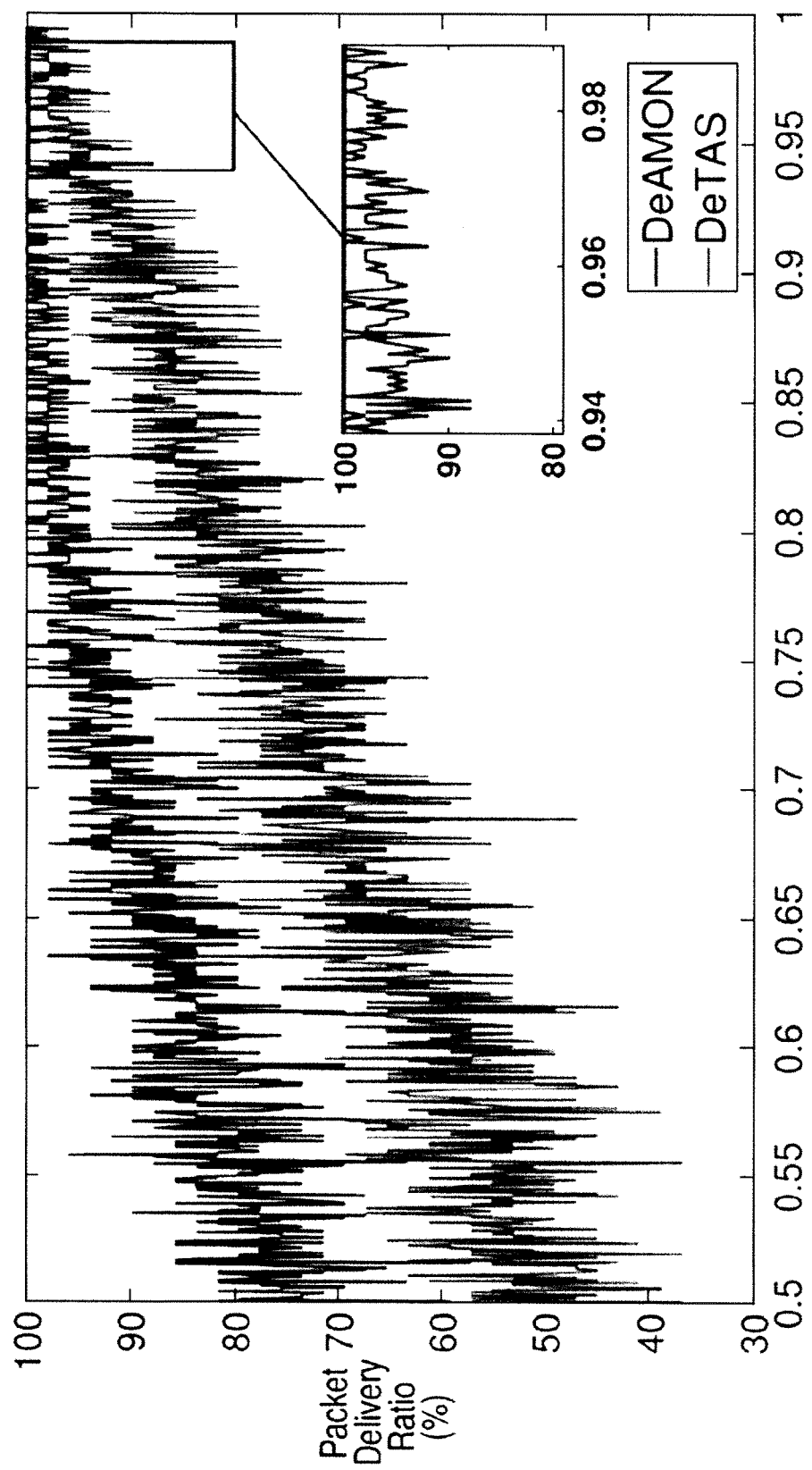
FIG. 8 shows the packet failure ratio for DeAMON and a Decentralised Traffic Aware Scheduling (DeTAS) protocol.
Figure 9:
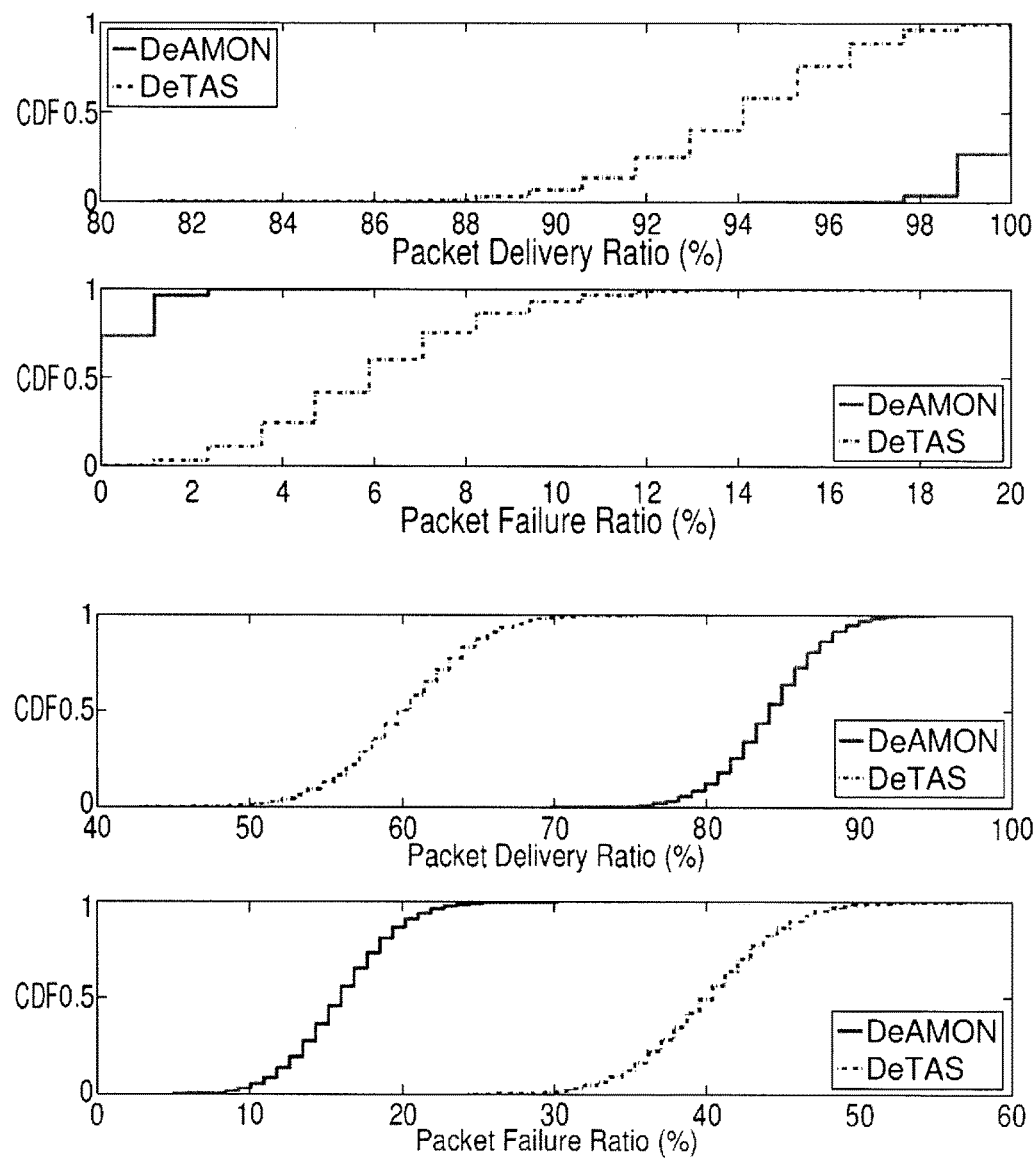
FIG. 9 shows the packet drop ratio for DeAMON and DeTAS.

FIG. 8 shows the packet failure ratio for DeAMON and DeTAS. FIG. 9 shows the packet drop ratio for DeAMON and DeTAS. As shown by the results, DeAMON outperforms DeTAS due to the optimal overprovisioning. The performance gain is significant especially under poor channel conditions. CDF represents the cumulative distribution function.

Figure 10:
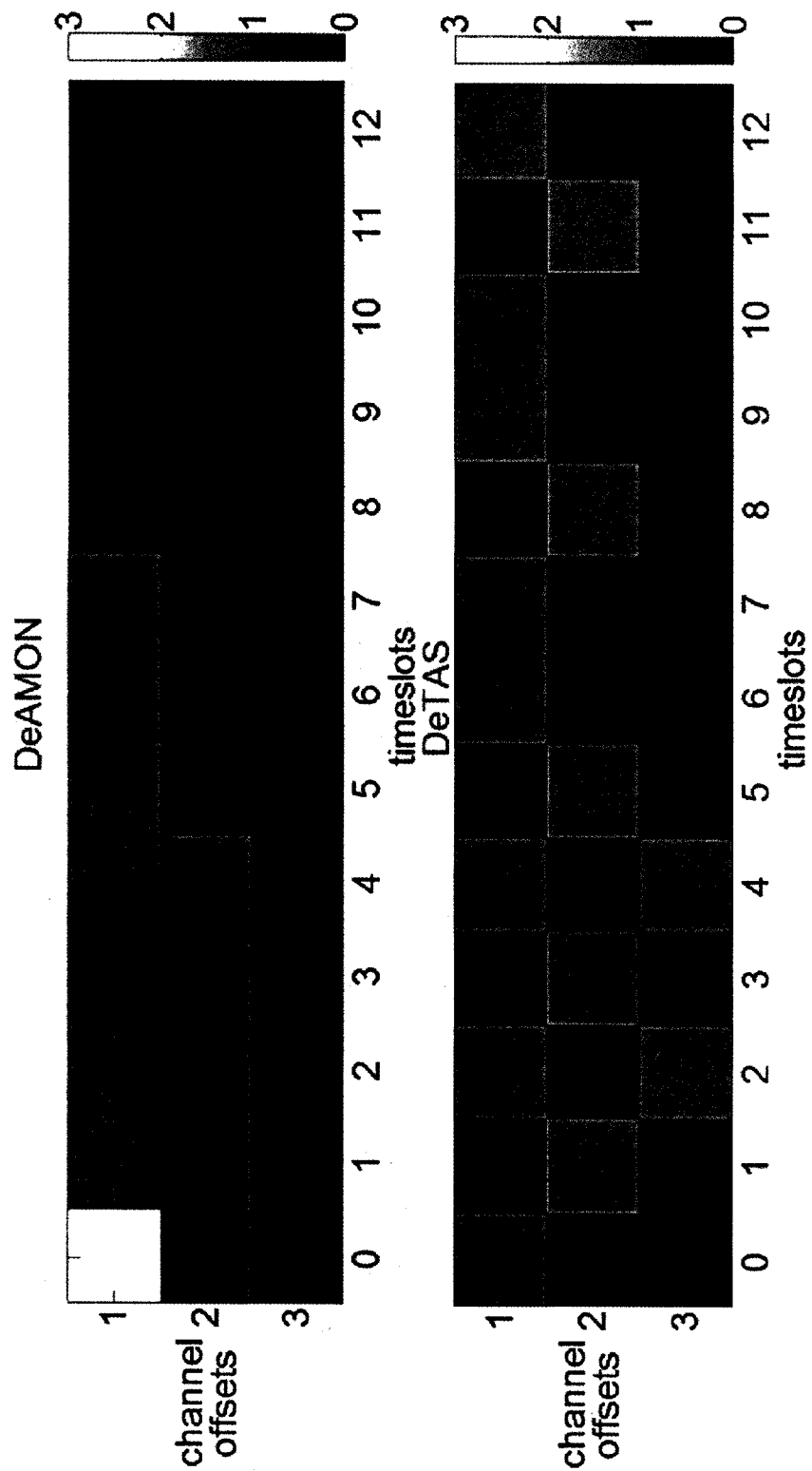
FIG. 10 shows the slotframe utilisation for DeAMON and DeTAS.

FIG. 10 shows the slotframe utilisation for DeAMON and DeTAS. As shown by the results, DeAMON provides much higher utilisation of resources, compared to DeTAS, due to the sequential scheduling and its ability to parallelise transmissions. The channel occupancy directly translates to end-to-end latency and it can be easily inferred that DeAMON incurs much lower end-to-end latency compared to DeTAS.

The key advantages of DeAMON are stated as follows:
The decentralised/distributed nature of DeAMON provides scalable operation for large networks (networks with large node densities).
DeAMON is fully compliant to the 6TiSCH protocol stack and does not require any modifications at higher layers. It seamlessly interfaces with other standardized components of the stack such as 6top, IEEE 802.15e and On-the-Fly (OTF) bandwidth reservation.
Compared to other distributed scheduling protocols, DeAMON incurs less signalling cost. This directly translates to improvements in node-level duty cycles and network-level lifetimes.

DeAMON provides high throughput by parallelising non-interfering transmissions.

DeAMON ensures efficient utilisation of resources and minimises end-to-end latency compared to other distributed scheduling protocols.

DeAMON adapts to topology changes in the network and reconfigures the schedule instead of building the schedule again, which not only ensures reduced signalling overhead, but also provides high reliability in dynamic environments.

Due to backup slots, DeAMON handles MAC layer retransmissions in an efficient manner. This also guarantees high reliability in harsh environments.

Closed Loop Control Scheduling in Star Topologies

This section proposes a novel wireless solution, termed Enhanced wireless interface with Network coding for Closed-loop Operation in Star-topology Environments (ENCLOSE) according to a second arrangement. This is a novel solution for closed-loop control in factory automation scenarios. ENCLOSE uses an enhanced Physical (PHY) layer based on IEEE 802.15.1 (Bluetooth) specifications. Moreover, it adopts a specialised medium access control (MAC) frame structure, based on time division multiple access (TDMA) and frequency division duplexing (FDD), which guarantees closed-loop control operation within the required latency and scalability bounds.

In order to achieve the required reliability requirements, ENCLOSE implements a novel cooperative multi-user diversity technique, based on network coding. ENCLOSE also adopts an adaptive frequency hopping technique for interference mitigation. Last, but not least, ENCLOSE is amenable to channel coding and multi-connectivity enhancements, which are key enablers for achieving ultra-high reliability, as identified in TRL's wireless control research strategy.

ENCLOSE has been designed specifically for closed-loop control operation in star-topology environments. Key features of ENCLOSE are stated as follows.

a) Enhanced PHY layer—PHY layer design has a major impact on achievable latency of any communication protocol. ENCLOSE adopts a PHY layer based on 802.15.1 specifications with an enhanced data rate (EDR) feature. This allows optimisation of the MAC frame structure subject to the aforementioned envisioned latency requirements.

b) Closed-loop control—Closed-loop control algorithms are executed cyclically. The 'cycle-time' is a characteristic measure in industrial automation. Moreover, closed-loop operation involves bi-directional flow of messages. Hence, joint design of uplink/downlink becomes important. ENCLOSE has been specifically designed to tackle the peculiarities of closed-loop control.

c) Cooperative multi-user diversity—Cooperative multi-user diversity is a key enabler for achieving very high reliability. ENCLOSE adopts a novel approach to harness cooperative multi-user diversity in both uplink and downlink.

d) Network coding schemes—Network coding is another key enabler for achieving low latency and high reliability in wireless communications. ENCLOSE adopts different network coding schemes and dynamically selects the optimal one for uplink/downlink operation.

e) Optimised frame structure—ENCLOSE adopts a MAC frame structure which is inspired by WISA. However, the MAC frame structure is further enhanced and optimised considering the latency objectives and network coding operations.

f) Adaptive frequency hopping—Similar to WISA, ENCLOSE adopts a frame-by frame-channel hopping. Such frequency hopping is crucial in mitigating multipath fading and external interference. Unlike WISA, where the frequency hopping scheme is static, ENCLOSE adopts an adaptive frequency hopping scheme wherein the list of available channels is dynamically updated. Such adaptive frequency hopping makes ENCLOSE much more robust to operation in harsh wireless environments.

g) Seamless Enhancements—One of the key elements of TRL's wireless control strategy is a layered approach to achieve ultra-high reliability. ENCLOSE adopts the first layer, which comprises network coding enhancements. However, ENCLOSE has been designed to seamlessly integrate with second and third layers, comprising novel channel coding and multi-connectivity enhancements, respectively.

ENCLOSE: System Design and Protocol Operation

The system design and protocol operation for ENCLOSE is described as follows. A single-cell scenario is considered wherein the ENCLOSE access point handles the operation of multiple slave devices (sensors or actuators).

Figure 11:
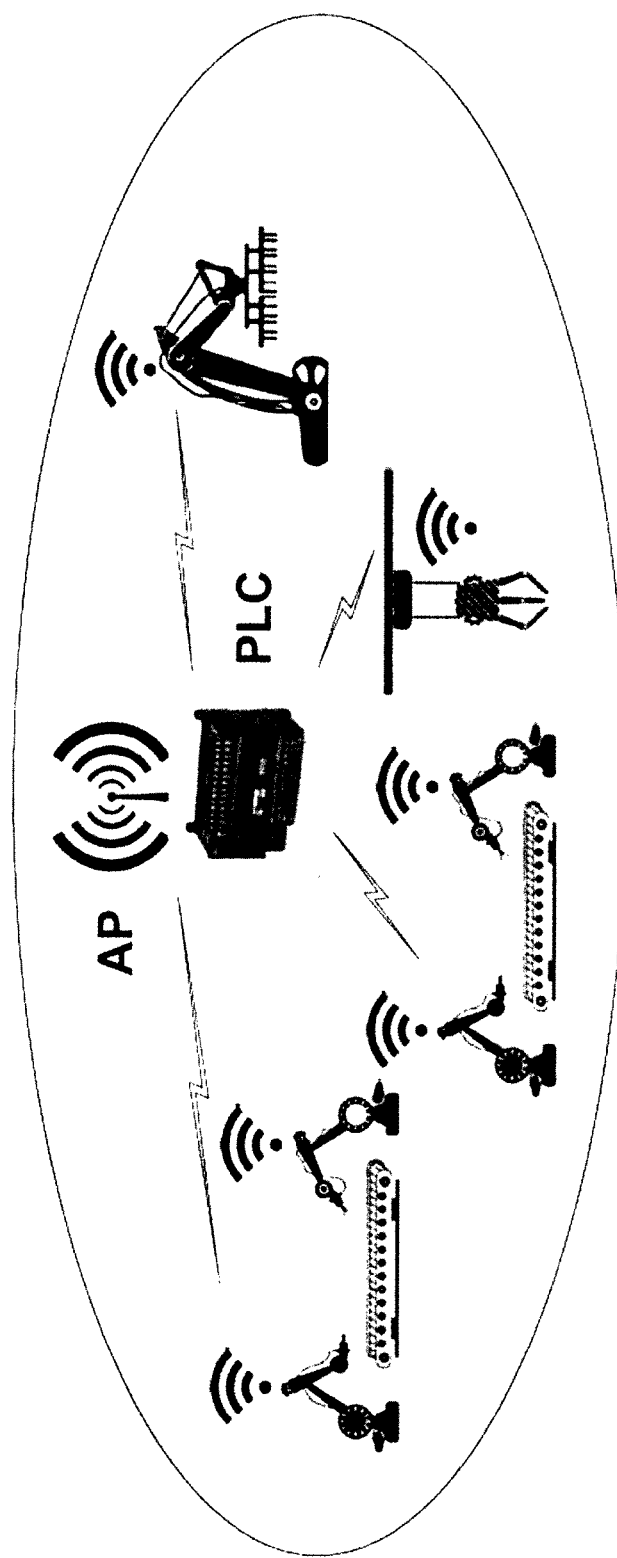
FIG. 11 shows a single-cell closed-loop network.

FIG. 11 shows a single-cell closed-loop network. In this scenario, a central access point is within communication range of each slave device (slave node) in the network. Accordingly, commands may be issued directed by the access point to any one or more of the slave devices. The chosen slave device(s) can then respond directly back to the access point.

In FIG. 11:
1. The ENCLOSE wireless access point (or base station) is connected to the automation system programmable logic controller (PLC).
2. The ENCLOSE access point is equipped with multiple antennas whereas the slave devices (sensors or actuators) are equipped with a single antenna only.
3. The ENCLOSE access point is capable of performing simultaneous transmission and reception in downlink and uplink.
4. In terms of protocol operation, downlink refers to communication from the access point to slave devices and uplink refers to communication from slave devices to the access point.

PHY Layer Design

The PHY layer of ENCLOSE is based on IEEE 802.15.1 specifications. However, ENCLOSE adopts an enhanced data rate (EDR) feature which was first released in Bluetooth core specifications version 2.0. The EDR feature uses a combination of Gaussian Frequency Shift Keying (GFSK) and Phase Shift Keying (PSK) with two variants: $\pi/4$-Differential Quadrature Phase Shift Keying (DQPSK) and 8-Differential Phase Shift Keying (DPSK). The EDR mode provides a nominal data rate of up to 2 Mbps and 3 Mbps when DQPSK and DPSK modulation techniques are used, respectively.

In other systems, the PHY layer data rate is limited to 1 Mbps which sets the ultimate bound on the timeslot duration for a certain payload. The EDR mode in ENCLOSE provides the possibility of further reducing the timeslot duration, and hence improving the latency of the system.

The ENCLOSE access point operates in the 2.4 GHz ISM band and utilises the entire the entire bandwidth of 80 MHz. The target cell radius is 5-50 meters and the transmission power is determined accordingly, based on the required signal-to-interference-plus-noise ratio (SINR).

MAC Layer Design

The MAC layer in ENCLOSE is based on TDMA, FDD, and frequency hopping (to be discussed later).

Figure 12:
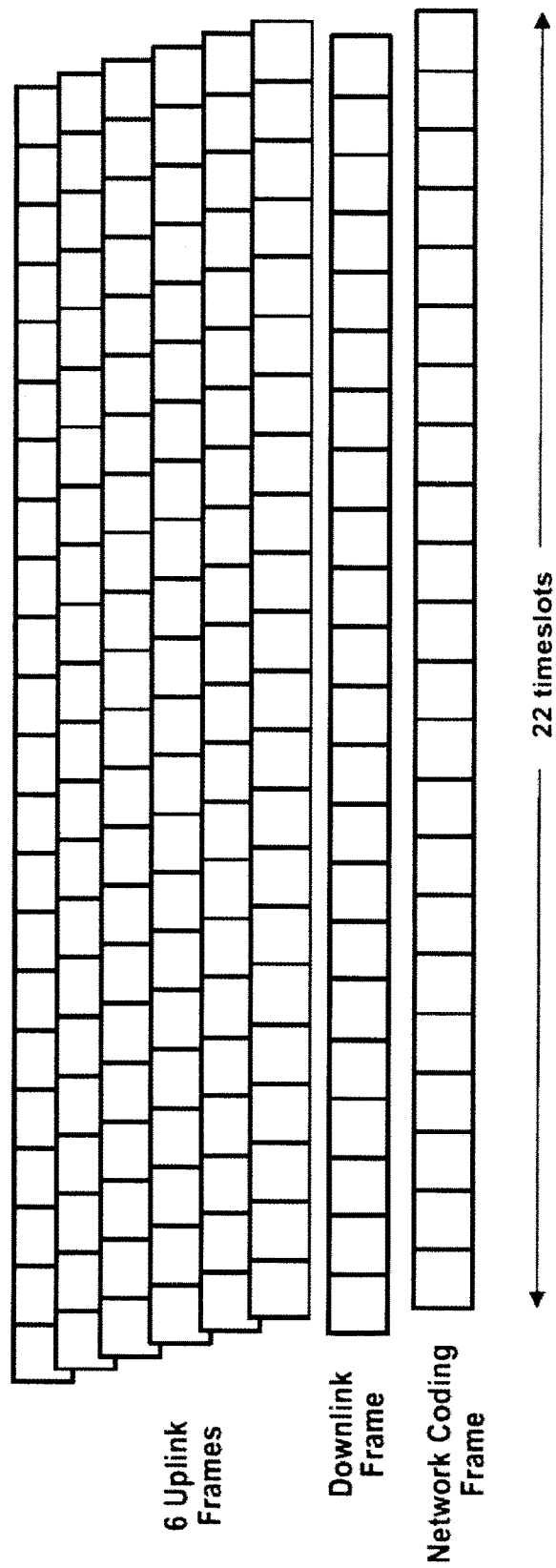
FIG. 12 shows the overall frame structure for ENCLOSE.

FIG. 12 shows the overall frame structure for ENCLOSE. The downlink frame is divided into 22 timeslots. Downlink transmissions are always scheduled, for synchronisation purposes. However, uplink transmissions only take place when a device has data to send. Similar to the downlink, the uplink frame is also divided into 22 timeslots. In both uplink and downlink, two timeslots per frame are reserved for synchronisation and frequency hopping related information. Each device can transmit in one of the 20 (useable) timeslots per frame. To support up to 120 devices per cell, each device is part of one of the 6 uplink groups. Each uplink group uses a separate frequency which is different from the frequency used in the downlink. In addition, there is a network coding frame which is used in both uplink and downlink, as discussed later. The network coding frame uses a frequency different from both the uplink and downlink frequencies. The eight frequencies hop synchronously at the frame boundary.

The duration of timeslot is dependent on the PHY layer data transmission rate and the amount of information to be sent. Table shows a comparison of minimum required timeslot duration for various net payload sizes. Note that the timeslot duration dictates the frame duration, and therefore, determines the end-to-end latency of the system.

TABLE 4

Comparison of timeslot duration

| Net Payload | Data Rate (ENCLOSE = 2, 3 Mbps) | | | Frame Size (ENCLOSE) | |
|---|---|---|---|---|---|
| | 1 Mbps | 2 Mbps | 3 Mbps | 2 Mbps | 3 Mbps |
| 8 Bytes | 64 µs | 32 µs | 21.33 µs | 0.70 ms | 0.47 ms |
| 16 Bytes | 128 µs | 64 µs | 42.67 µs | 1.41 ms | 0.94 ms |
| 24 Bytes | 192 µs | 96 µs | 64 µs | 2.11 ms | 1.41 ms |
| 32 Bytes | 256 µs | 128 µs | 85.33 µs | 2.81 ms | 1.88 ms |

The timeslot duration in other systems can be set to 64 µs which corresponds to a maximum net payload of 8 bytes. Out of these 8 bytes, only 1 byte is the sensor/actuator related information. In ENCLOSE, a reduction of timeslot duration is possible due to the incorporation of EDR which increases the data rate. Further, the net payload can be increased without incurring significant latency. The increase in net payload is beneficial for achieving ultra-reliability e.g., robust channel coding techniques can be employed or additional information related to multi-user diversity or multi-connectivity can be embedded.

Therefore, in ENCLOSE, a net payload of 16-24 bytes is targeted, which leads to a frame duration of 0.94-2.11 ms, depending on the achievable data rate at the PHY layer, as compared to a frame duration of 2.048 ms and 4.096 ms in WISA, for a net payload of 8 bytes and 16 bytes, respectively.

Figure 13:
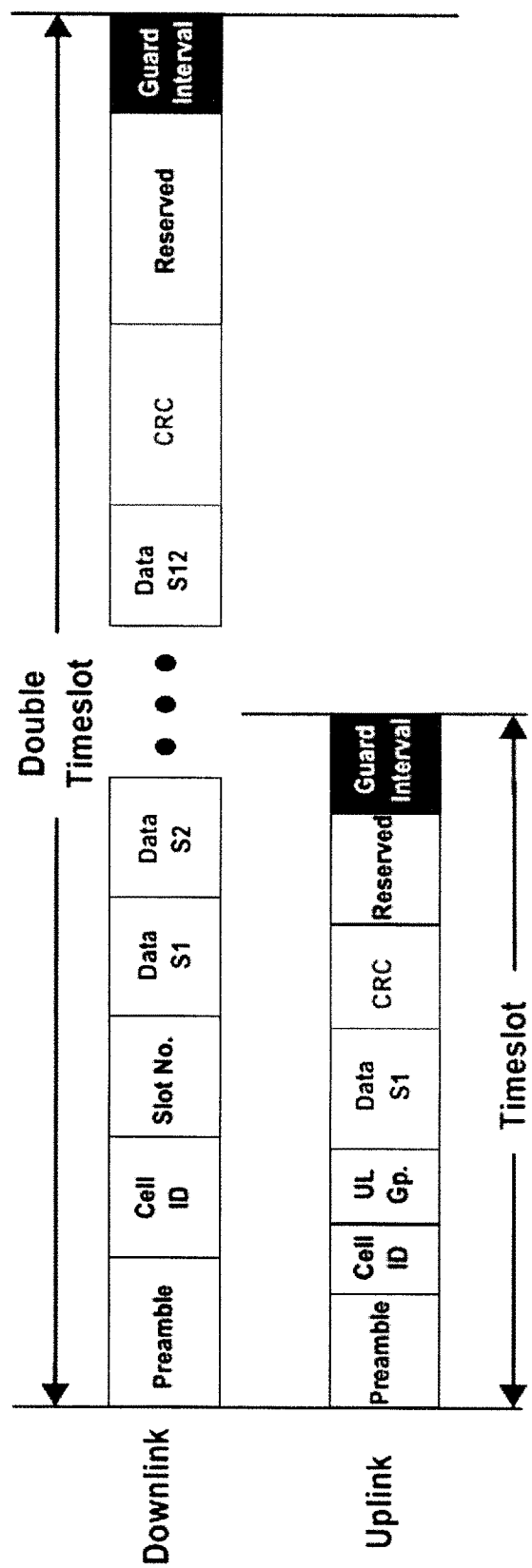
FIG. 13 shows the uplink and downlink slot structure in ENCLOSE.

FIG. 13 shows the uplink and downlink slot structure in ENCLOSE. In the downlink, the access point creates a double slot (by merging two single timeslots). The breakdown of (minimum) information contained within the double slot is as follows:

8/16-bit preamble and synchronisation information
2-bit cell-identifier
4-bit downlink slot number
12 byte data (for 12 devices)
32-bit cyclic redundancy check (for error detection)
8-bit guard interval
X-bit additional information (optional)

In the uplink, each device transmits data in one of its assigned (single) timeslots. The breakdown of (minimum) information contained within the uplink slot is as follows:

8/16-bit preamble and synchronisation information
2-bit cell-identifier
3-bit uplink group
2 byte data
32-bit cyclic redundancy check (for error detection)
8-bit guard interval
X-bit additional information (optional)

In the downlink, the additional information can also be used for addressing slave devices. Addressing of slave devices can become important if the controller sends unique commands to each device.

MAC Layer Operation

Closed-loop control algorithms are executed cyclically. The period of a control cycle is referred to as the cycle time, which is a characteristic measure in industrial automation. The cycle time is defined as the total time it takes for the controller to successfully transmit command signals to all the slave devices and receive the response from each slave device.

The MAC layer operation of ENCLOSE is split into two phases. In the first phase (Phase 1), downlink and uplink transmission takes places between the controller and the slave devices. In ENCLOSE, the downlink transmission is always active for the purpose of frame and slot synchronisation. Each double timeslot in the downlink contains data for up to 12 slave devices and therefore maps to 2 uplink timeslots per uplink frame. Each slave device transmits its data in one of the assigned uplink timeslots on one of the 6 uplink groups. The downlink and uplink frames are slightly staggered to allow for transmit and receive turnaround time. The ENCLOSE access point can implement any scheduling algorithm (e.g., round robin) to schedule downlink and uplink transmissions.

Cooperative Multi-User Diversity

Closed-loop control applications require very high reliability of up to 99.999% in terms of packet delivery ratio. Reliability of wireless technologies is often impaired by interference and multipath fading events which result in transmission failures. One approach overcome this issue is through MAC layer retransmissions. However, retransmissions are not helpful if the channel coherence time is larger than the transmission time, which is usually the case with low latency wireless solutions like ENCLOSE and WISA. Moreover, time diversity techniques incur additional latency.

Cooperative multi-user diversity is a key enabler for achieving the aforementioned target reliability. ENCLOSE adopts a novel approach to harvest cooperative multi-user diversity, in both uplink and downlink, based on different network coding techniques.

Normally, in a star topology, the controller and all the slave devices are within the communication range of each other. In order to achieve cooperative multi-user diversity, ENCLOSE requires different nodes to act as relays for nodes experiencing fading or interference, and hence require retransmission in uplink and/or downlink. The relay nodes are actually the nodes which have successfully decoded the downlink information from the controller or uplink information from the neighbouring nodes (since nodes listen to the medium when they are not transmitting).

By exploiting the relay nodes, a cooperative multi-user diversity gain is achieved which fulfils the requirements of a successful transmission at the receiving node. To enhance the performance gain. ENCLOSE integrates network coding with multi-user diversity technique. The basic idea behind network coding is to encode packets before transmission at a node.

The second phase (Phase 2) of MAC layer operation for ENCLOSE handles any transmission failures through multi-user diversity and network coding techniques, and is described as follows.

In the beginning of Phase 2, the access point sends a Group Acknowledgement (G-ACK) that contains information regarding which slave devices need to retransmit. The access point also sorts the slave devices requiring retransmission in a certain order. The G-ACK is sent on the first two useable slots (double slot) of the network coding frame.

The transmission failure in the uplink, as detected by the access point, can occur in two possible scenarios which must be distinguished.

Scenario 1: In the first scenario, an uplink transmission from a slave device failed after a successful downlink transmission from the access point.

Scenario 2: in the second scenario, an uplink transmission from a slave device failed due to a downlink failure i.e., the slave device didn't receive any command from the controller (access point).

In ENCLOSE, each slave device maintains an information list regarding M strongest neighbouring devices. The notion of proximity here is in terms of received signal-to-noise-ratio (SNR) at a slave device during uplink transmission. Having said this, alternative methods of measuring proximity or the strength of connection between two devices may be utilised. Such information is used by a node to determine its eligibility for acting as a relay after hearing the G-ACK from the access point.

Scenario 1

Figure 14:
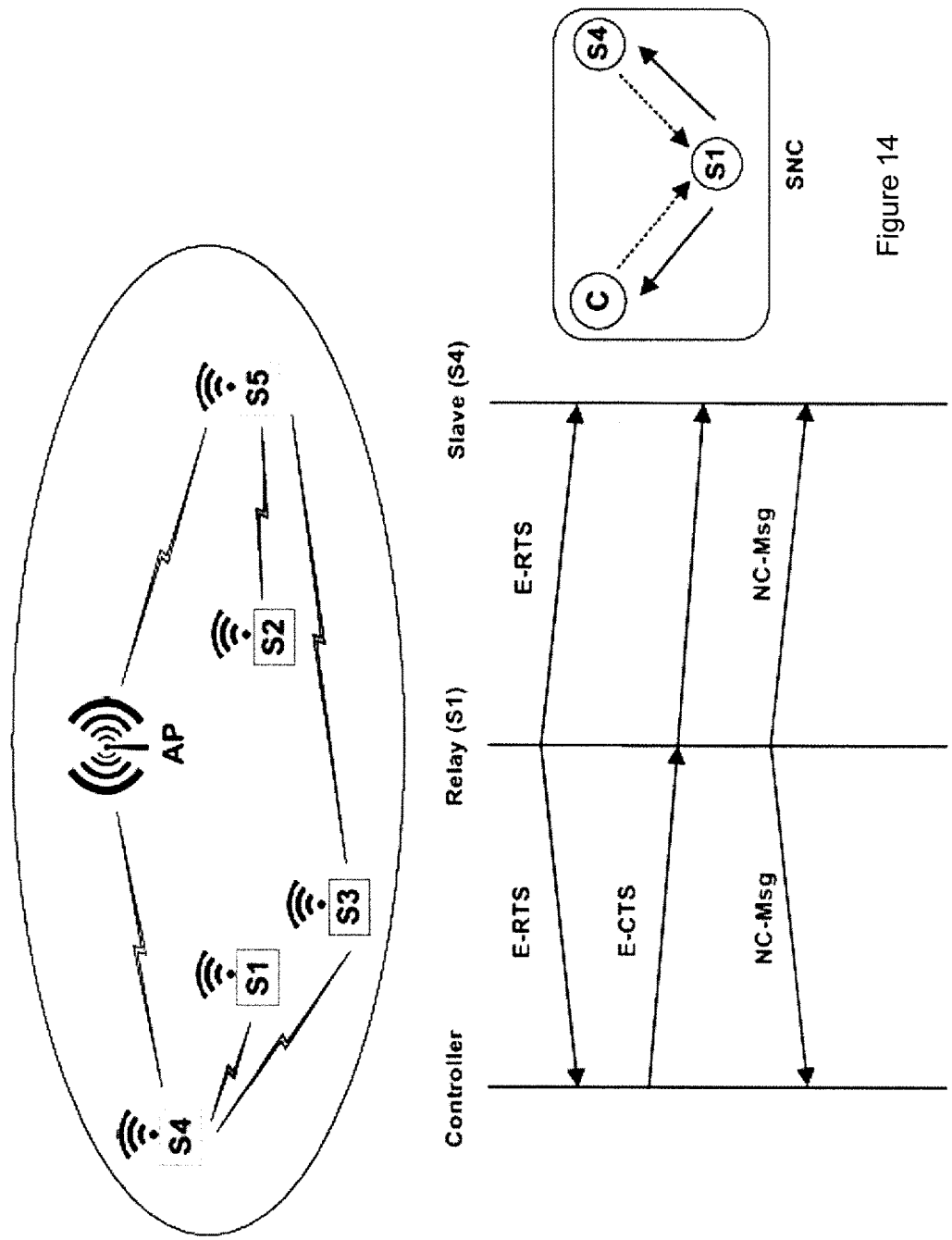
FIG. 14 shows a method of resolving retransmissions in the case of uplink transmission failure.

FIG. 14 shows a method of resolving retransmissions in the case of uplink transmission failure. Five slave devices (S1-S5) are connected to a central access point (AP). In the present case, the AP has transmitted in the downlink to each of slave devices S4 and S5 but the transmission from slave devices S4 and S5 failed in the uplink. The AP will issue a G-ACK specifying that transmissions are expected from S4 and S5. In this case. S4 precedes S5 in the G-ACK (S4 has priority).

After receiving the G-ACK from the access point, each slave device checks if any of the devices requiring retransmission is present in its neighbourhood information list. Consider that the uplink transmission from S4 was successfully decoded by neighbouring slave devices S1 and S3, with S1 receiving at a higher SNR than S3. Similarly, assume that the uplink transmission from S5 was successfully decoded by neighbouring slave devices S2 and S3, with S2 receiving at a higher SNR than S3. Further, the received SNR from S5 to S3 is lower than the received SNR from S4 to S3.

First the case of retransmission by S4 is considered. In this case both S1 and S3 can potentially act as relay nodes as S4 is the strongest neighbour, with a failed transmission, in their respective lists. However, S1 has priority over S3 as it received at a higher SNR. Such notion of priority could be realised through a priority timer based on received SNR.

In other words, priority may be determined based on the strength of the connection between the slave device that failed the transmission and the slave device that overheard the transmission. A priority timer may be assigned based on the strength of connection, wherein the length of the timer is inversely proportional to the strength of connection. This means that a slave device with a stronger connection will retransmit the signal first even though it has no knowledge of the relative priority (or relative strength of connection) of its neighbouring slave devices.

After receiving the G-ACK, the slave device S1 sends an E-RTS (ENCLOSE Request-to-Send) message, with the ID of S4, in the next timeslot on the network coding frame (after waiting for a period according to the priority timer, the length of the period being inversely proportional to the priority of the slave device). The E-RTS message notifies the access point that another slave device has successfully received the uplink transmission from S4. The access point responds back with an E-CTS (ENCLOSE Clear-to-Send) message in the same timeslot. Such E-RTS/E-CTS message exchange notifies other slave devices of an ongoing transmission and therefore, these devices refrain from transmitting for the duration advertised in E-RTS or E-CTS messages.

In the slot following the E-RTS/E-CTS exchange, the relay node (S1) sends a network-coded message (NC-M) to the controller and S4. Let $X_C$ denote the downlink command from the controller. Similarly, let $X_{S4}$ denote the uplink message from S4. Note that the relay node has successfully decoded $X_C$ and $X_{S4}$ in different downlink and uplink timeslots. Therefore, it creates $X_R = X_C \oplus X_{S4}$, where $\oplus$ denotes the XOR operation. Since the controller already knows $X_C$, it will decode $X_{S4}$ by performing $X_R \delta X_C$. Such realisation of network coding is termed as 'simple network coding' (SNC) and takes two timeslots to complete the operation. The retransmission procedure for slave device S5 can be described in a similar manner, with S2 acting as the relay node.

Scenario 2

Figure 15:
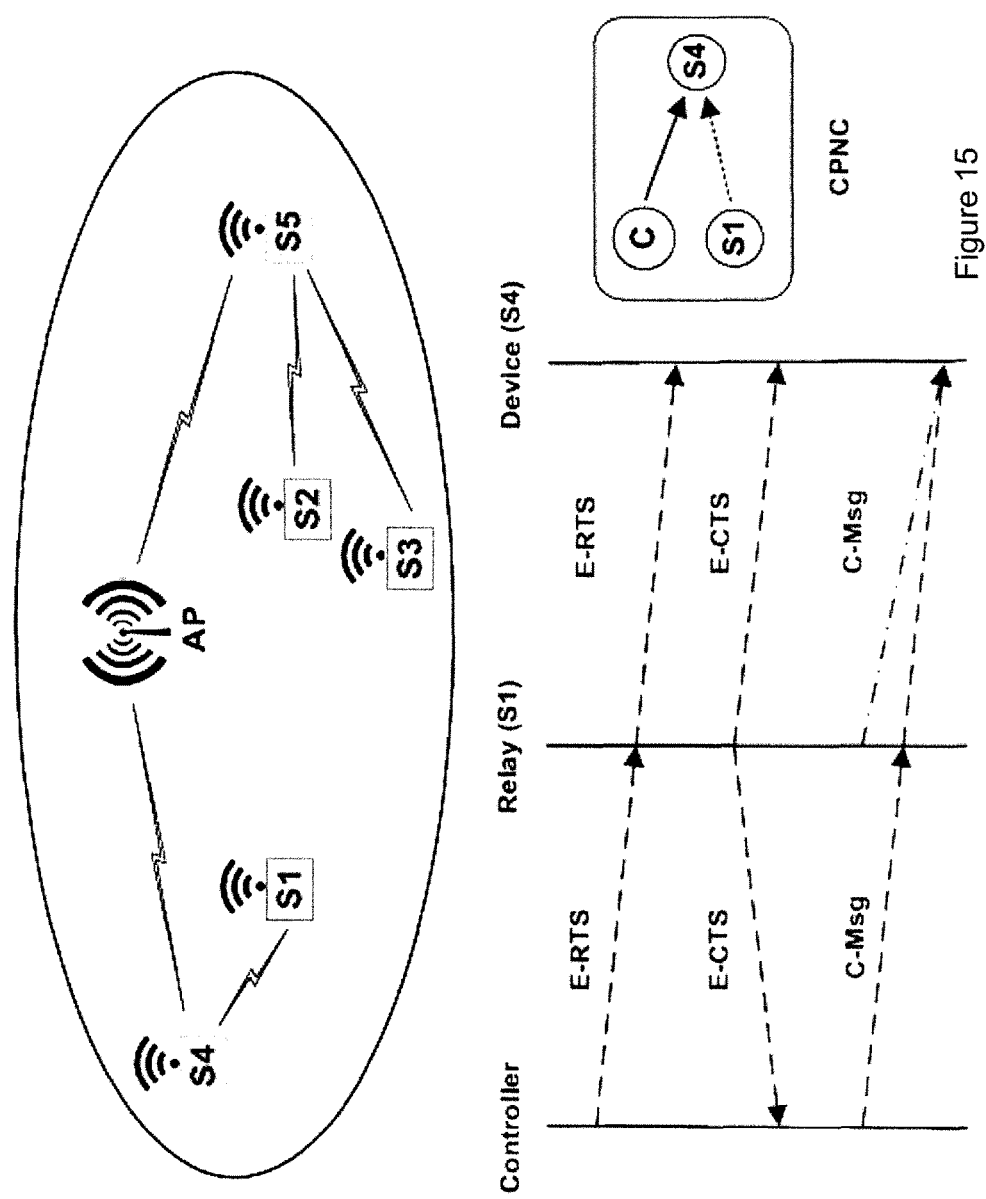
FIG. 15 shows a method of resolving retransmissions in the case of downlink transmission failure.

FIG. 15 shows a method of resolving retransmissions in the case of downlink transmission failure. In this case, the AP receives no uplink transmission from S4 as the downlink transmission to S4 failed (and therefore S4 does not know that it needs to respond). Again, the access point will issue a G-ACK stating that it expects S4 to respond. In the present case, the G-ACK assigns S4 the highest priority of any device for which an uplink transmission is required.

After sending the G-ACK, the access point sets a timeout period during which an E-RTS can be received from a potential relay node if a transmission from S4 had been overheard (scenario 1, discussed above). Since in this scenario, the uplink failed due to a downlink failure, no transmission from S4 will take place and therefore, no eligible node can act as a relay. After the set timeout period, the access point concludes that S4 did not receive the downlink correctly. Therefore, the access point must retransmit in the downlink.

In order to make the downlink transmission more robust, a cooperative approach is adopted. The access point selects a relay node for downlink transmission. The selection of a suitable relay node can be done based on received SNR during uplink transmission (in Phase 1).

The access point maintains a list of N strongest nodes in terms of SNR (or some other indicator of strength of connection). After selecting a relay node (which is assumed to be S1), the access point sends an E-RTS message, containing the ID of S4 and the destination address of the selected relay node (S1). This E-RTS message notifies S1 of acting as a relay node for S4. Therefore, S1 responds back with an E-CTS message.

In the timeslot following the E-RTS/E-CTS handshake, both access point and S1 simultaneously transmit the command signal $X_C$ to S4. The slave device S4 performs an XNOR operation (converse of XOR) on the combined received message $X_T=\overline{X_C \oplus X_C}$. The XNOR operation ensures that the received message is successfully decoded, only if both the access point and the relay node (S1) transmit the same message, and is discarded otherwise. Such realisation of network coding is termed as 'cooperative physical layer network coding' (CPNC) and takes two timeslots to complete the operation.

After successfully decoding downlink message from the controller, S4 transmits the corresponding uplink message. The uplink transmission can take place in the previously assigned timeslot on the allocated uplink group. If the assigned timeslot for S4 precedes the timeslot for E-RTS/E-CTS exchange, the access point will allocate a new timeslot (on one of the 6 uplink frames). Such information can be embedded into the E-RTS/E-CTS messages. Finally, it is important to mention that the access point can also select multiple relay nodes for downlink transmission.

The Phase 2 of MAC layer operation for ENCLOSE continues until all the devices requiring retransmission have been successful. In Scenario 1, there can be another possibility after the E-RTS/E-CTS exchange such that both S4 and S1 transmit $X_{S4}$ to the controller. This way the controller will receive the uplink transmission of S4 with a cooperative gain.

Format of Control Messages

The format of different control messages and the minimum information contained within each message is described as follows.

G-ACK
  2-bit cell-identifier
  3-bit message type
  210-bit message (IDs of up to 30 slave devices).
  32-bit cyclic redundancy check (for error detection)
  8-bit guard interval
  X-bit additional information (optional)
E-RTS/E-CTS
  2-bit cell-identifier
  3-bit message type
  7-bit destination address
  7-bit source address
  X-bit message (for network coding information)
  5-bit uplink slot number
  3-bit uplink frame group
  8-bit cyclic redundancy check (for error detection)
  8-bit guard interval
NC-M
  2-bit cell-identifier
  3-bit message type
  7-bit destination address 1
  7-bit destination address 2
  7-bit source address
  X-bit message (for network coding information)
  8-bit cyclic redundancy check (for error detection)
  8-bit guard interval Adaptive Frequency Hopping ENCLOSE adopts frame-by-frame frequency hopping to combat multipath fading and mitigate external interference. In ENCLOSE, an adaptive frequency hopping scheme is adopted which dynamically updates the list of available channels by identifying fixed sources of external interference. This helps improve performance in the presence of fixed external interferers like Wi-Fi systems.

The detailed design of frequency hopping sequences is described as follows. The available bandwidth of 80 MHz is partitioned into 8 sub-bands with each containing 10 channels of 1 MHz each. The channel allocated to an uplink or downlink transmission at any time is a function of allocated sub-band and the channel within the sub-band, and is translated into an actual frequency.

We design the frequency hopping sequence with the following objectives.

The uplink and downlink must have wide separation in frequency. Therefore, in ENCLOSE the duplex spacing is 4 sub-bands i.e., 40 MHz.

To reduce hardware complexity on the access point, the 6 uplink channels must belong to the same sub-band with adequate frequency separation.

The channel allocated to network coding must have wide separation from both uplink and downlink. Therefore, in ENCLOSE, the channel spacing for network coding frame is 20 MHz from both uplink and downlink channels.

In each cycle of transmission the channel frequencies are calculated as follows where the first and second terms correspond to sub-band and channel, respectively.

$$F_{DL}(k)=\{(k*1) \bmod 8, (k*1) \bmod 10\}$$

$$F_{UL}^1(k)=\{(k*1+4) \bmod 8, (k*1+1) \bmod 10\}$$

$$F_{UL}^1(k)=\{(k*1+4) \bmod 8, (k*1+2) \bmod 10\}$$

$$F_{UL}^1(k)=\{(k*1+4) \bmod 8, (k*1+3) \bmod 10\}$$

$$F_{UL}^1(k)=\{((k*1+4) \bmod 8, (k*1+5) \bmod 10\}$$

$$F_{UL}^1(k)=\{(k*1+4) \bmod 8, (k*1+6) \bmod 10\}$$

$$F_{UL}^1(k)=\{(k*1+4) \bmod 8, (k*1+8) \bmod 10\}$$

$$F_{NC}(k)=\{(k*1+2) \bmod 8, (k*RFN) \bmod 10\}$$

In above equations k denotes the transmission cycle and RFN denotes the retransmission frame number.

The ENCLOSE access point identifies interference by assessing the signal-to-interference-plus-noise ratio (SINR). At the beginning of each transmission cycle, the access point updates the list of available channels by blacklisting and excluding channels with poor SINR.

ENCLOSE: Performance Validation

The performance of ENCLOSE has been assessed through system-level simulation studies. A star topology scenario is generated wherein the access point is located at the origin and up to 120 slave devices are randomly distributed within the coverage radius of the access point. The channel model accounts for large-scale path loss, log-normal shadowing, and Rayleigh fading. Monte Carlo simulations have been performed and the performance of ENCLOSE has been evaluated in different scenarios.

Figure 16:
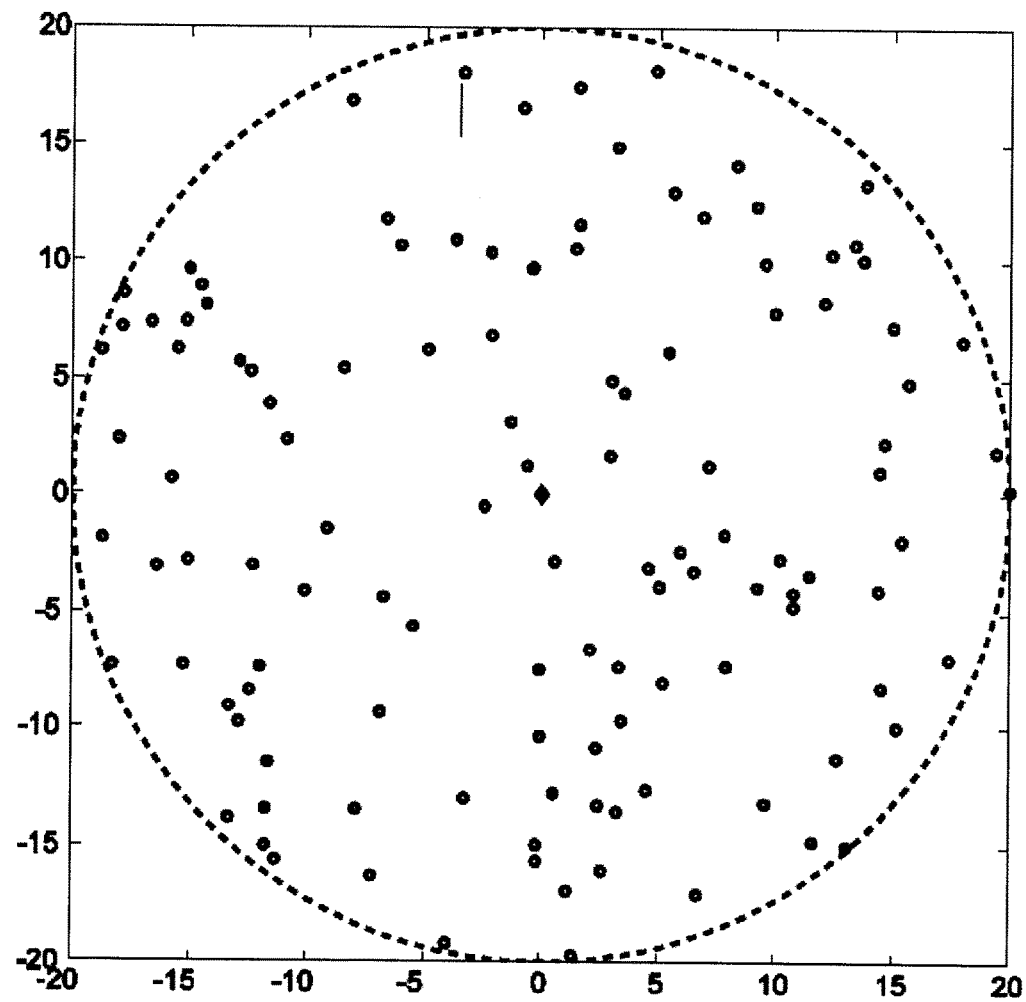
FIG. 16 shows an illustration of a simulated topology.

FIG. 16 shows an illustration of a simulated topology. The access point is shown as a diamond in the centre of the network. Slave nodes (shown as circles) are distributed randomly around the access point, within communication range of the access point.

The reliability of ENCLOSE was evaluated in terms of packet delivery ratio (PDR) and benchmark it against an alternative system termed WISA (Wireless Interface for Sensors and Actuators).

Figure 17:
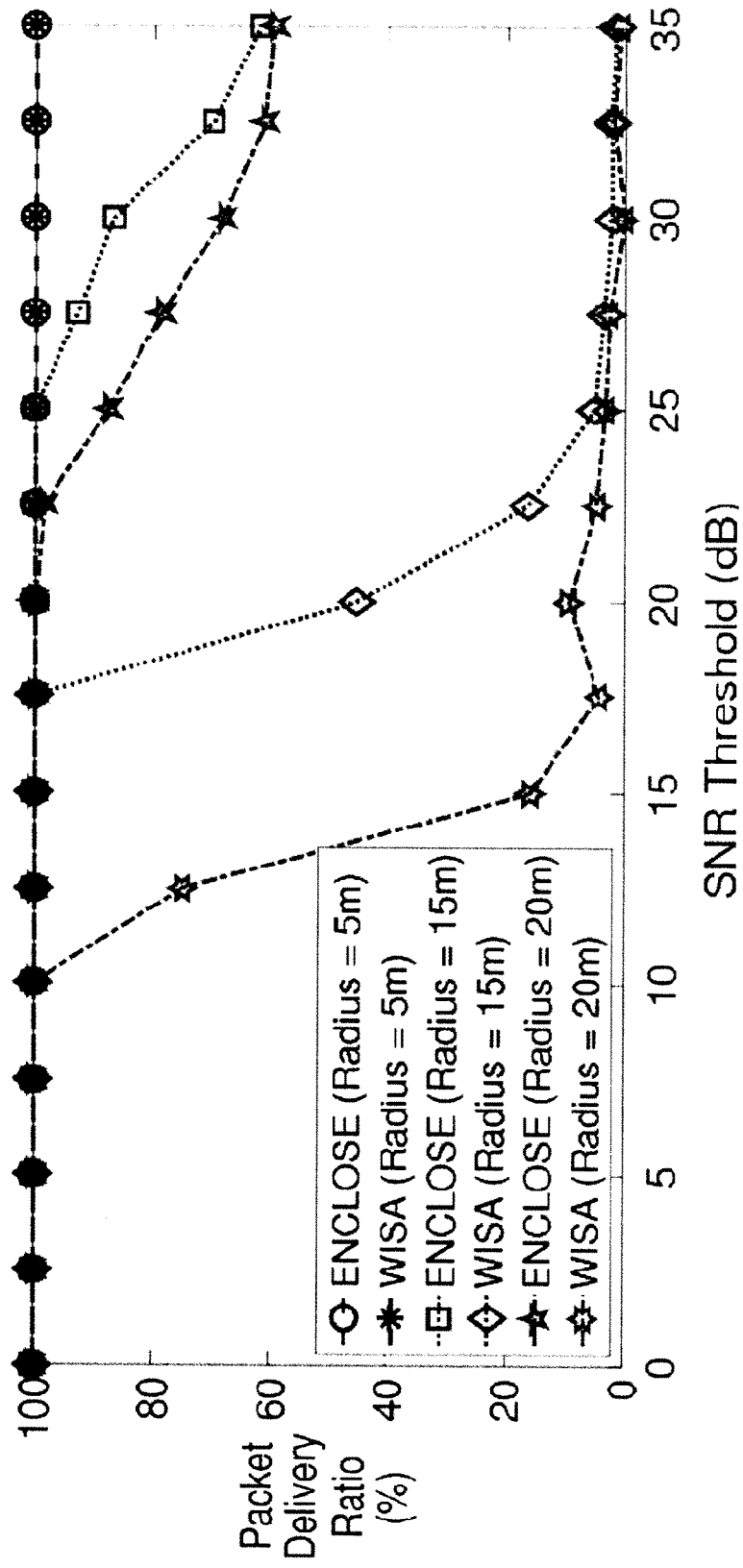
FIG. 17 shows the PDR against SNR threshold for ENCLOSE and WISA at various cell radii.

FIG. 17 shows the PDR against SNR threshold for ENCLOSE and WISA at various cell radii. The SNR threshold represents the minimum required SNR for a transmission to be successful. A fixed transmission power of 3 dBm is utilised for the access point and 2 dBm for slave devices.

The SNR computation accounts for distance-dependent path loss, fixed 8 dB loss arising due to shadowing, mean 10 dB loss due to interference, and fixed noise power of −114 dBm/Hz (channel bandwidth=1 MHz). For a cell radius of 5 meters, both ENCLOSE and WISA provide a PDR of 100% for a threshold SNR of up to 35 dB. However, WISA experiences a sharp degradation in PDR performance as the cell radius is increased and the SNR requirements become stringent. For a cell radius of 15 meters, ENCLOSE provides a PDR of 100% for up to 25 dB SNR. On the other hand, WISA provides a PDR of 100% for up to 17 dB SNR only. Similarly, for a cell radius of 20 meters, ENCLOSE provides a PDR of 100% for up to 22 dB SNR. However, WISA provides a PDR of 100% for only up to 10 dB SNR. The PDR performance evaluation reveals that ENCLOSE is capable of providing much higher coverage. In addition, ENCLOSE meets significantly higher SNR requirements and therefore. Is much more robust in poor wireless environments.

Next, the latency of ENCLOSE is evaluated in different scenarios.

Figure 18:
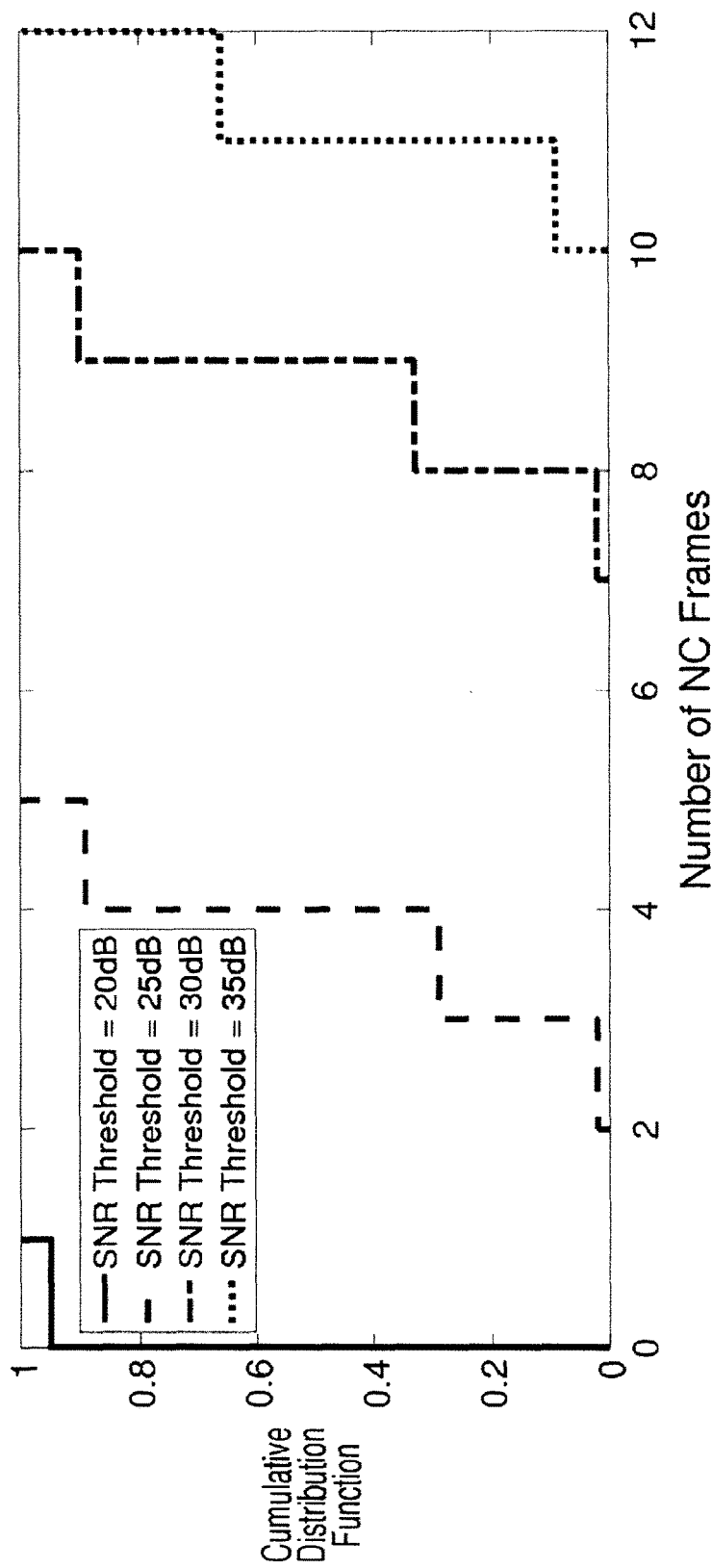
FIG. 18 shows the number of required NC frames for ENCLOSE for different values of threshold SNR.

FIG. 18 shows the number of required NC frames for ENCLOSE for different values of threshold SNR. For a SNR threshold of 20 dB, ENCLOSE only requires 1 NC frame. For much stringent SNR requirement of 25 dB, ENCLOSE requires 2-5 NC frames. Under extremely poor wireless conditions, where the SNR requirement is more than 25 dB, ENCLOSE requires 7-12 NC frames.

Since the timeslot size and frame size are dependent on the design of PHY layer and maximum payload size, the bounds on latency are evaluated for different scenarios.

Figure 19:
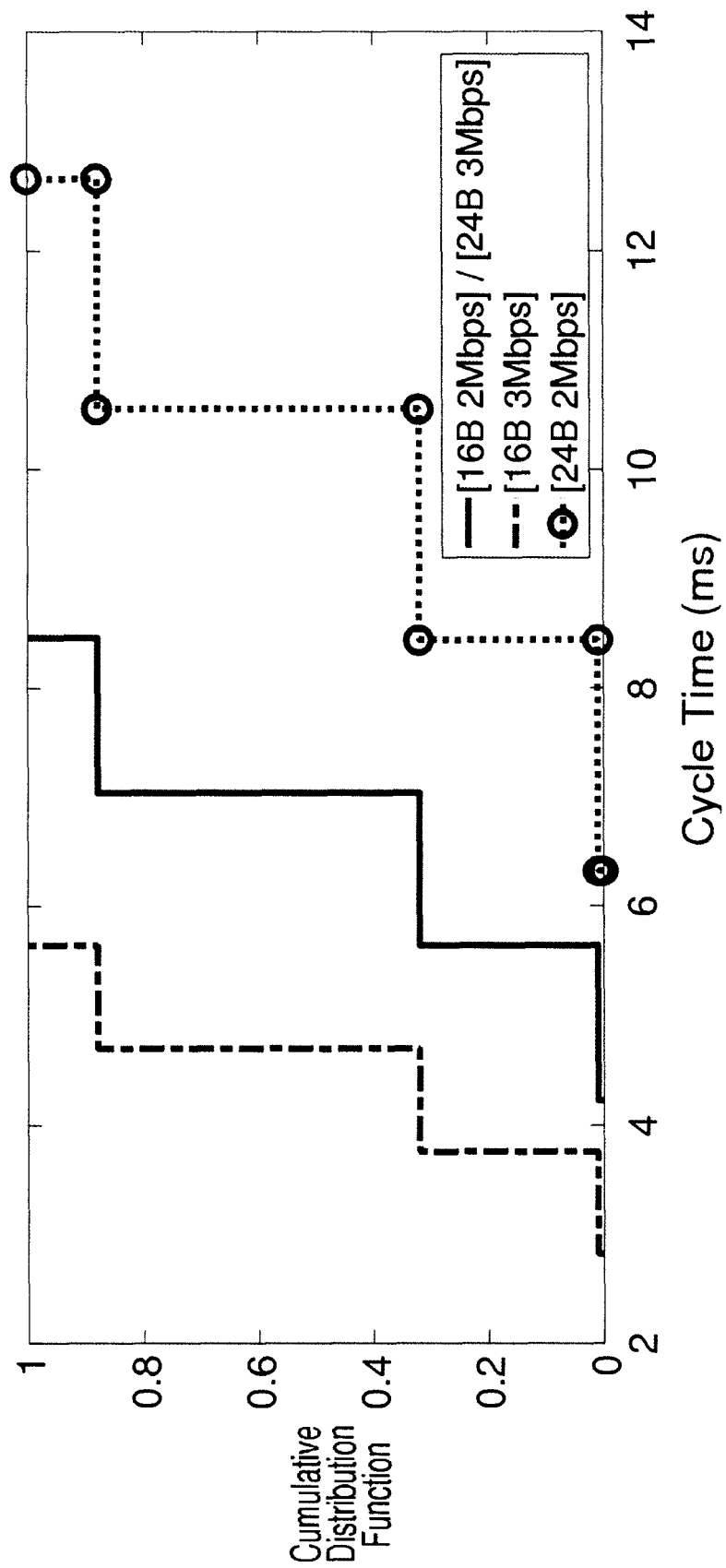
FIG. 19 shows the how the cycle time of ENCLOSE varies for various payload sizes and physical layer designs.

FIG. 19 shows the how the cycle time of ENCLOSE varies for various payload sizes and physical layer designs. In this case, the threshold SNR is set to 25 dB. Results show that ENCLOSE incurs a minimum cycle time of 3-5 ms for 16 bytes payload per timeslot and 3 Mbps PHY layer design. For a similar payload size at 2 Mbps PHY layer design, ENCLOSE incurs a latency of 4.25-8.5 ms. A similar performance is achieved if 24 bytes of payload is sent through a 3 Mbps PHY layer design. Further, the latency exceeds 10 ms if 24 bytes of payload are sent through a 2 Mbps PHY layer design.

Closed Loop Control Scheduling in Mesh Topologies

Arrangements described herein provide a novel wireless solution, termed as GALLOP (GenerAlised cLosed-Loop cOntrol in Process automation), for closed-loop control in mesh topology environments such as process automation. GALLOP adopts a Physical (PHY) layer based on IEEE 802.15.1 specifications.

Arrangements are based on specialised medium access control (MAC) protocol, utilising time division multiple access (TDMA), frequency division duplexing (FDD), and bi-directional multi-hop scheduling algorithms, which guarantee closed-loop operation within the required latency and scalability bounds. In order to achieve the required reliability requirements, GALLOP implements channel hopping and a novel multi-user diversity technique based on network coding. Last, but not the least, GALLOP is amenable to channel coding and multi-connectivity enhancements, which are key enablers for achieving ultra-high reliability.

Bi-directional TDMA scheduling is possible for underwater acoustic sensor networks. As such networks long propagation delays and low available bandwidth, it is possible for two nodes to transmit to each other at the same time and rely on the propagation delay to allow the message from the other node to be received in a subsequent timeslot. Such a method is extendible to traditional wireless sensor and actuator networks, however, as it relies on a large transmission delay between nodes. Moreover, such a method is not suitable for closed-loop operation due as the large transmission delay times would cause an unduly long cycle time.

Bi-directional communication is also possible via time division duplexing (TDD). The uplink and downlink communications may be divided into different phases. To achieve high reliability, cooperative communications may be utilised, wherein multiple nodes relay data that they receive. Timeslots for transmission are divided evenly between the nodes. Each node may listen for transmissions during all timeslots and, during its timeslot for transmission, transmit any messages that it has overheard.

This method implements TDD and varies the frame size based on the number of nodes being scheduled. Accordingly, it is not suitable for implementation in TDMA scheduling, which requires fixed-length frames. The performance of such a method degrades sharply with the density of nodes in the network. In addition, the variable frame size makes it unsuitable for closed-loop control for instance, in factory/process automation scenarios.

Arrangements described herein utilise GALLOP, which has been designed specifically for closed-loop control operation in mesh topology environments. The key features of GALLOP are stated as follows.

a. Enhanced physical (PHY) layer—PHY layer design has a major impact on achievable latency of any communication protocol. GALLOP adopts a PHY layer based on 802.15.1 specifications with an enhanced data rate (EDR) feature. This allows optimisation of the MAC frame structure subject to the aforementioned envisioned latency requirements.

b. Bi-directional scheduling—Closed-loop control algorithms are executed cyclically. The 'cycle-time' is a characteristic measure in industrial automation. Moreover, closed-loop operation involves bi-directional flow of messages. Hence, joint design of uplink/downlink becomes important GALLOP has been specifically designed to tackle the peculiarities of closed-loop control. In order to achieve closed-loop operation, GALLOP implements novel bi-directional multi-hop TDMA scheduling algorithms, in both centralised and distributed manner. The scheduling algorithms have been designed to minimise end-to-end latency while providing very high reliability.

c. Cooperative multi-user diversity—Cooperative multi-user diversity is a key enabler for achieving very high reliability. GALLOP adopts a novel approach to harness cooperative multi-user diversity in both uplink and downlink in a multi-hop network.

d. Opportunistic network coding—Network coding is another key enabler for achieving low latency and high reliability in wireless communications. GALLOP exploits the opportunities for network coding in both uplink and downlink.

e. Frequency hopping—Frequency hopping is crucial in mitigating multipath fading and external interference. GALLOP adopts frequency hopping in the form of channel hopping at timeslot and frame levels.

GALLOP: System Design and Protocol Operation

The system design and protocol operation for arrangements are described as follows.

The scenario is considered where the access point handles the operation of multiple slave devices (sensors or actuators) in a multi-hop manner. Arrangements utilise uplink scheduling similar to the DeAMON system described above, and retransmission scheduling adapted from the ENCLOSE system described above.

Figure 20:
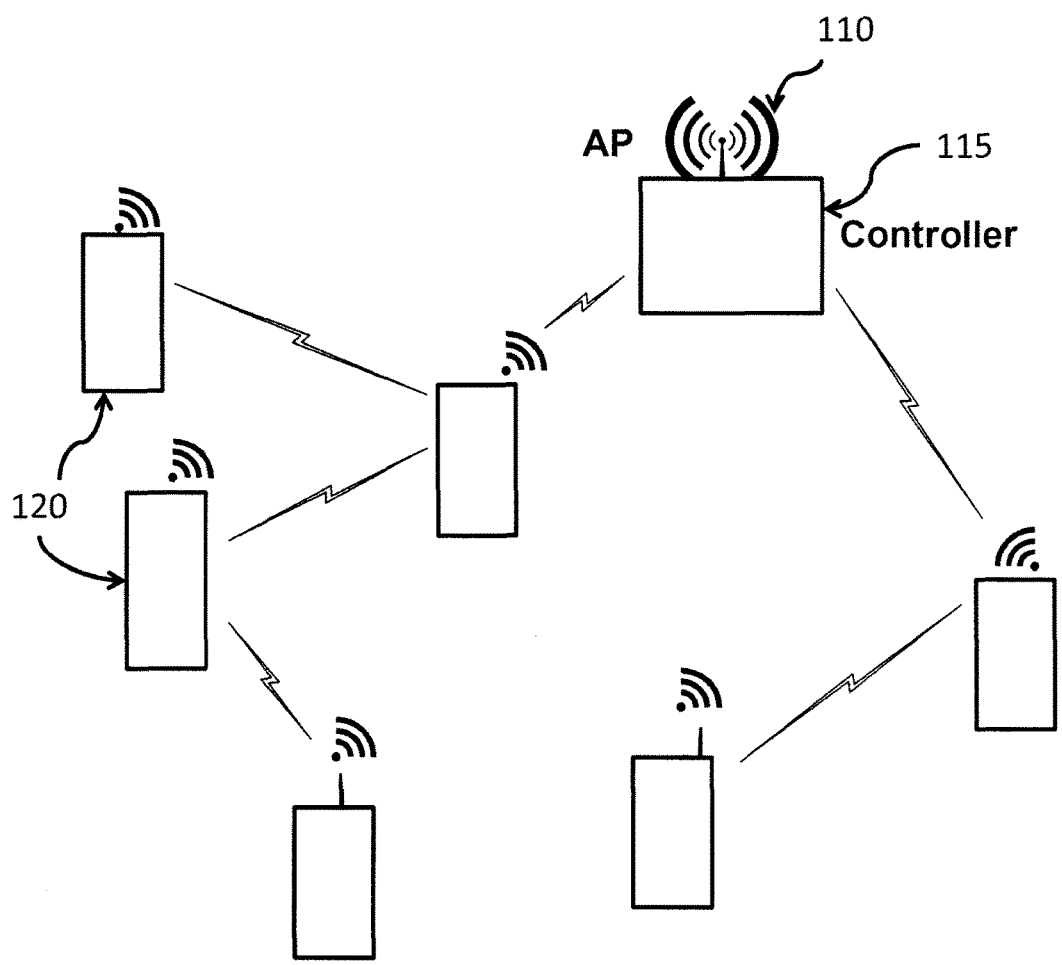
FIG. 20 shows a network according to an arrangement.

FIG. 20 shows a network according to an arrangement. The network comprises a wireless access point 110 and a number of slave devices 120. The wireless access point 110 is connected to a system controller 115. Each of the access point 110 and the slave devices 120 are equipped with a single antenna only.

Each of the access point 110 and the slave devices 120 is a node within the network. Each node is able to communicate wirelessly with other nodes within its transmission range. Each node is assigned its own unique node identifier (node ID). In one arrangement, the node ID increases monotonically from the access point out to leaf nodes (the nodes at the outer edge of the wireless network).

The wireless access point 110 (AP) (also known as a base station or station) connects wirelessly to nearby slave devices 120 (such as sensors or actuators). As the network is a multi-hop network, messages are forwarded on by the nearby slave devices 120 to slave devices 120 that are located further away from the access point 110. Each transmission between nodes is considered a "hop". Accordingly, messages can pass through the network by "hopping" between nodes until they reach their ultimate destination.

Each slave device 120 (node) has 1-hop neighbourhood information. That is, each slave device 120 stores information identifying the other slave devices that are within communication range of the slave device 120. Each device can determine its respective 1-hop neighbourhood information through passive listening to transmissions from neighbouring devices.

In terms of protocol operation, downlink refers to communication from the access point 110 to slave devices 120 (communications travelling away from the access point) and uplink refers to communication from slave devices 120 towards the access point 110 (communications travelling towards the access point).

PHY Layer Design

The PHY layer is based on IEEE 802.15.1 (Bluetooth) specifications and an enhanced data rate (EDR) feature which was first released in Bluetooth core specifications version 2.0. The EDR feature uses a combination of Gaussian Frequency Shift Keying (GFSK) and Phase Shift Keying (PSK) with two variants: π/4-Differential Quadrature Phase Shift Keying (DQPSK) and 8-Differential Phase Shift Keying (DPSK).

The EDR mode provides a nominal data rate of up to 2 Mbps and 3 Mbps when DQPSK and DPSK modulation techniques are used, respectively. Utilising EDR mode in arrangements provides the possibility of reducing the timeslot duration and therefore improving the latency of the system. In one arrangement the access point operates in the 2.4 GHz ISM band and utilises the entire bandwidth of 80 MHz.

MAC Layer Design

The MAC layer is based on TDMA, frequency division duplexing (FDD), and frequency hopping (to be discussed later). We assume a fixed number of uplink and downlink channels of 1 MHz each. Each channel corresponds to a MAC frame, which has a fixed number of timeslots. In addition to uplink and downlink channels, we assume a fixed number of signalling and network coding channels. The duration of the timeslots is dependent on the PHY layer data transmission rate and the amount of information to be sent.

Table 5 shows a comparison of minimum required timeslot duration for various net payload sizes. Note that the timeslot duration dictates the frame duration, and therefore, determines the end-to-end latency of the system.

TABLE 5

Comparison of timeslot duration

| Net Payload | Data Rate (Basic = 1 Mbps, GALLOP = 2, 3 Mbps) | | |
| --- | --- | --- | --- |
| | 1 Mbps | 2 Mbps | 3 Mbps |
| 8 Bytes | 64 µs | 32 µs | 21.33 µs |
| 16 Bytes | 128 µs | 64 µs | 42.67 µs |
| 24 Bytes | 192 µs | 96 µs | 64 µs |
| 32 Bytes | 256 µs | 128 µs | 85.33 µs |

MAC Layer Operation

Closed-loop control involves control signals being sent to the slave device and feedback signals to being passed back from the slave device to the controller. Closed-loop control algorithms are executed cyclically. The period of a control cycle is referred to as the cycle time, which is a characteristic measure in industrial automation. The cycle time is defined as the total time it takes for the controller to successfully transmit command signals to all the slave devices and receive a response back from each slave device.

In order to support closed-loop control functionality, two different arrangements for bi-directional scheduling are proposed: (i) a centralised method; and (ii) a distributed method.

Centralised Bi-Directional Scheduling

In the case of centralised scheduling, the controller has global knowledge of the network topology.

Figure 21:
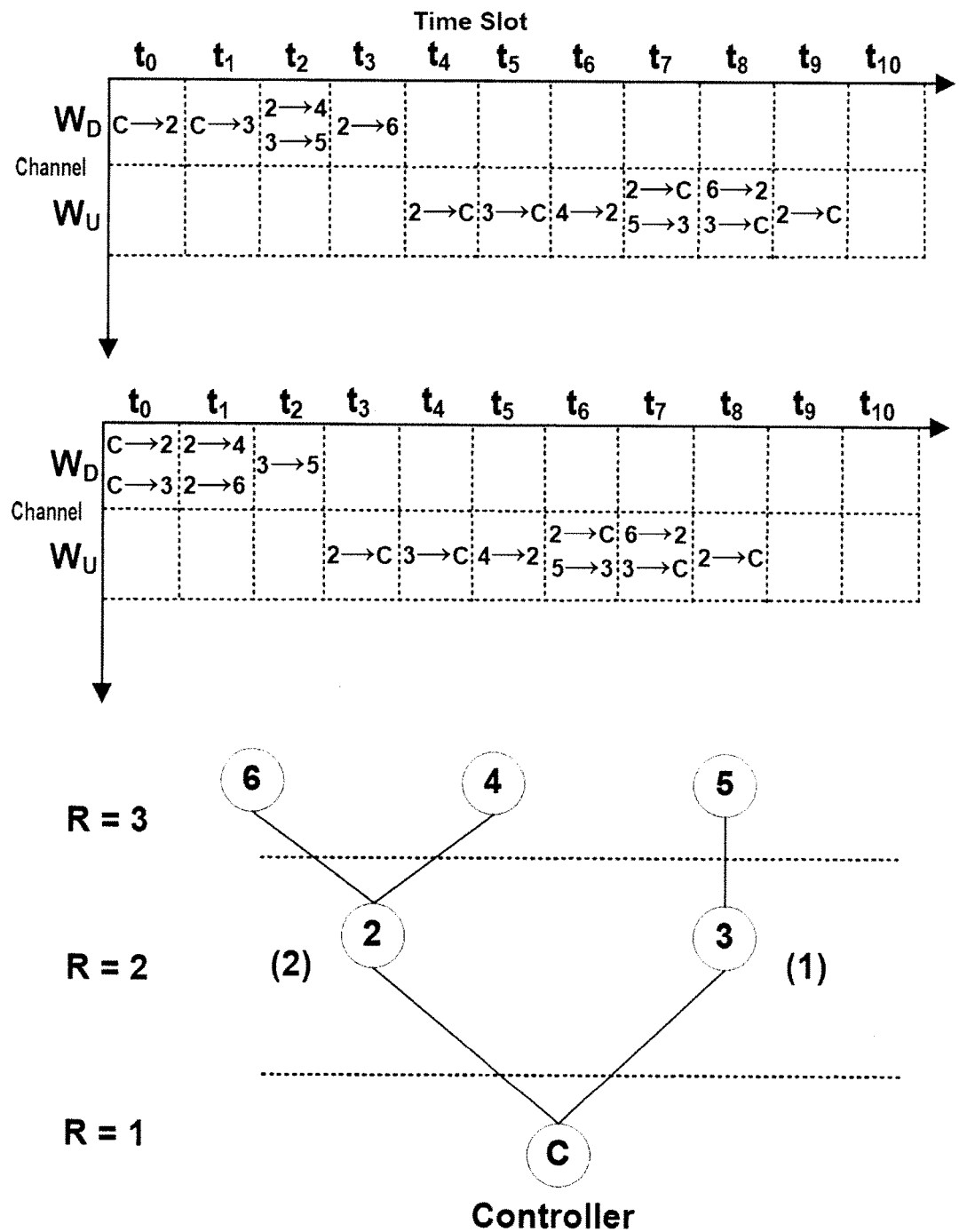
FIG. 21 provides an illustration of centralised bi-directional scheduling according to an arrangement.

FIG. 21 provides an illustration of centralised bi-directional scheduling according to an arrangement. The network topology shown in the bottom of FIG. 21 and the uplink and downlink schedules are shown in the top of FIG. 21.

Each node is assigned a unique node ID. In one arrangement the node ID is assigned based on distance from the control node, with closer nodes being assigned lower node IDs. The node ID assignment may be performed during initialisation of the network. For instance, the control node may send out a message to request all nodes in the network to report back to it with a request for a node ID. The controller then sets node IDs on a first-come-first-served basis, with the first nodes to respond being given the lowest node IDs. As the closest nodes will respond quicker (as messages to the control node need to be relayed through a smaller number of nodes), the closest nodes will be assigned lower node IDs A random back-off will be performed for nodes that respond at the same time in order to resolve any conflicts.

The network includes six nodes: a control node (C) and five slave devices (2-6). The network is divided up into layers or ranks (R) based on the minimum hop distance of the nodes to the control node.

The control node occupies the first layer. Nodes 2 and 3 are within communication distance of the control node. Their minimum hop distance to the control node is therefore one. Nodes two and three therefore occupy the second layer.

Nodes 4 and 6 are within communication distance of node 2, whilst node 5 is in communication distance with node 3. Accordingly, nodes 4, 5 and 6 occupy the third layer as they are two hops away from the control node (any messages need to be relayed to via either node 2 or node 3).

The network therefore has the following 1-hop neighbourhood information:
Node C: [2, 3]
Node 2: [C, 4, 6]
Node 3: [C, 5]
Node 4: [2, 6]
Node 5: [3]
Node 6: [2, 4]

Nodes that are downlink of a given node and are within communication to the given node are referred to as "child nodes". The given node is the "parent node" to the child nodes.

In the centralised scheduling mechanism of the present arrangement, the schedule is determined centrally based on knowledge of the overall network topology. The schedule may be determined by a controller in the control node, or by a controller connected to the control node.

The controller that performs scheduling is aware of the network topology. This may be stored in the form of the 1-hop neighbourhood information for each node. The topology information may be predefined, or may be determined during an initialisation step in which each node determines its 1-hop neighbours and reports this to the controller.

Two different cases are distinguished for centralised scheduling, depending on the control information.

Case 1: In the first case, the controller has a single command message for all the nodes in the network Case 2: In the second case, the controller has distinct command messages for all the nodes in the network.

Case 1

The main objective of the scheduler is to minimise the cycle time. The controller first schedules the downlink information (command messages), on a downlink channel ($W_0$) in a sequential manner (starting from the control node and working out).

The controller schedules the downlink channel sequentially, moving from the control node outwards. The controller therefore schedules the downlink channel in order of distance from the control node, or at least, the hop-distance from the control node, with the control node being scheduled first, then the nodes in the second layer, then the nodes in the third layer, and so on.

In one arrangement, the nodes are scheduled in the order of their node ID. As discussed above, the node ID may be assigned based on the distance from the control node.

Moreover, the controller parallelises non-conflicting transmissions, in order to reduce cycle time. Non-conflicting transmissions may be transmissions that are outside of communication range from each other, or that operate on different channels. For instance, the uplink and downlink transmissions may be transmitted on different frequency channels. Each of the uplink and downlink channels may be split into multiple frequency channels to allow for parallelisation of neighbouring transmissions.

In the present scenario, the first timeslot ($t_0$) is assigned to transmission between the control node and node 2 (as the second node has the lowest node ID). The second timeslot ($t_1$) is assigned to transmissions from the control node to node 3. Third timeslot ($t_3$) is assigned to transmissions from node 2 to node new for and from node 3 to node 5. These simultaneous transmissions may occur as node 3 and node 5 are outside of communication distance from node 2 and node 4. Finally, the fourth timeslot ($t_3$) is assigned to a transmission from node 2 to node 6. The downlink schedule in this case occupies four timeslots.

After scheduling the downlink information, the controller begins to schedule the uplink on an uplink channel ($W_U$).

During uplink scheduling, the controller aims to minimise the timeslot difference, denoted by $\nabla$, between the downlink transmission to a given node and uplink transmission from the given node. This is done to ensure minimum possible delay for the controller to receive the response from node after sending the command message.

For example, node 2 has priority in uplink scheduling as it was the first scheduled node in the downlink. Similar to the downlink, the controller parallelises non-conflicting transmissions, in order to reduce cycle time. In this case, the overall cycle time is equal to 10 timeslots.

Figure 22:
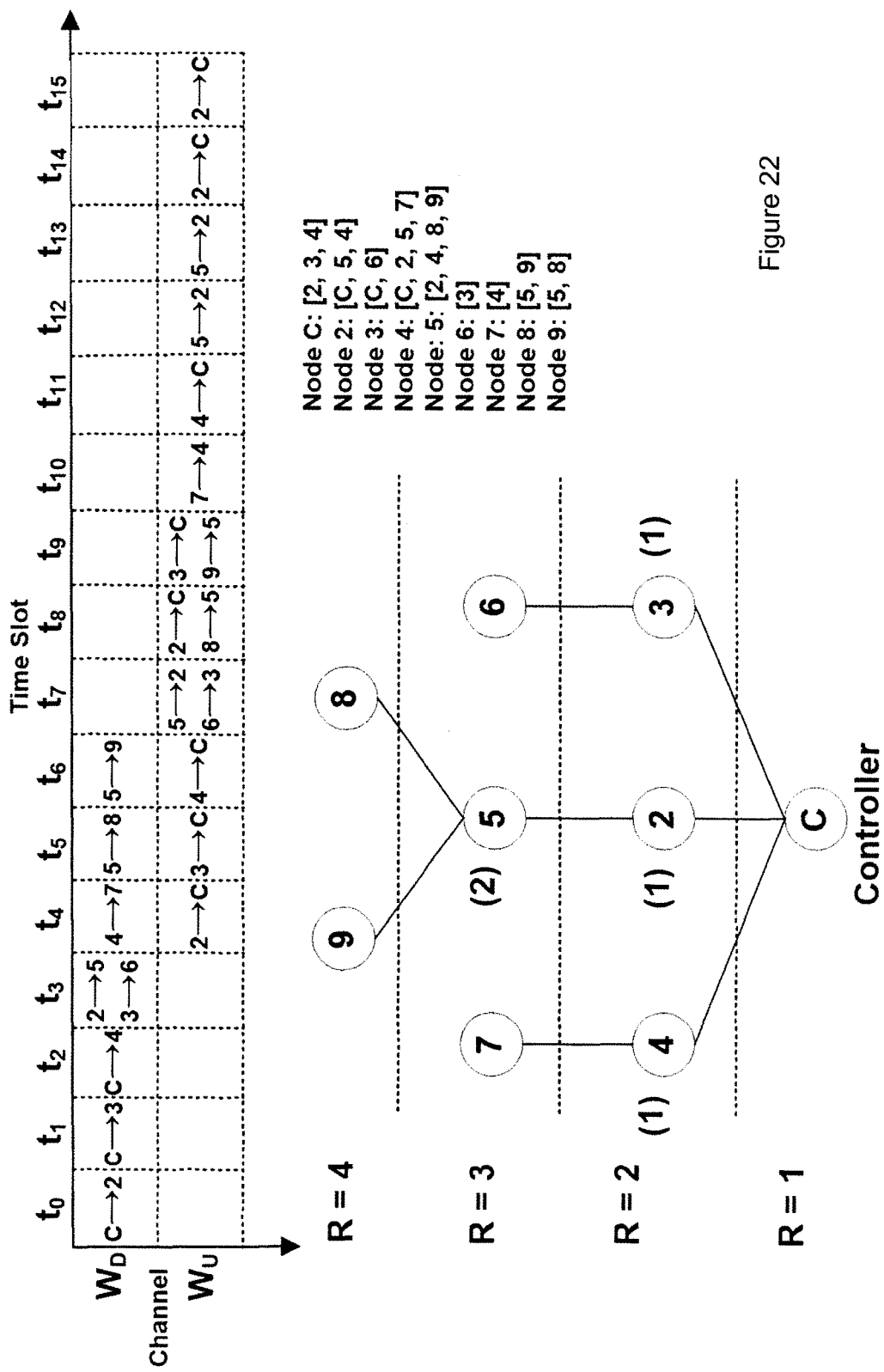
FIG. 22 shows a built schedule for a larger topology.

FIG. 22 shows a built schedule for a larger topology. In this case, the cycle time is equal to 16 timeslots. In this topology, the control node has three child nodes (nodes 2, 3 and 4). Each of these has one child node (nodes 5, 6 and 7 respectively). One of these has two child nodes (nodes 8 and 9).

A pseudocode for centralised bi-directional scheduling is given in Table 6.

TABLE 6

Figure 23:
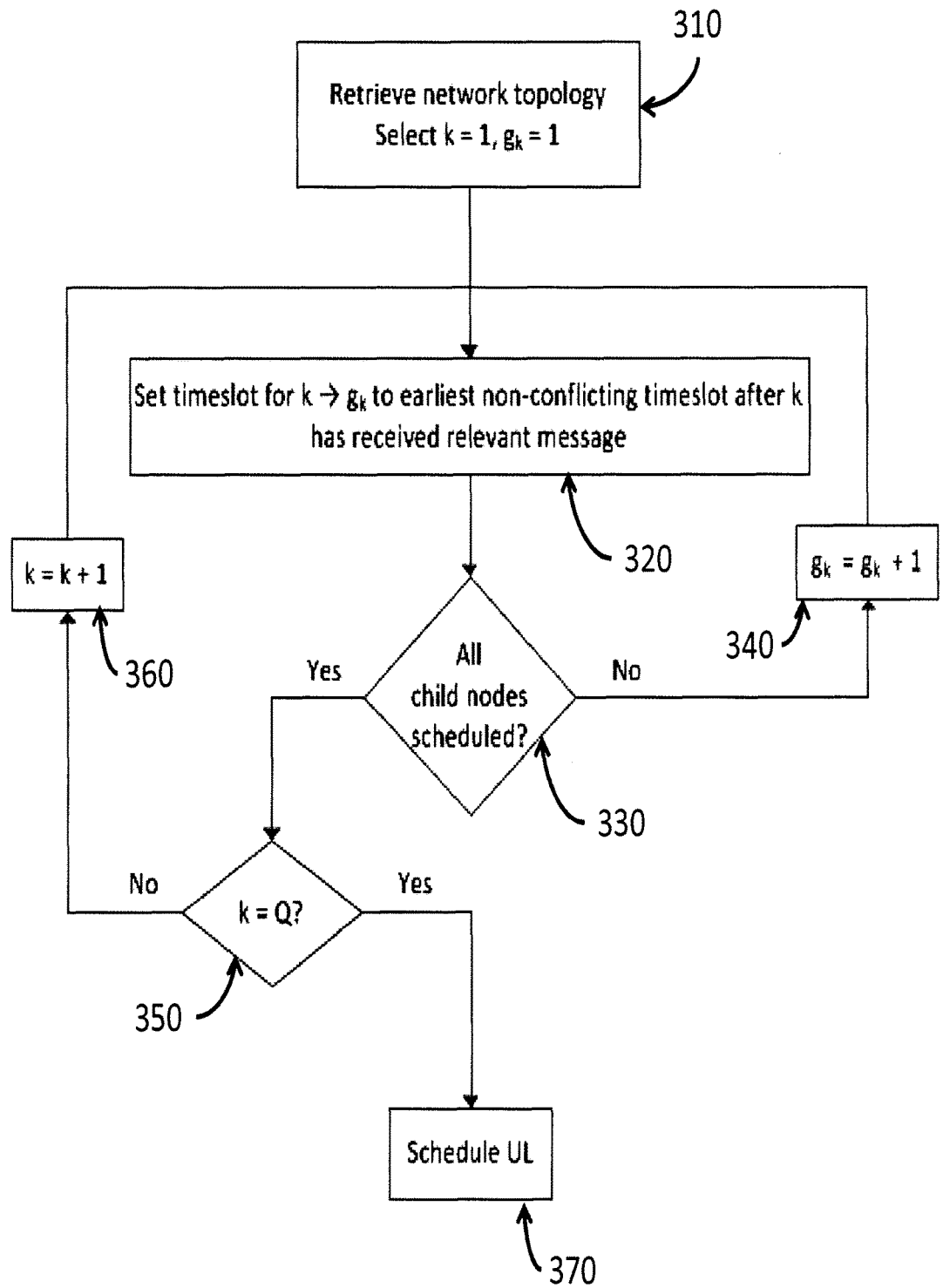
FIG. 23 shows a method for scheduling downlink (DL) transmissions according to an arrangement.

Pseudocode for Centralised bi-directional scheduling in GALLOP Algorithm for building network wide multi-hop bi-directional TDMA schedule Input Q (set of network nodes)
    $g_k$ ∀ k ∈ Q (set of child nodes)
    ∀ k ∈ Q (k≠sink)
        DL_schedule ← ø
        UL_schedule ← ø
Start procedure
while DL_schedule ≠ Q
    schedule (next) node k with lowest ID
    update DL_schedule
endwhile
while UL_schedule ≠ Q
    calculate $\nabla$ = current_slot − DL_slot ∀ k ∈ Q
    schedule (next) node k with highest $\nabla$
    update UL_schedule
end while
end procedure FIG. 23 shows a method for scheduling downlink (DL) transmissions according to an arrangement. Firstly, the network topology is retrieved and the first child node ($g_k$) of the first node (k) in the set of nodes Q is selected 310. The network topology includes the node IDs of each child node ($g_k$) for each node (k) in the network.

Then the timeslot for the transmission from node k to child node $g_k$ is set 320. This is scheduled to be the earliest available non-conflicting timeslot after the message has been received by node k. Timeslots where a conflicting transmission is already scheduled are banned for the purposes of the scheduling of this communication (i.e. where another communication has been scheduled on the same channel within range of the receiving node (in this case, child node $g_k$)). Timeslots located earlier than the time when the node k has received the message for retransmission are also banned.

It is then determined if all communications to all child nodes $g_k$ for node k have been scheduled 330. If not, the next child node is selected ($g_k$ is increased by one) 340 and the method loops back to step 320 to schedule the transmission to the next child node. As the present scenario is sending the same message to each node in the network (case 1), only one message needs to be sent to each child node.

If communications to all child nodes have been scheduled then it is determined if communications from all nodes have been scheduled (whether the last node Q has been reached) 350. If not, then the next node is selected (k is increased by one) 360 and the method loops back to step 320. If transmissions to all nodes in the network have been scheduled, then the method moves on to schedule the uplink transmissions 370.

Naturally, where a given node k has no child nodes, step 320 is skipped and the method moves on to select the next node in the set Q.

Figure 24:
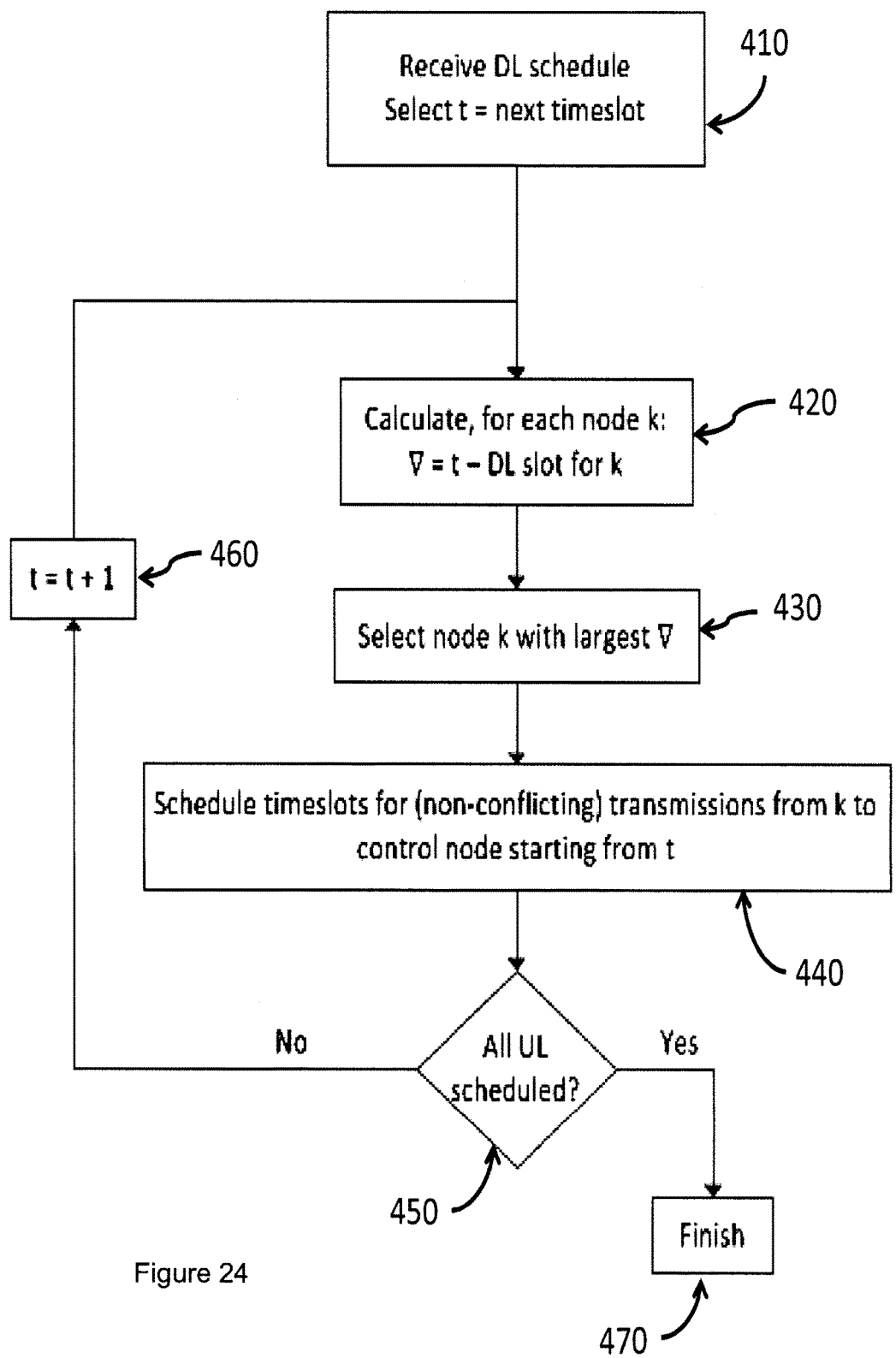
FIG. 24 shows a method of scheduling uplink (UL) transmissions according to an arrangement.

FIG. 24 shows a method of scheduling uplink transmissions according to an arrangement. This method follows on from that of FIG. 23.

Firstly, the downlink schedule is received and the next timeslot in the schedule t is selected 410. This timeslot is the first empty timeslot following the download schedule.

Then, for each node that requires uplink scheduling, the difference $\nabla$ between timeslot t and the downlink timeslot for that node is calculated 420. The downlink timeslot is the first timeslot that the given node is scheduled to receive a message in the downlink schedule. Alternatively, the downlink timeslot may be the timeslot that the given node is scheduled to receive a communication directed towards the given node (rather than a communication directed towards a different node, that the given node must forward on).

The node k with the largest $\nabla$ is selected for the scheduling of uplink transmissions 430. Uplink transmissions are then scheduled from the selected node to the control node in the timeslots starting from the current timeslot t 440. If the node is 1-hop away from the control node then only one transmission need be scheduled, in timeslot t. If multiple hops are required to reach then control node, then the timeslots following timeslot t are used to schedule the relay communications. In order for any uplink transmissions to be scheduled, they must not conflict with any previously scheduled transmissions (e.g. the receiving node cannot be within communication range of another communication on the same channel in the same timeslot).

It is then determined if all required uplink (UL) transmissions have been scheduled 450. If not, then the next timeslot is selected (t=t+1) and the method loops back to step 420. If all uplink transmissions have been scheduled then the scheduling finishes 470. The schedule can then be output to each of the nodes in the network to facilitate transmissions.

Various mechanisms to account for MAC layer retransmissions may be utilised. In one arrangement the controller allocates extra slots to vulnerable links. An alternative retransmission method according to an arrangement is discussed later for distributed scheduling. This may equally be incorporated into the centralised scheduling mechanism described herein.

Two schedules are depicted in FIG. 21. The top schedule is for the scenario where each communication link has its own timeslot scheduled (unless simultaneous non-conflicting transmissions can occur). The bottom schedule is for an arrangement where each node broadcasts messages to all its child nodes at once. As all child nodes are receiving the same control message in this scenario, there is no need to send individual transmissions to each child node.

This scheduling method may function in a similar way to that shown in FIG. 23; however, steps 320 and 330 are replaced with a single step of scheduling the earliest non-conflicting timeslot possible for a broadcast transmission to all child nodes.

As discussed above, the centralised scheduling mechanism may be implemented two ways. The above discussion relates to the scenario where the same message is sent to all slave devices. This means that each node in the network need only receive one message in the downlink phase. In a second scenario, specific messages may be sent to each node. This means that the controller would need to schedule messages to slave devices in distinct time slots. The broadcast scenario (case 1) is depicted in FIG. 21.

It can be seen from the schedule in FIG. 21 that only one transmission is scheduled in the downlink phase along any of the communication links. This is because the same message is being sent to all nodes.

Case 2

Case 2 follows a similar approach as Case 1 except that the controller schedules distinct transmissions in the downlink.

Figure 25:
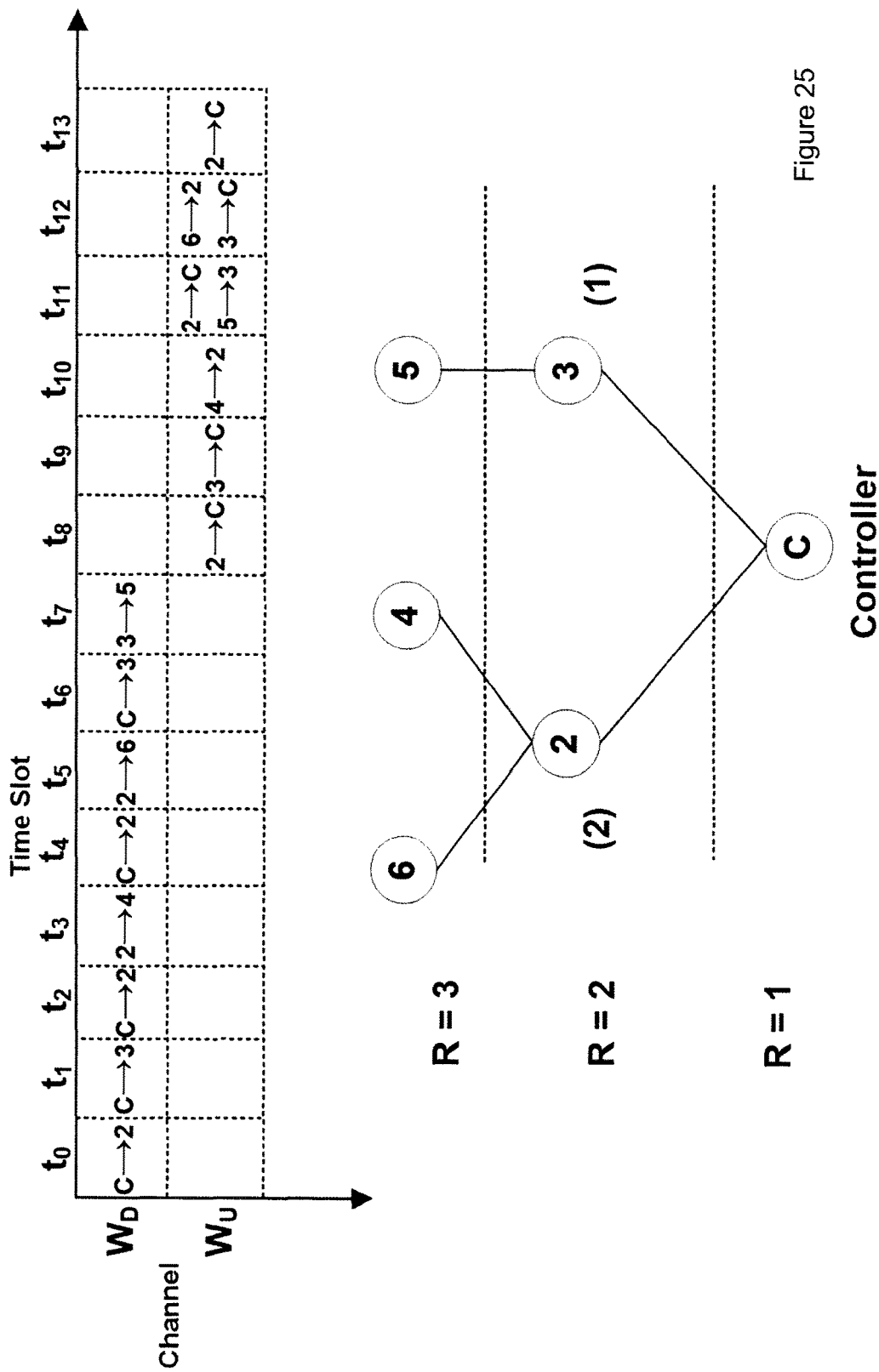
FIG. 25 provides an illustration of centralised bi-directional scheduling for the topology of FIG. 21 with distinct command messages for all the nodes in the network.

FIG. 25 provides an illustration of centralised bi-directional scheduling for the topology of FIG. 2 with distinct command messages for all the nodes in the network.

The network topology shown at the bottom of FIG. 25 is the same as that shown in FIG. 21. A schedule for distinct transmissions for this topology is shown at the top of FIG. 21.

Distinct messages are sent to each slave device in the network, the controller must transmit one message for each slave device. Equally, each intermediate node in the network must relay the messages to each of the nodes downlink of it.

Accordingly, in the topology of FIG. 25 the control node is scheduled to send three messages to node 2. This includes one control message for node 2 as well as control messages for the child nodes of node 2 (nodes 4 and 6). If nodes 4 and 6 had child nodes then additional messages would need to be scheduled. Node 2 is scheduled to relay the relevant messages on to nodes 4 and 6. The uplink phase may then be scheduled, as discussed above.

The scheduling method of FIG. 23 may also be used in the distinct messaging scenario. The only difference is that instead of each child node having one message scheduled to it in steps 320 and 330, multiple messages may be scheduled to the same child node based on whether the child node needs to relay on further messages. Whilst the schedule in this scenario is longer, this allows individualised commands to be sent to each node in the network.

It should be noted that a combination of broadcast control messages and node-specific control messages may also be utilised. For instance, a message directed towards both nodes 4 and 6 may be scheduled, but specific control messages for the remaining nodes in the network may be scheduled. This allows the size of the schedule to be reduced, where possible, for nodes that are to receive the same command/message.

Each message may include the details of the node(s) to which it is ultimately directed. This may be included in a header of the message. In addition to this, each message may also include the intended recipient of the transmission (that may be subsequently relay it on to its ultimate destination).

Whilst the above arrangements schedule the downlink channel according to the node ID order, in an alternative arrangement, nodes with a larger number of nodes downlink from them have priority in scheduling. For example, for the network topology of FIGS. 2 and 5, node 2 could have priority over node 3 (regardless of its node ID) as it has two child nodes whereas node 3 has only one.

Centralised scheduling solutions, in general, are not scalable. The overhead of obtaining topological information, especially under dynamic environments, is significant. Therefore, distributed solutions are much more desirable from a practical perspective.

Distributed Bi-Directional Scheduling

In the distributed case, there is no central scheduling entity and the global knowledge of network topology is not available. Nodes in the network agree on the schedule through neighbour-to-neighbour information exchange and scheduling negotiation. The distributed scheduling algorithm is split into different phases, which are explained as follows.

Figure 26:
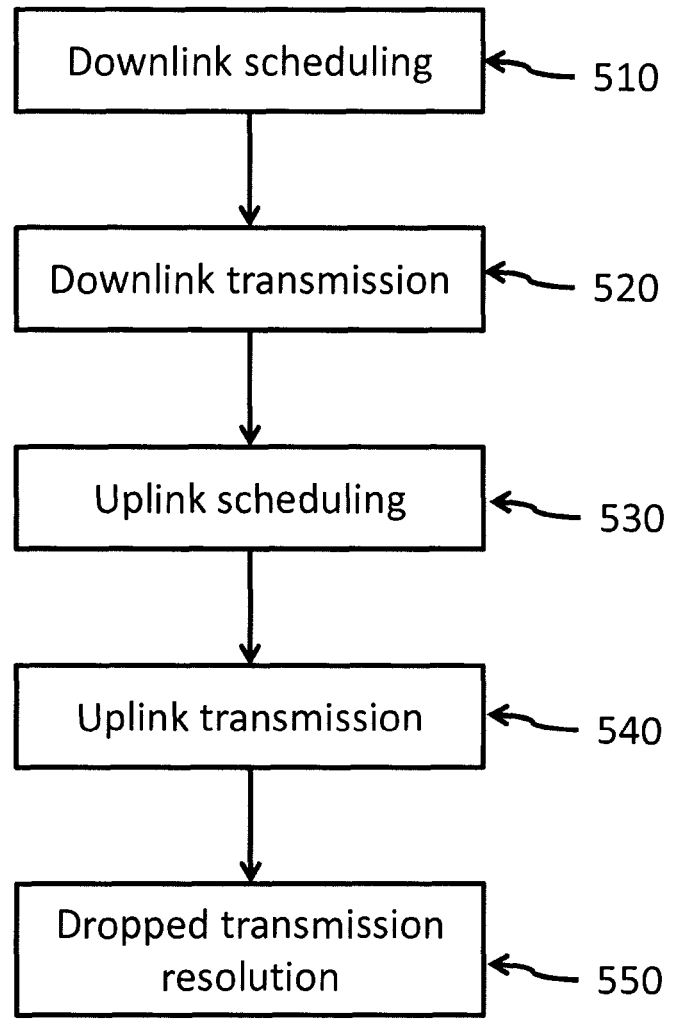
FIG. 26 shows the phases of a distributed bi-directional scheduling mechanism according to an arrangement.

FIG. 26 shows the phases of a distributed bi-directional scheduling mechanism according to an embodiment.

The distributed scheduling mechanism is divided into a number of phases. In the first phase the downlink transmissions are scheduled 510 in the second phase the command messages are transmitted downlink according to the schedule 520. The third phase is uplink scheduling 530. The uplink scheduling must happen after the downlink transmissions as the schedule is being determined by the nodes themselves. Accordingly, they do not know what their response might be without having first received the control message.

The fourth phase is uplink transmission according to the uplink schedule 540. The final phase involves resolving any dropped transmissions 550. This can include determining whether the issue was a failure in the downlink transmissions or the uplink transmissions and repeating the dropped transmissions to ensure that all messages have been successfully delivered.

Figure 27:
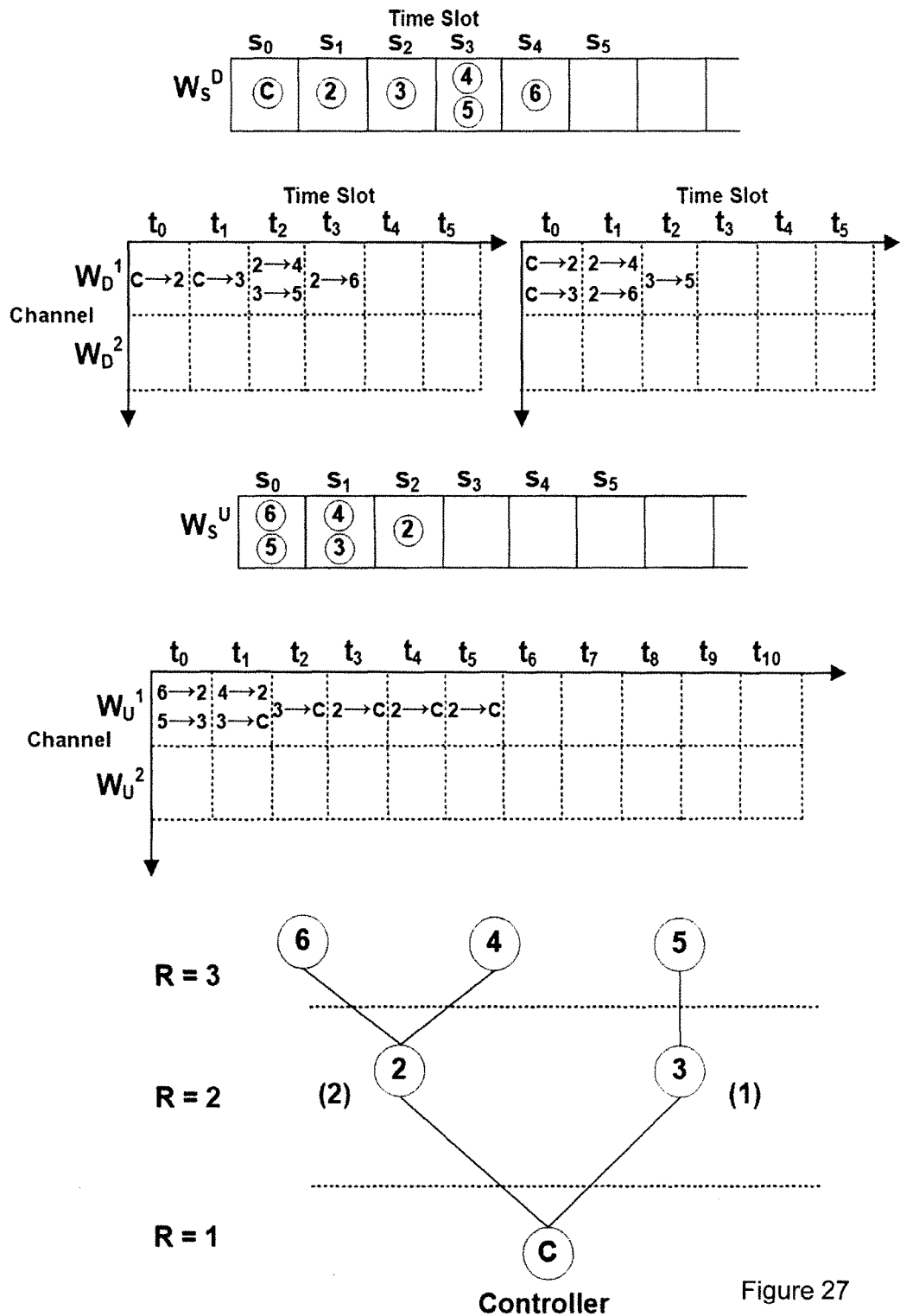
FIG. 27 shows distributed scheduling according to an arrangement.

FIG. 27 shows distributed bi-directional scheduling according to an arrangement. For simplicity, the same topology is utilised as in FIGS. 21 and 25.

The top schedule depicts the signalling during the first phase for building the downlink schedule. This is followed by the downlink schedules for two scenarios: unicast messaging and broadcast messaging. This is followed by the schedule for the signalling for building the uplink schedule. Finally, the uplink schedule is depicted.

Firstly, we consider the scenario where the controller has a single command message for all the nodes in the network.

As distributed scheduling requires nodes to exchange information about their schedules, a system must be laid down to avoid signal clashes during scheduling and to help avoid conflicting communications during downlink transmission. Accordingly, during downlink scheduling each node is assigned a scheduling timeslot from a downlink signalling channel ($W_s^D$), during which the node may send signals to perform downlink scheduling to schedule transmissions to the downlink channel ($W_D$).

During the scheduling timeslot for a given node, the node utilises its own knowledge of the local network to choose a scheduled timeslot for downlink transmission. Having said this, the node may have an incomplete view of the local network and overall schedule, and may therefore schedule a transmission that may conflict with other transmissions in the area. To avoid this, the node sends a request for slots (RFS) message to its parent node. The parent node uses its own knowledge of the local network and schedule to determine whether transmitting during the proposed timeslot would interfere with any neighbouring transmissions. The parent node then either sends an assign (ASG) message to confirm that the proposed scheduled transmission is allowed, or allocates an alternative timeslot based on its knowledge of the local network. This helps to avoid nodes scheduling conflicting transmissions.

Each node (including the control node) schedules transmissions according to the following rules:

Rule 1D: Any node k selects the minimum possible timeslots on the available channels, where it finds no conflict as per its local knowledge.

Rule 2D: Any parent node k', on receiving a request for slots (RFS) message, will confirm the requested allocation, if it finds no conflict and if the requested allocation provides the minimum possible latency as per its local knowledge. Otherwise, it will respond with an updated allocation assigned based on Rule 1D and a requirement to provide the minimum possible latency.

Rule S1D: Any parent node k' will assign non-conflicting signalling slots to its child nodes based on its local knowledge.

Rule S2D: Any node k, on detecting a collision on a signalling slot, will retransmit the RFS message in the next available signalling slot based on its local knowledge.

In one implementation the minimum possible timeslots on the available channels is the earliest set of timeslots available on one or more of the available channels.

The scheduling mechanism begins at the control node. The controller picks up the first slot $s_0$ of the downlink signalling channel ($W_s^D$). As no transmissions have been scheduled yet, the controller does not need to send any signals to determine whether its schedule conflicts with that of another node. Accordingly, the control node selects timeslots for downlink transmission and broadcasts the information about the selected timeslots to its child nodes.

As discussed previously, the controller can either schedule its child nodes in distinct time slots or in a broadcast manner; therefore, it picks either timeslots $t_0$ and $t_1$ (for separate transmissions to nodes 2 and 3), or timeslot $t_0$ only (for a broadcast transmission to both nodes 2 and 3 at the same time).

Furthermore, the controller assigns signalling priorities to its child nodes and conveys this scheduling information for accessing the signalling slots. One way to convey priority information is to embed the MAC addresses or IDs of the child nodes, in order of priority, in the MAC header. In the present arrangement, priority is assigned based on node ID. Node 2 is given therefore given priority over node 3.

Based on information received in signalling slot $s_0$, node 2 determines that it has highest priority. Therefore, it picks up the second signalling slot, $s_1$, and sends a Request-for-Slots (RFS) message to its default parent (the control node). Node 2 can either request a single timeslot or multiple timeslots (according to how many child nodes it has). This will depend on whether broadcast or distinct scheduling is being implemented.

If distinct scheduling is being implemented, Node 2 would be aware that it is due to receive its message from the control node in timeslot $t_0$ and that conflicting transmissions from the control node are scheduled to occur during timeslots $t_0$ and $t_1$. It would therefore pick the next available timeslots ($t_2$ and $t_3$) for separate transmissions to Nodes 4 and 6.

In the broadcast scheduling scenario, Node 2 would be aware that it is due to receive its message in $t_0$, but that no conflicting transmissions are currently scheduled during $t_1$. It would therefore pick timeslot $t_1$ for a broadcast transmission to all its child nodes.

Based on the RFS, the default parent, which is the controller in this case, determines whether the proposed schedule would conflict with another transmission that has already been scheduled. In this case, there is no conflict, so the control node responds back with an Assign (ASG) message to confirm the allocation, as per Rule 2D.

Node 2 therefore schedules the proposed downlink transmissions and sends the schedule to its child nodes. Furthermore, node 2 assigns priorities to its child nodes for accessing the signalling slots and conveys this information along with the next available signalling slot information (which is $s_3$ in this case). It is important to let the child nodes know which is the next available signalling slot as they would have no knowledge of the signalling the is occurring uplink of them. Accordingly, if this was not conveyed the child nodes would begin signalling in slot $s_2$, at the same time as node 3, which may cause collisions at nodes 2 and/or 3.

Similarly, based on the received information in signalling slot s0, node 3 determines that it has second highest priority. Therefore, it picks up the second signalling slot, $s_2$, and sends an RFS message requesting timeslots and assigning priorities to its child nodes.

Node 3 requires one timeslot. In the present case node 3 is out of range of transmissions from Node 2 It is therefore not aware of the transmissions scheduled for Node 2. RFS messaging to parent nodes therefore helps to avoid conflicting transmissions.

In the scenario where separate transmissions to child nodes are utilised, Node 3 would be aware that conflicting transmissions are scheduled by the control node in $t_0$ and $t_1$. Accordingly, Node 3 would pick the next available timeslot, $t_2$, and communicate this to the control node via an RFS message. The control node is aware that Node 2 is scheduled to transmit in $t_2$; however, as Nodes 2 and 3 are out of communication range, they may transmit in the same slot without conflict. Accordingly, the control node sends an assign (ASG) message to confirm that Node 3 may schedule transmission to Node 5 in $t_2$.

In the scenario where broadcast messages are being utilised, Node 3 would be aware that the control node is scheduled for downlink transmission in t0. Having no knowledge of the scheduled transmissions for Node 2, Node 3 would pick t1 for its transmission to Node 3. This would be reported to the control node in an RFS message. As Node 2 and Node 3 are outside of communication range from each other, the control node would accept this proposed schedule and issue an assign the message.

Once the downlink transmission from Node 3 has been scheduled, Node 3 assigns the next signalling slot $s_3$ to node 5. It should be noted that Nodes 4 and 5 are assigned the same signalling slot ($s_3$); however, there is no conflict as Nodes 3 and 5 are outside of the communication range of Nodes 2 and 4.

Note that, in this case Node 3 is out of the communication range of node 2. However, if that was not the case, Node 3 would have picked timeslots $t_2$ or $t_4$, due to the information received in signalling slot $s_1$. Furthermore, Node 3 would have assigned signalling slot $s_5$ to Node 5 based on Rule S1D.

When the leaf nodes (the nodes that have no child nodes) are reached, each leaf node informs its neighbouring nodes that it has no child nodes to schedule. Node 4 uses signalling slot $s_3$, whilst Nodes 5 and 6 use signalling slots $s_3$ and $s_4$ respectively, to inform neighbouring nodes that they have no child nodes to schedule. The format of signalling messages is discussed later. Finally, in case of a collision on a signalling slot, a node will retransmit the RFS message as per Rule S2D.

Next we explain the scenario where the controller has distinct commands messages for all the nodes in the network. Note that building a distributed schedule in such a case requires complete network connectivity information at the controller or partial network connectivity information at each node in the network. Based on this assumption, the proposed method of building DL schedule can be extended to transmit distinct command messages for all network nodes.

The second phase is of downlink data transmission. After completing the signalling exchange, downlink data transmission begins as per the built downlink schedule. Note that the closed-loop cycle begins with downlink data transmission. Hence, the duration of downlink signalling phase does not affect the cycle time. After completing the downlink data transmission, a controller can send a Build command, using the downlink schedule, for initiating the uplink scheduling process.

The third phase is of signalling for building uplink schedule. Since the duration of this phase affects the cycle time, it is desirable to have minimum signalling overhead. The DeAMON system is adapted for uplink scheduling in GALLOP. Novel enhancements are also proposed for incorporating cooperative multi-user diversity.

Unlike the downlink case, for uplink scheduling following DeAMON-based approach, a node requests timeslots from its default parent. In DeAMON, a priority is assigned to each node depending on its rank, traffic, and ID. The same notion of priority can be extended to GALLOP. Alternatively, the priority information obtained during the downlink signalling phase can be adopted by the nodes in the network. The schedule build up phase starts from leaf nodes in a sequential manner. The overall scheduling process follows certain rules, which are stated as follows.

Rule 1U: Any node k, on receiving the Build command, will start the uplink scheduling process, if and only if, it is a leaf node.

Rule 2U: Same as Rule 1D but for uplink case.

Following Rules 1U and 2U, nodes 6 and 5, pick up timeslot t0 (of the uplink channel) and send a Request-for-Slots (RFS) message to their default parents in a signalling slot s0. The default parents, which are nodes 2 and 3 in this case, will respond back with an Assign (ASG) message to confirm the allocation as per Rule 3U, which is stated as follows.

Rule 3U: Any parent node k', on receiving an RFS message, will confirm the requested allocation, if and only if it finds no conflict as per its local knowledge. Otherwise, it will respond with an updated allocation based on Rule 2U.

The neighbouring nodes overhear the ASG messages and maintain a record of timeslot allocation. Since node 4 overheard the ASG message for node 6, it will pick up timeslot $t_1$ and send an RFS message to node 2 in the next signalling slot $s_1$. Similarly, after scheduling node 5, node 3 will request timeslots $t_1$ and $t_2$ from the controller, in the signalling slot $s_1$. Since the respective default parents find no conflict, they will confirm the requested allocation. After scheduling its child nodes, node 2 requests timeslots $t_2$, $t_3$, and $t_4$, from the controller, in the signalling slot $s_2$, based on its local knowledge. However, as timeslot $t_2$ is already allocated to node 3, the controller responds back with updated allocation by assigning timeslots $t_3$, $t_4$, and $t_5$.

Finally, in order to enable parallel transmissions, we introduce the following two rules.

Rule 4U: Any node k on overhearing an ASG message from a node j, whose rank is lower than its own, will update its local knowledge and forward this ASG message to its default parent, if and only if k is the default parent of j.

Rule 5U: Any parent node k', on receiving an RFS message, will confirm the requested allocation based on Rule 3U AND the possibility of a parallel transmission based on its local knowledge.

The fourth phase is of uplink data transmission. After completing the signalling exchange, uplink data transmission begins as per the built uplink schedule. Note that the overall cycle time is equal to 13 timeslots as compared to 10 timeslots for the centralised case. However, this cycle time is for the ideal scenario when there are no MAC layer retransmissions.

Figure 28:
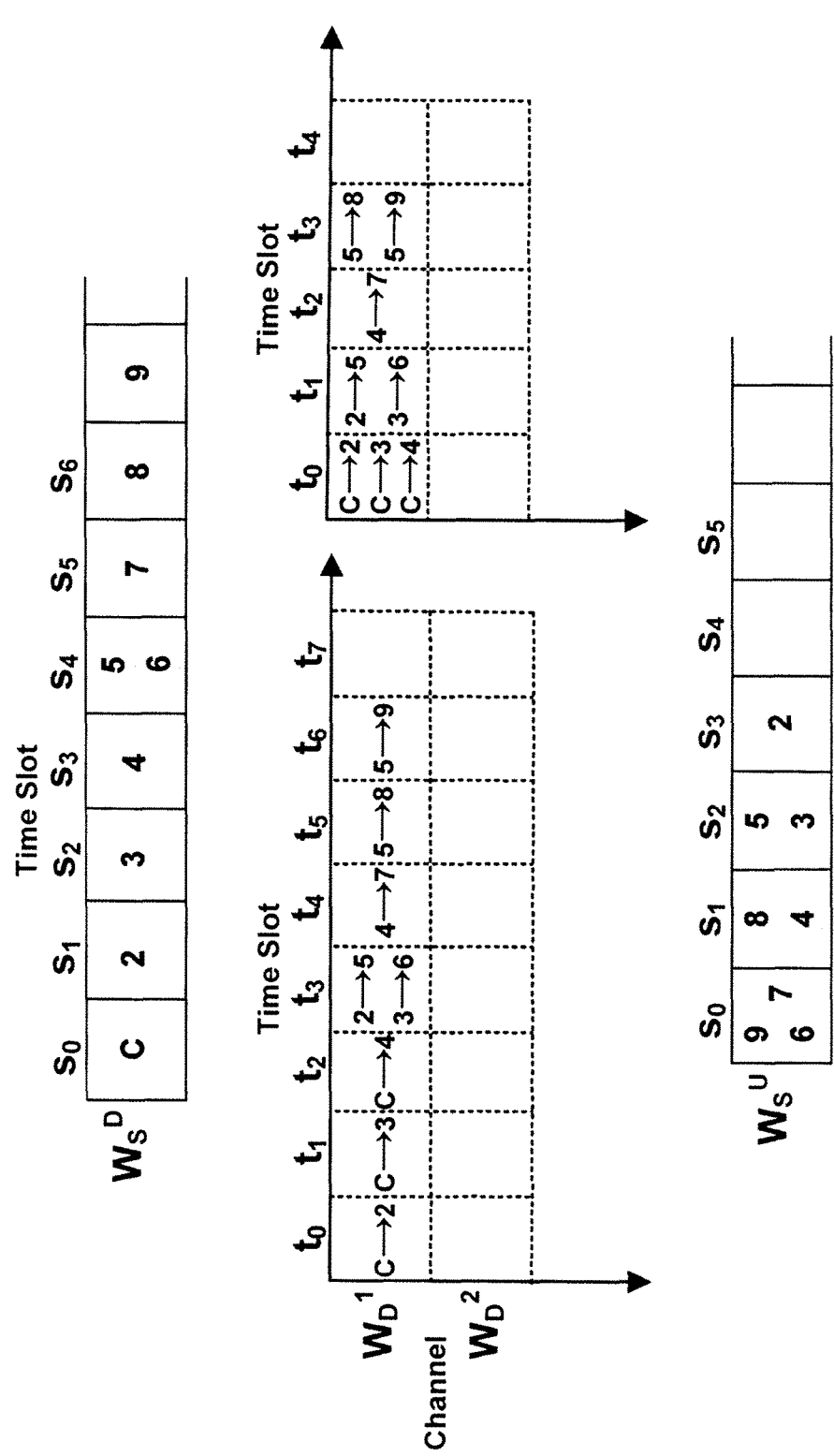
FIG. 28 shows distributed scheduling for a larger topology according to an arrangement.
Figure 28:
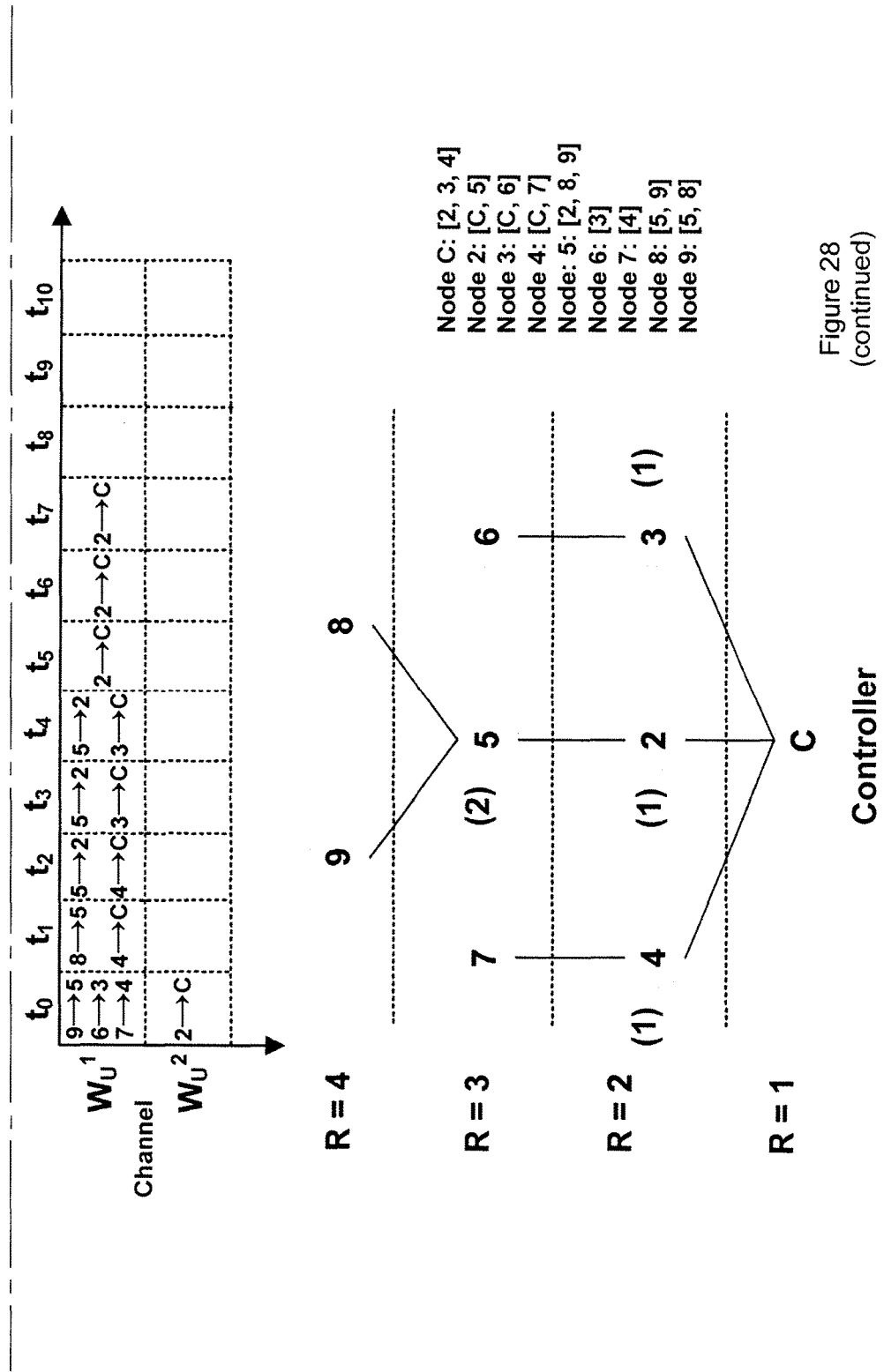

FIG. 28 shows distributed scheduling for a larger topology according to an arrangement.

The fifth phase of GALLOP is for handling any MAC layer retransmissions. Similar to ENCLOSE, GALLOP, adopts a multi-user diversity approach to MAC layer retransmissions. Multi-user diversity is the key technique to fulfil the required reliability requirements. Each parent node is responsible for handling any retransmissions of its child node. In ENCLOSE, only the controller sends the Group Acknowledgement (G-ACK) message that contains information regarding which nodes need to retransmit. However, in GALLOP, the G-ACK needs to be sent by each parent node. If none of the child nodes need to retransmit, no G-ACK is sent. The parent also sorts the child nodes requiring retransmission in a certain order. Note that a transmission failure can occur in two different scenarios.

Scenario 1: In the first scenario, an uplink transmission from a node failed after a successful transmission of downlink information by a parent node.

Scenario 2: In the second scenario, an uplink transmission from a node failed due to a downlink failure i.e., the node didn't receive any command from the parent node.

In GALLOP, each node maintains an information list regarding M strongest neighbouring nodes. The notion of proximity here is in terms of received signal-to-noise-ratio (SNR) at a node during uplink transmission. Such information is used by a node to determine its eligibility for acting as a relay node after hearing a G-ACK from its parent node.

Unlike ENCLOSE, the retransmission procedure in GALLOP is complicated due to the fact that each parent node needs to send a G-ACK (if an expected response is not received). Therefore, an efficient distributed scheduling mechanism is needed to schedule retransmissions with the aforementioned multi-user diversity approach.

Figure 29:
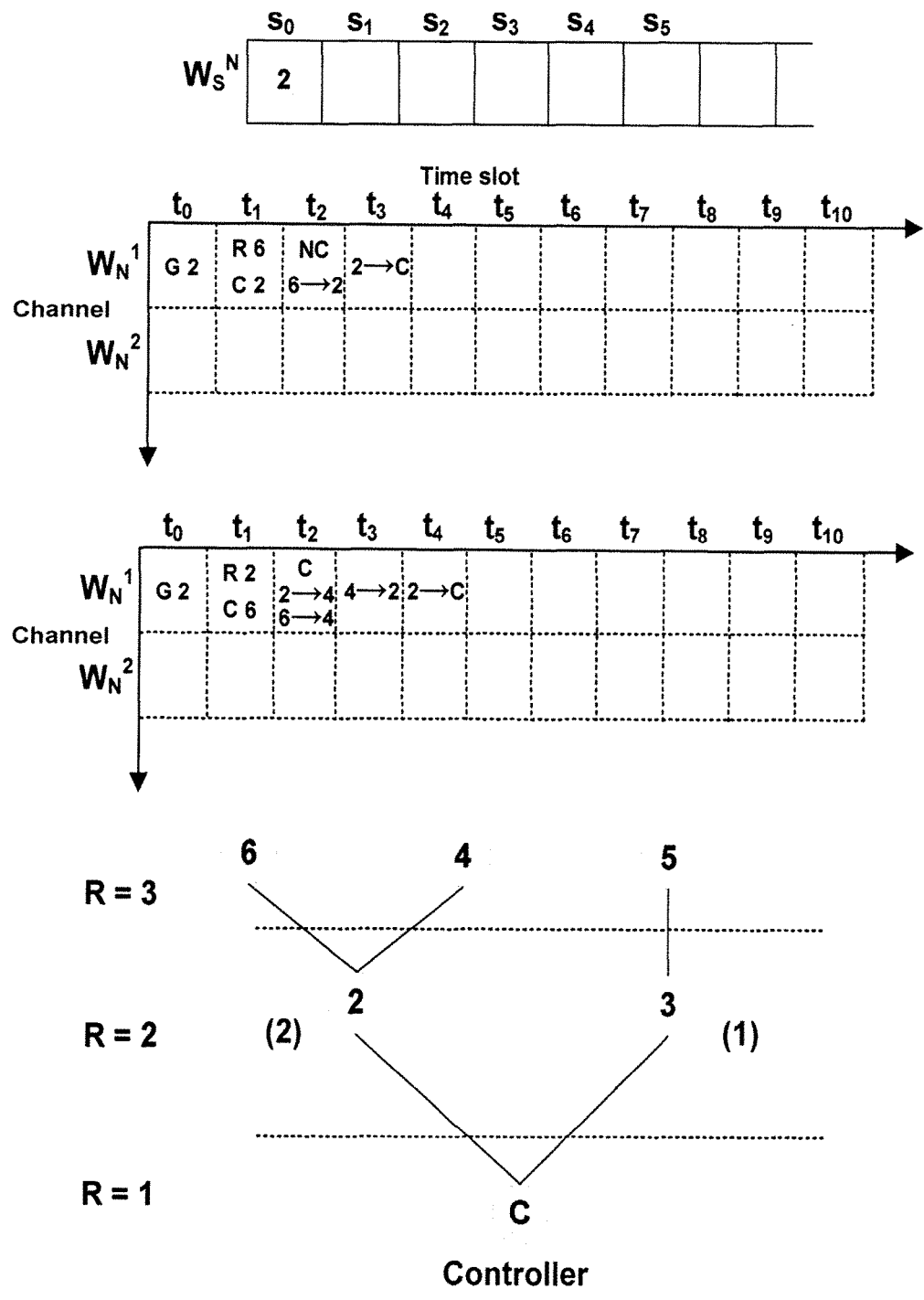
FIG. 29 shows the schedule and signals for arranging retransmissions in a distributed network.
Figure 29:
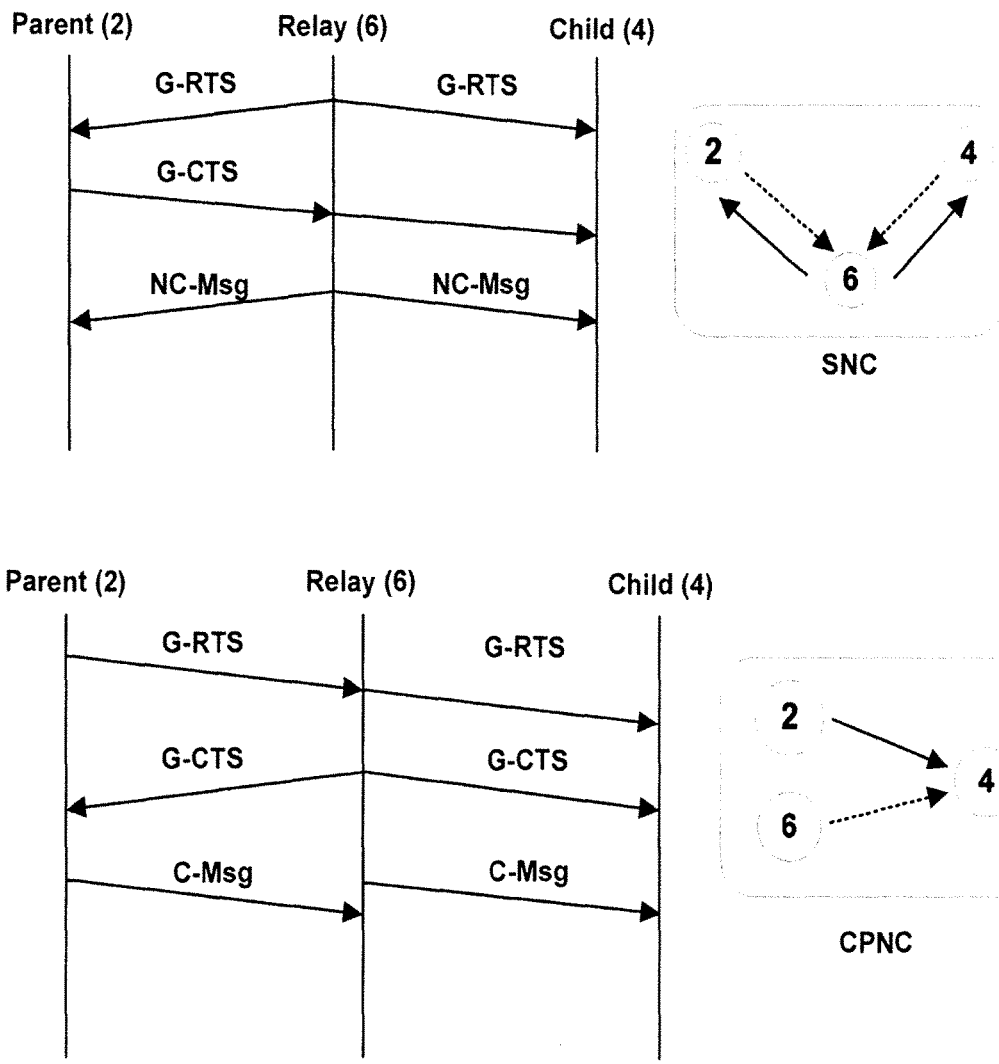

FIG. 29 shows the schedule and signals for arranging retransmissions in a distributed network.

The retransmission procedure is described as follows:

Rule S1R: Any parent node k', on receiving an RFS message from its child node for requesting timeslots for retransmissions, will also request timeslots from its default parent, if and only if the default parent node is not the control node.

Rule S2R: The signalling for transmission schedule build up is strictly sequential. i.e., any parent node will not request slots until it has scheduled all of its child nodes.

Firstly, we explain the retransmission procedure for Scenario 1. Assume that the transmission from node 4 to node 2 failed i.e., node 2 did not receive anything from node 4 in its scheduled timeslot. Node 2, on a signalling slot $s_0$, requests five timeslots $t_0$-$t_4$, of the network coding channel from its parent node, by sending an RFS message. The parent node will respond back with an ASG message if it does not detect any conflict on the requested allocation.

The signalling procedure for requesting timeslots for retransmission follows a similar approach as employed for building the uplink schedule. The retransmission process follows a sequential approach and the same notion of priority is used for requesting timeslots as employed in building the uplink schedule.

Node 2 will use timeslot $t_0$ for sending the G-ACK to its neighbouring nodes. In case of scenario 1, the uplink transmission failed after successfully receiving the downlink. Therefore, it is likely that any neighbouring node would have heard the uplink transmission from node 4. Assume that node 6 has successfully decoded the uplink transmission from node 4 at an SNR higher than transmission from any other neighbouring node. After hearing the G-ACK from node 2, node 6 sends a G-RTS (GALLOP Request-to-Send) in timeslot $t_1$. This message notifies node 2 that any other node has successfully received uplink transmission from node 4. Therefore, node 2 responds back with a G-CTS (GALLOP Clear-to-Send) message in the same timeslot.

Nodes overhearing the G-RTS/G-CTS exchange refrain from transmitting for the duration advertised therein. In timeslot $t_2$, node 6 sends a network-coded message (NC-M) to node 2 and node 4. Let $X_2$ denote the downlink command from node 2. Similarly, let $X_4$ denote the uplink message from node 4. Note that the relay node has successfully decoded $X_2$ and $X_4$ in different downlink and uplink timeslots. Therefore, it creates $X_R=X_2 \oplus X_4$, where $\oplus$ denotes the XOR operation. Since node 2 already knows $X_2$, it will decode $X_4$ by performing $X_R \oplus X_2$. Such realisation of network coding is termed as 'simple network coding' (SNC).

Finally, in timeslot $t_3$, node 2 forwards this message to the controller. However, if node 2 was not directly connected to the controller, it would have requested additional timeslots during the signalling phase, as per Rules S1R and S2R. Note that the relay node does not necessarily have to be the child node of the parent transmitting the G-ACK. Any node in the neighbourhood can act as a relay.

Next, we explain the retransmission procedure for Scenario 2. After sending the G-ACK, node 2 sets a timeout period during which a G-RTS can be received from a potential relay node if the transmission from node 4 had been successful in the uplink. Since in this scenario, the uplink failed due to a downlink failure, no transmission from node 4 will take place and therefore, no eligible node can act as a relay. After the set timeout period, node 2 concludes that node 4 did not receive the downlink correctly. Therefore, node 2 must retransmit in the downlink. In order to make the downlink transmission more robust, a cooperative approach is adopted. Node 2 selects a relay node for downlink transmission. The selection of a suitable relay node can be done based on received SNR during uplink transmission (in Phase 4). Each node maintains a list of N strongest nodes in terms of SNR. After selecting a relay node (which is assumed to be node 6), node 2 sends a G-RTS message, containing the ID of node 4 and the destination address of node 6. This G-RTS message notifies node 6 of acting as a relay node for node 4. Therefore, node 6 responds back with a G-CTS message. In the timeslot following the G-RTS/G-CTS handshake, i.e., $t_2$, both node 2 and node 6 simultaneously transmit the command signal $X_2$ to node 4, which performs an XNOR operation (converse of XOR) on the combined received message $X_T=\overline{X_C \oplus X_C}$. The XNOR operation ensures that the received message is successfully decoded, only if both the parent node and the relay node (node 6) transmit the same message, and is discarded otherwise. Such realisation of network coding is termed as 'cooperative physical layer network coding' (CPNC). In timeslot $t_3$, node 4 transmits the uplink message. Finally, in timeslot $t_4$, node 2 forwards this message to the controller. Note that node 2 requested 5 timeslots, as no knowledge about Scenario 1 or Scenario 2 is available a priori. However, since in Scenario 1, timeslot $t_4$ would not be used, the parent node of node 2, which is the controller, can update its local knowledge based on distinguishing between Scenario 1 and Scenario 2, if it heard a G-CTS or a G-RTS from node 2.

GALLOP also exploits the opportunistic use of network coding. For example, in case of Scenario 1, as explained in FIG. 26, node 2 can encode the transmission received from node 4 such that $X_2=X_4 \oplus X_C$, where $\oplus$ denotes the XOR operation. Since the controller already knows $X_C$, it will decode $X_4$ by performing $X_2 \oplus X_C$. Such network coding operation reduces the error probability of the transmission.

It should be noted that the retransmission procedure from multiple parent nodes can go in parallel, following the signalling approach used in the uplink. Such parallel transmission will reduce the end-to-end latency. The fifth phase of GALLOP continues until all retransmissions have been successful. Note that the signalling phase will precede the retransmission phase, similar to the downlink and the uplink.

Additionally, during uplink scheduling, following signalling rules are also employed.

Rule S1U: The signalling for uplink schedule built up is strictly sequential, i.e., any parent node will not request slots until it has scheduled all of its child nodes.

Rule S2U: Any node k∈Q (k≠sink, k≠leaf node), after scheduling all of its child nodes, will wait for at least one timeslot before sending an RFS message to its parent node if and only if k is not the highest priority child node of j.

Rule S3U: Any node k∈Q (k≠sink), on detecting a collision in a signalling slot, will retransmit the RFS message, with requested channel offset incremented by 1, in a signalling slot determined after a random back-off.

Format of Signalling Messages

The format of different signalling messages and the minimum information contained within each message is described as follows.

RFS
- 7-bit source node address.
- 7-bit destination node address.
- 4-bit message type
- S*ceil(log$_2$(S))-bit timeslot identifier; S=total number of timeslots in a frame.
- N_ch*ceil(log$_2$(N_ch))-bit channel identifier N_ch=total number of channels.
- 32-bit cyclic redundancy check (for error detection)
- 8-bit guard interval
- X-bit additional information (optional)

ASG
- 7-bit source node address.
- 7-bit destination node address.
- 4-bit message type
- S*ceil(log$_2$(S))-bit timeslot identifier; S=total number of timeslots in a frame.
- N_ch*ceil(log$_2$(N_ch))-bit channel identifier; N_ch=total number of channels.
- 32-bit cyclic redundancy check (for error detection)
- 8-bit guard interval
- X-bit additional information (optional)

G-ACK
- 7-bit source node address.
- 4-bit message type
- Y-bit message (IDs of child nodes requiring retransmission)
- 32-bit cyclic redundancy check (for error detection)
- 8-bit guard interval
- X-bit additional information (optional)

G-RTS/G-CTS
- 4-bit message type
- 7-bit destination address
- 7-bit source address
- X-bit message (for network coding information)
- 8-bit cyclic redundancy check (for error detection)
- 8-bit guard interval Network Coded Message (NC-M)
- 4-bit message type
- 7-bit destination address 1
- 7-bit destination address 2
- 7-bit source address
- X-bit message (for network coding information)
- 8-bit cyclic redundancy check (for error detection)
- 8-bit guard interval DL-Signalling Message
- 4-bit message type
- 7-bit source address
- ceil(log$_2$(S))-bit number of timeslots; S=total number of timeslots in a frame.
- Y-bit message (IDs of scheduled child nodes)
- X-bit message (next available signalling slot)
- 8-bit cyclic redundancy check (for error detection)
- 8-bit guard interval Frequency Hopping Frequency hopping is important in mitigating multipath fading and external interference, and therefore, in achieving the required reliability requirements. In GALLOP, we adopt two different methods for frequency hopping. The available bandwidth of 80 MHz is partitioned into different channels of 1 MHz each. The set of available channels is partitioned into uplink, downlink, signalling, and network coding channels.

Time-Slotted Channel Hopping

In this case, channel hopping is performed at the timeslot level. The actual channel for the timeslot pertaining to uplink, downlink, signalling, or retransmission is calculated according to the following equation $$\text{Freq} = F\{(ASN + Ch\_Off) \bmod N\_Ch\}$$

where ASN is the absolute slot number, Ch_Off is the channel offset, and N_Ch denotes the total number of channels.

Phase-Slotted Channel Hopping

In this case, channel hopping is performed on phase-by-phase basis. The actual channel for the timeslot pertaining to uplink, downlink, signalling, or retransmission is calculated according to the following equation $$\text{Freq} = F\{(APN + Ch\_Off) \bmod N\_Ch\}$$

where APN is the absolute phase number, Ch_Off is the channel offset, and N_Ch denotes the total number of channels. To ensure wideband separation, each of the uplink, downlink, signalling, and network coding phase is separated by 20 MHz; hence, the Ch_Off is incremented accordingly.

GALLOP: Performance Validation

We evaluate the performance of ENCLOSE through system-level simulation studies. We assume that network nodes are Poisson distributed in a certain area with certain mean density. Without loss of generality, we assume that RPL is operating at the network layer. Each node is assigned a rank which is based on Euclidean distance from the sink node. We consider a frequency selective Rayleigh fading channel between a pair of nodes. We conduct Monte Carlo simulations on different topologies and evaluate the performance in different scenarios.

The key performance metric of interest here is the cycle time (end-to-end latency) of GALLOP as the reliability of multi-user diversity technique has been extensively evaluated in context of ENCLOSE.

Figure 30:
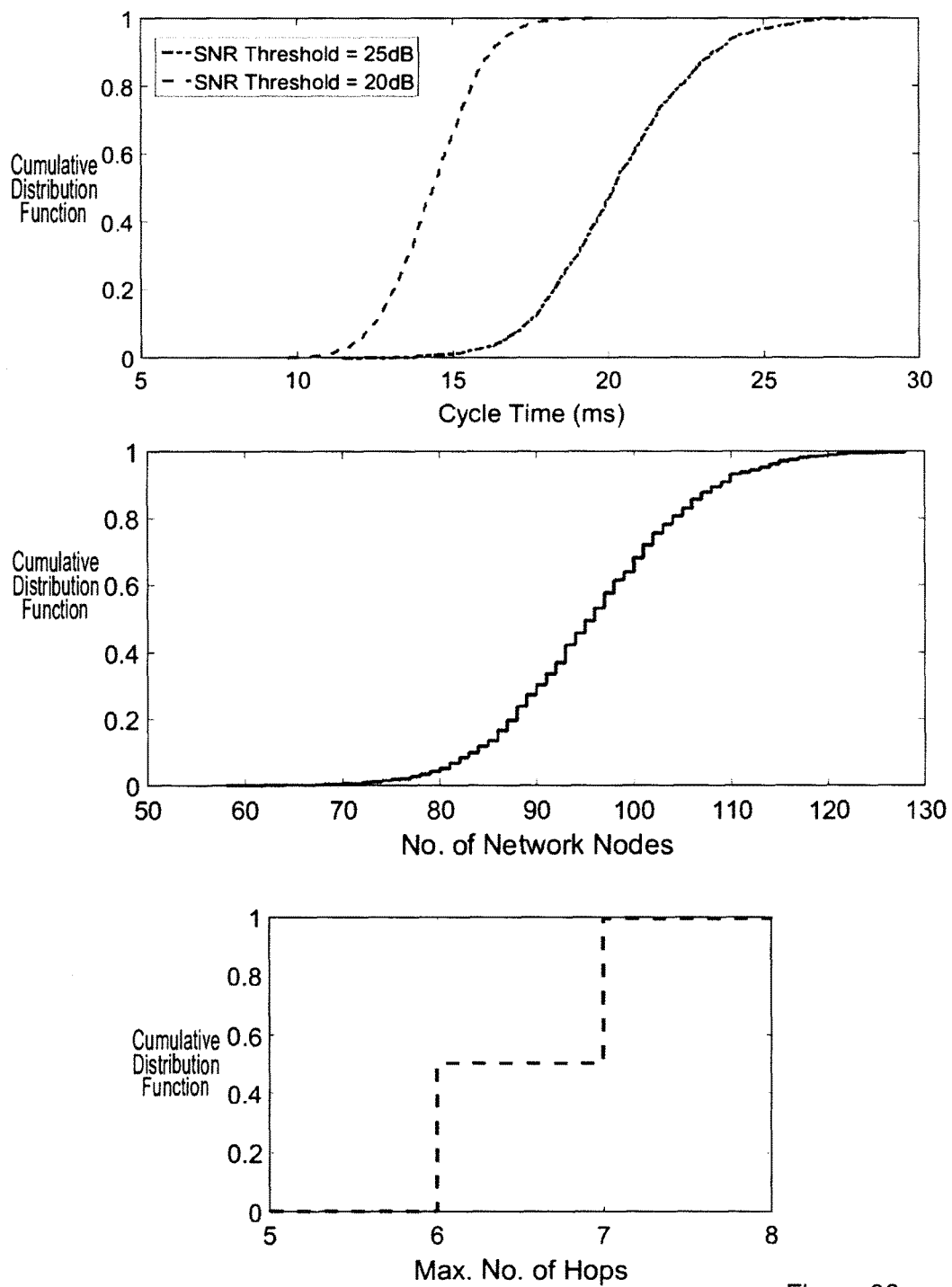
FIG. 30 shows the performance evaluation of an arrangement.

FIG. 30 shows the performance evaluation of an arrangement. Firstly, we note that the cycle time for GALLOP increases as the threshold SNR increases. This is due to higher retransmissions due to stringent requirements for a successful transmission. Secondly, we note that GALLOP is capable of meeting 10-30 ms cycle time requirements, depending up on the threshold SNR, for up to 100-130 nodes in the network, which are distributed over at least 5-8 hops from the controller.

In addition to meeting the stringent requirements of closed-loop control in mesh automation environments, GALLOP provides the following key advantages:

GALLOP provides a scalable solution for process automation environments due to its distributed nature.

GALLOP provides high throughput by parallelising non-conflicting transmissions in both downlink and uplink.

GALLOP provides high utilisation of wireless resources due to sequential scheduling and parallel transmissions in both uplink and downlink.

GALLOP can be seamlessly deployed with ENCLOSE in hybrid factory/process automation environments.

GALLOP is compatible with either single command message for the network or multiple distinct command message for individual nodes by the controller, and therefore, supports generic process automation applications The methods and systems described herein may be implemented in wireless network devices.

Figure 31A:
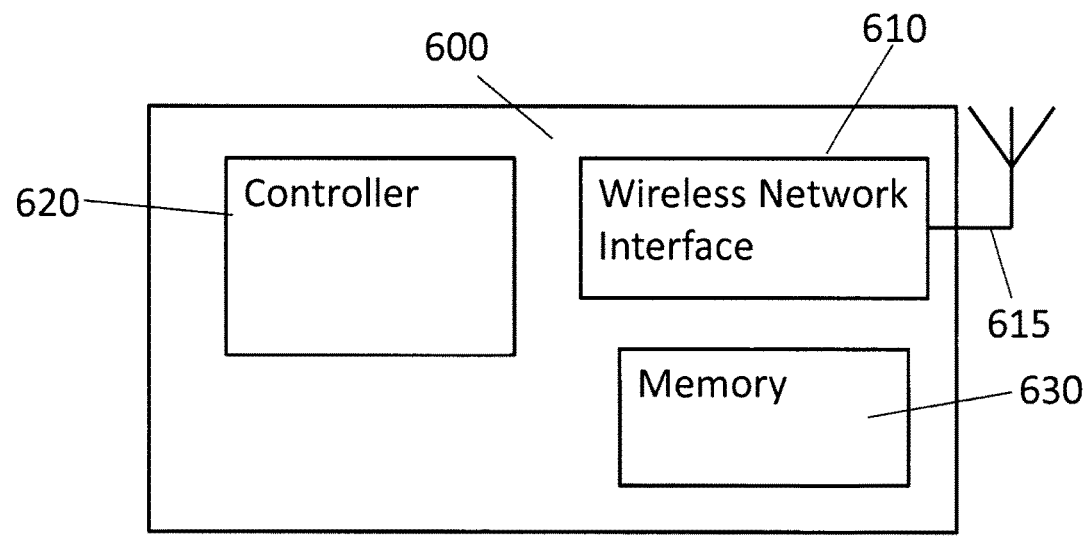
FIG. 31A shows an example of a wireless node according to an arrangement.

FIG. 31A shows an example of a wireless node according to an arrangement. This is capable of performing the functions of any of the wireless nodes or slave devices described herein.

The wireless node 600 comprises a wireless network interface 610, an antenna 615, memory 630 and a controller 620. The wireless interface 610 is configured to send and receive wireless signals via the antenna 615 to communicate with other wireless devices. The controller 620 is configured to control the wireless node 600 to perform the functions described herein.

The memory 630 stores computer executable code which, when executed by the controller 620, causes the controller 620 to enact the steps described herein to transmit, receive and process data. The memory 630 may comprise a record of overheard transmissions, messages and/or scheduled transmissions.

Figure 31B:
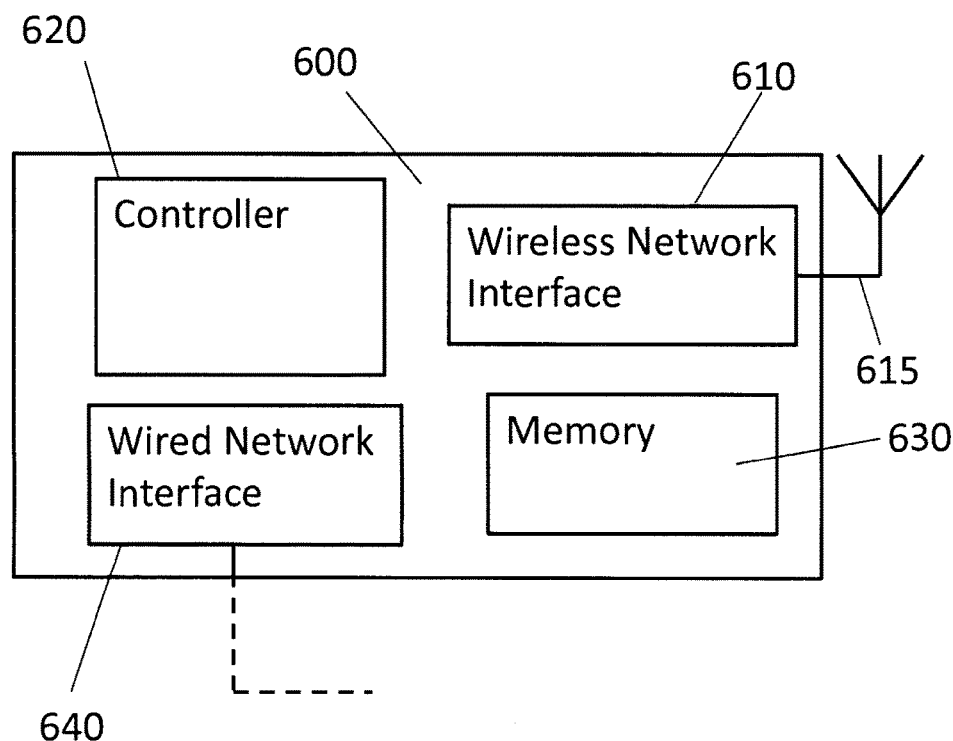
FIG. 31B shows a central node according to an arrangement.

FIG. 31B shows a central node according to an arrangement. The central node is the same as the wireless node 600 other than it has a wired network interface 640 for communication with devices external to the wireless network. This allows the central node to perform the functions of a sink node (by relaying transmissions out of the network) or a control node (by receiving instructions for controlling a network of slave devices, and relaying their responses back).

Whilst certain arrangements have been described, these arrangements have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A method for assisting bidirectional communication within a wireless network, the wireless network comprising a central node and a plurality of outer nodes within wireless communication range of the central node, the method comprising a first outer node:

listening for a downlink communication from the central node to a second outer node and an uplink response from the second outer node to the central node;

determining that the uplink response has failed to be received by its intended recipient in response to the uplink response being detected by the first outer node and the first outer node receiving a signal from the central node indicating that the uplink response has not been received from the second outer node;

in response to a determination that the uplink response has failed to be received by its intended recipient, determining whether the first outer node should transmit the uplink response to the intended recipient; and in response to a determination that the first outer node should transmit the uplink response to the intended recipient, transmitting the uplink response to the intended recipient, including sending a signal informing the central node that the uplink response has failed and that the first outer node intends to transmit the uplink response.

2. The method of claim 1, wherein determining whether the first outer node should transmit the uplink response to the intended recipient comprises:

waiting for a contention period, the length of the contention period being based on a strength of communication link between the first and second outer nodes; and in response to the receipt of a signal during the contention period from any other outer node indicating that the other outer node intends to transmit the uplink response, determining that the first outer node should not transmit the uplink response.

3. The method of claim 2, wherein determining whether the first outer node should transmit the uplink response to the intended recipient further comprises, in response to no signal being received during the contention period from any other outer node indicating that the other outer node intends to transmit the uplink response, determining that the first outer node should transmit the uplink response.

4. The method of claim 1, wherein the first outer node sending a signal informing the central node that the uplink response has failed comprises the first outer node requesting a timeslot for transmitting the uplink response, wherein, in response to the receipt of an approval of the request, the first outer node transmits the uplink response to the central node.

5. The method of claim 1, wherein transmitting the uplink response to the intended recipient comprises, in response to a determination that the transmission of the uplink response failed, transmitting the uplink response to the central node.

6. The method of claim 5, wherein:

transmitting the uplink response to the central node comprises transmitting the uplink response to the central node in a form encoded with the downlink communication to allow the central node to decode the uplink response using the downlink communication.

7. The method of claim 6, wherein:

transmitting the uplink response to the central node comprises transmitting the uplink response to the central node in a form encoded with the downlink communication to allow the central node to decode the uplink response using the downlink communication; and the uplink response is encoded with the downlink communication by performing an XOR operation on the downlink communication and the uplink response.

8. The method of claim 5, wherein transmitting the uplink response to the central node comprises transmitting the uplink response to the central node in unison with the second outer node transmitting the uplink response to the central node.

9. A method for closed loop communication within a wireless network, the wireless network comprising a central node and a plurality of outer nodes within wireless communication range of the central node, the method comprising the central node:
   transmitting a downlink communication to a first outer node;
   listening, for a first period, for an uplink response from the first outer node;
   in response to no uplink response being received from the first outer node during the first period:
   transmitting a signal informing all of the plurality of outer nodes that no uplink response has been received from the first outer node;
   listening over a second period for a signal indicating that any other outer node overheard the uplink response from the first outer node;
   in response to a signal being received during the second period indicating any other outer node overheard the uplink response from the first outer node, instructing the other outer node to transmit the uplink response to the central node; and
   in response to no signal being received during the second period indicating that any other outer node overheard the uplink response:
      sending to a second outer node a request for assistance with a retransmission of downlink information to the first outer node;
      in response to a receipt from the second outer node of an approval of the request, retransmitting the downlink information to the first outer node in unison with the second outer node.

10. A method according to claim 9, wherein:
    instructing the other outer node to transmit the uplink response to the central node comprises instructing the other outer node to transmit the uplink response in encoded form using the downlink communication and the method comprises the central node, in response to the uplink response being received from the other outer node in encoded form, decoding the uplink response using the downlink communication; and/or
    sending to a second outer node a request for assistance comprises selecting the second outer node from the plurality of outer nodes in the wireless network based on the strength of communication link between the central node and the second outer node.

11. A method according to claim 9, wherein the method further comprises the central node:
    transmitting respective downlink communications to a selection of outer nodes;
    listening, for the first period, for a respective uplink response from each of the selection of outer nodes;
    in response to no uplink response being received from any of the selection of outer nodes during the first period, transmitting a signal informing all of the nodes of each outer node for which no uplink response has been received, wherein the signal assigns a respective relative priority to each outer node for which no uplink response has been received.

12. A method according to claim 9, wherein the central node and the plurality of outer nodes form part of a multi-hop network, wherein:
    transmitting the downlink communication to the first outer node comprises receiving the downlink communication from a parent node of the central node and relaying the downlink communication to the first outer node;
    the method further comprises the central node, in response to no uplink response being received from the first outer node during the first period, but prior to transmitting a signal informing all of the plurality of outer nodes that no uplink response has been received from the first outer node:
    requesting timeslots for performing retransmissions from the parent node;
    in response to receiving of a message from the parent node confirming the request, scheduling retransmissions during the requested timeslots; and
    in response to receiving of a message from the parent node providing alternative timeslots, scheduling retransmissions during the alternative timeslots.

13. A method according to claim 12, wherein the method comprises the central node, in response to receiving a further request for timeslots for performing retransmissions from one of the plurality of outer nodes:
    determining whether the further request for timeslots would conflict with other transmissions;
    in response to a determination that there would be no conflict, sending to the one of the plurality of outer nodes a confirmation that the further request is granted;
    in response to a determination that there would be a conflict, sending to the one of the plurality of outer nodes a schedule including one or more non-conflicting timeslots for performing retransmissions.

14. A method according to claim 13, wherein:
    determining whether the further request for timeslots would conflict with other transmissions comprises comparing the further request for timeslots with other requests for retransmission timeslots that have been received by the central node; and/or
    the method further comprises the central node, in response to receiving the further request, sending a request for an additional timeslot for forwarding on a retransmission to the parent node.

15. A wireless node comprising:
    a wireless transceiver configured to communicate wirelessly with other nodes in a wireless network;
    memory; and
    a controller configured to control the wireless node to perform the method of claim 1.

16. A wireless node comprising:
    a wireless transceiver configured to communicate wirelessly with other nodes in a wireless network;
    memory; and
    a controller configured to control the wireless node to perform the method of claim 9.

* * * * *